US009105149B2

(12) United States Patent
Hirato et al.

(10) Patent No.: US 9,105,149 B2

(45) Date of Patent: Aug. 11, 2015

(54) REEL FOR GAMING MACHINE AND GAMING MACHINE INCLUDING THE SAME

(75) Inventors: Jun Hirato, Tokyo (JP); Kou Kobayashi, Tokyo (JP)

(73) Assignees: UNIVERSAL ENTERTAINMENT CORPORATION, Tokyo (JP); ARUZE GAMING AMERICA, INC., Las Vegas, NV (US)

( * ) Notice: Subject to any disclaimer, the term of this patent is extended or adjusted under 35 U.S.C. 154(b) by 233 days.

(21) Appl. No.: 13/431,319

(22) Filed: Mar. 27, 2012

(65) Prior Publication Data

US 2013/0260858 A1 Oct. 3, 2013

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.

CPC ............ *G07F 17/3213* (2013.01); *G07F 17/34* (2013.01)

(58) Field of Classification Search

CPC ............................. G07F 17/3213; G07F 17/34

USPC .......................................... 463/16, 20, 30, 31

See application file for complete search history.

(56) References Cited

U.S. PATENT DOCUMENTS

| | | | | |
|---|---|---|---|---|
| 7,043,860 | B2 * | 5/2006 | Inoue | 40/582 |
| 8,216,051 | B2 * | 7/2012 | Rasmussen | 463/20 |
| 2008/0039187 | A1 * | 2/2008 | Kato | 463/20 |
| 2008/0058067 | A1 | 3/2008 | Okada et al. | |
| 2008/0058072 | A1 | 3/2008 | Okada et al. | |
| 2009/0143134 | A1 * | 6/2009 | Anderson et al. | 463/20 |
| 2009/0227370 | A1 * | 9/2009 | Stewart | 463/31 |
| 2009/0313919 | A1 * | 12/2009 | Chuang | 52/202 |
| 2010/0197378 | A1 * | 8/2010 | Thomas | 463/20 |
| 2011/0223985 | A1 * | 9/2011 | Mizue | 463/20 |

FOREIGN PATENT DOCUMENTS

JP 2003-144605 5/2003

* cited by examiner

*Primary Examiner* — William H McCulloch, Jr.

*Assistant Examiner* — Wei Lee

(74) *Attorney, Agent, or Firm* — Lexyoume IP Meister, PLLC

(57) ABSTRACT

A cylindrical reel for a slot machine, which includes a plurality of symbols having different patterns is provided. A reel according to an embodiment includes: a reel frame configured to receive rotational force from a rotational axis of a motor; a reel stripe disposed on an entire circumference of the reel frame and having a front surface including a group of the symbols thereon; a symbol piece including: a first surface having a flange shape; and a second surface protruding from the first surface and including one of the plurality of symbols thereon, wherein the reel stripe has at a least one opening exposing the second surface of the symbol piece, and the first surface of the symbol piece is attached to a rear surface of the reel stripe.

12 Claims, 86 Drawing Sheets

(a)
(b)
(c)
(d)

FIG. 33
WIN
2780
Congratulations!
TOTAL WIN
2780
CREDITS
5 or more BONUS trigger 5 free games
HELP
LANGUAGE
VOLUME
1 ¢
FREE GAME 12 OF 12
BAR
BAR
BAR
BAR
BAR
BAR
BAR
BAR
BAR
BAR
BAR
BONUS
BONUS
BONUS
CREDIT
TOTAL BET
ORB PRIZE WIN x3 = 1200
TOTAL WIN = 1600
1 ¢
LINES
BET x
WIN

REEL FOR GAMING MACHINE AND GAMING MACHINE INCLUDING THE SAME

BACKGROUND (a) Field

The present invention generally relates to a reel for a gaming machine and a gaming machine including the same.

(b) Description of the Related Art

A conventional gaming machine includes a display arranged with a plurality of symbols. The gaming machine rearranges the symbols in a unit game, and awards a payout to a player according to the combination of rearranged symbols (for example, United State Patent Application Publication No. 2008/0058067 and United State Patent Application Publication No. 2008/0058072). The player can start another unit game after one unit game ends.

However, in the conventional gaming machine, although the unit games are repeatedly executed, there is continuity of the unit games. Since the conventional gaming machine does not provide the continuity of the unit games, it is difficult to attract a player's interest in a game.

SUMMARY

A cylindrical reel for a slot machine, which includes a plurality of symbols having different patterns is provided. A reel according to an embodiment includes: a reel frame configured to receive rotational force from a rotational axis of a motor; a reel stripe disposed on an entire circumference of the reel frame and having a front surface including a group of the symbols thereon; a symbol piece including: a first surface having a flange shape; and a second surface protruding from the first surface and including one of the plurality of symbols thereon, wherein the reel stripe has at a least one opening exposing the second surface of the symbol piece, and the first surface of the symbol piece is attached to a rear surface of the reel stripe.

The symbol piece may further include a third surface that is disposed between the first surface and the second surface, is dropped down from the first surface, and surrounds the second surface.

The first surface of the symbol piece may include: a first band portion that is attached to the reel stripe and extends in a direction substantially perpendicular to a direction of rotation of the reel frame; and a second band portion that is attached to the reel stripe, extends in a direction substantially parallel to the direction of rotation of the reel frame, and is narrower than the first band portion.

The reel frame may include: a rim having a ring shape; a hub configured to transmit the rotational force from the motor to the rim; a spoke connecting the rim and the hub, wherein the rim includes: a pair of loops spaced apart from each other by a distance equal to or greater than a width of the reel stripe; and a plurality of connecting rods connected between the pair of loops for keeping the distance between the pair of loops and arranged substantially in parallel along a circumference of the rim to form a plurality of openings, and the opening of the reel stripe is disposed on one of the openings of the reel frame.

The second surface of the symbol piece may be higher than the front surface of the reel stripe.

The one of the plurality of symbols on the symbol piece may be a scatter symbol.

The symbol piece may include: a platform having the second surface of the symbol piece; a peripheral portion having the first surface of the symbol piece; and a depression disposed between the platform and the peripheral portion and surrounding the platform, wherein the platform includes a first stage and a second stage higher than the first stage.

A gaming machine according to an embodiment includes: a reel unit including a plurality of rotatable cylindrical reels that include a plurality of symbols having different patterns for a game; and a controller configured to control an arrangement of the symbols and a movement of the reel unit in the game, wherein each of the reels includes: a reel frame configured to receive rotational force from a rotational axis of a motor; a reel stripe disposed on an entire circumference of the reel frame and having a front surface including a group of the symbols thereon; a symbol piece including: a first surface having a flange shape; and a second surface protruding from the first surface and including one of the plurality of symbols thereon wherein the reel stripe has at a least one opening exposing the second surface of the symbol piece, and the first surface of the symbol piece is attached to a rear surface of the reel stripe.

The symbol piece may further include a third surface that is disposed between the first surface and the second surface, is dropped down from the first surface, and surrounds the second surface.

The first surface of the symbol piece may include: a first band portion that is attached to the reel stripe and extends in a direction substantially perpendicular to a direction of rotation of the reel frame; and a second band portion that is attached to the reel stripe, extends in a direction substantially parallel to the direction of rotation of the reel frame, and is narrower than the first band portion.

The reel frame may include: a rim having a ring shape; a herb configured to transmit the rotational force from the motor to the rim; a spoke connecting the rim and the herb, wherein the rim includes: a pair of loops spaced apart from each other by a distance equal to or greater than a width of the reel stripe; and a plurality of connecting rods connected between the pair of loops for keeping the distance between the pair of loops and arranged substantially in parallel along a circumference of the rim to form a plurality of openings, and the opening of the reel stripe is disposed on one of the openings of the reel frame.

The second surface of the symbol piece may be higher than the front surface of the reel stripe.

The one of the plurality of symbols on the symbol piece may be a scatter symbol.

The symbol piece may include: a platform having the second surface of the symbol piece; a peripheral portion having the first surface of the symbol piece; and a depression disposed between the platform and the peripheral portion and surrounding the platform, wherein the platform includes a first stage and a second stage higher than the first stage.

BRIEF DESCRIPTION OF THE DRAWINGS

FIG. 32 is a still screen image for a tilt state according to an embodiment of the present invention.

FIG. 76 to FIG. 79 are screen images in a normal round showing a fast simultaneous stop action for a high-rank 5× case.

DETAILED DESCRIPTION

Figure 1:
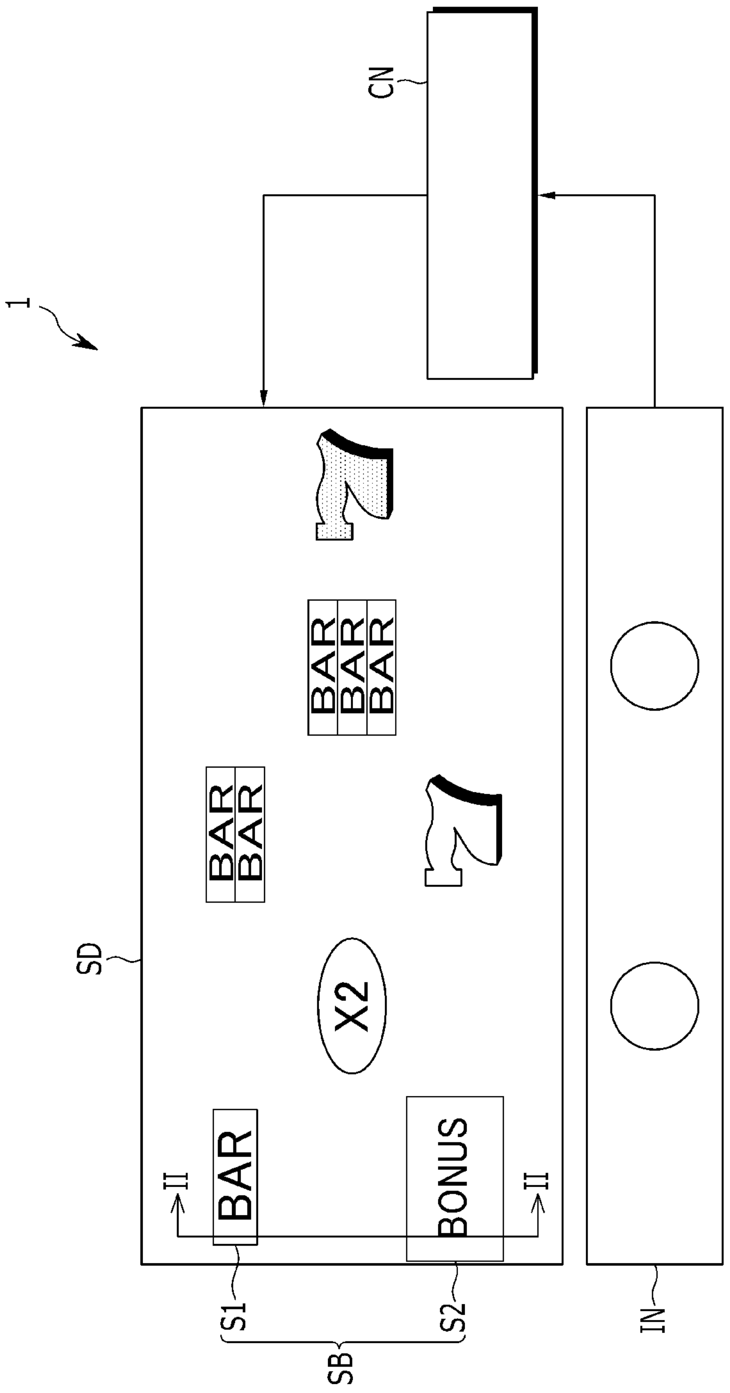
FIG. 1 is a schematic diagram of a gaming machine according to an embodiment.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A gaming machine according to an embodiment of the present invention is described with reference to FIG. 1 and FIG. 2.

Figure 2:
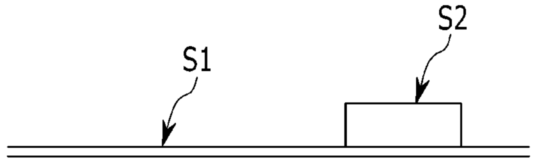
FIG. 2 is a sectional view of a symbol display shown in FIG. 1 taken along line II-II.

FIG. 1 is a schematic diagram of a gaming machine according to an embodiment, and FIG. 2 is a sectional view of a symbol display shown in FIG. 1 taken along line II-II.

Referring to FIG. 1, a gaming machine 1 according to an embodiment includes a symbol display SD, an input unit IN, and a controller CN connected to the symbol display SD and the input unit IN.

The symbol display SD displays a plurality of symbols SB used for a game, in a moving state or in a stop state. The symbols SB in the stop state form an arrangement, and a player may win a prize when the arrangement of the symbols SB satisfies a predetermined condition. The symbols SB begin to move, perform a predetermined movement for a time, and then stop the movement in an execution of the game.

The symbols SB include ordinary symbols S1 and at least one scatter symbol S2. Although the ordinary symbols S2 may win the base game only in a form of combination, the scatter symbol S2, even only one scattering symbol S2, may award a prize to a player regardless of its position on the symbol display SD. In FIG. 1, the scattering symbol S2 is denoted by a word "BONUS," and thus the scattering symbol S2 will be often referred to as a "bonus symbol" hereinafter.

Referring to FIG. 2, the scatter symbol S2 is disposed higher than the ordinary symbols S1 so that the scatter symbols S2 are easily noticeable. In other words, the scatter symbol S2 is disposed on a surface that is higher than a surface on which the ordinary symbols S1 are disposed. However, other symbols instead of the scatter symbol S2, for example, the symbols denoted by "7" may be disposed higher than the other symbols including the scatter symbol S2.

The input unit IN is operable by a player, and outputs a signal to the controller when the player operates the input unit IN. The input unit IN may include a plurality of buttons (not shown) to be pressed by a player. For example, a bet button (not shown) and a spin button (not shown) are provided in the input unit. The bet button is used for betting on a game, and the spin button is used for starting the rearrangement of the symbols SB (or for starting the game) and for stopping the symbols SB in a predetermined condition.

The controller CN receives inputs from the input unit IN, executes the game, and controls the symbol display SD of the symbol display SD in response to inputs from the input unit IN.

An example of the symbol display may include a rotatable reel, an example of which is described in detail with reference to FIG. 3 to FIG. 8.

Figure 3:
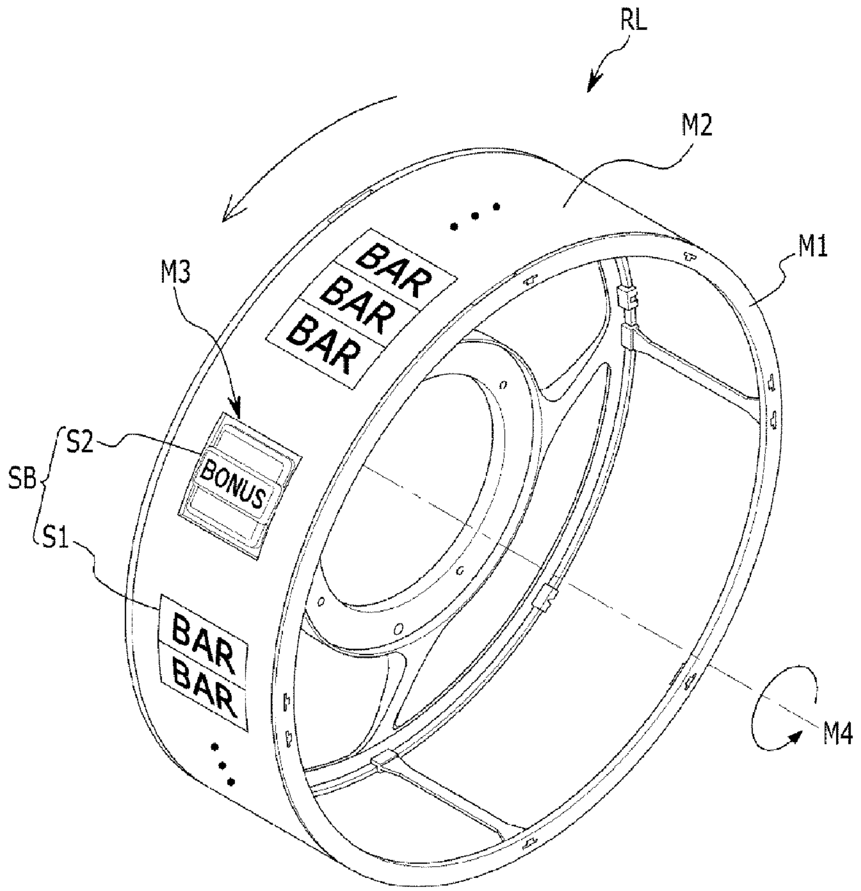
FIG. 3 is a schematic perspective view of an exemplary reel according to an embodiment.
Figure 4:
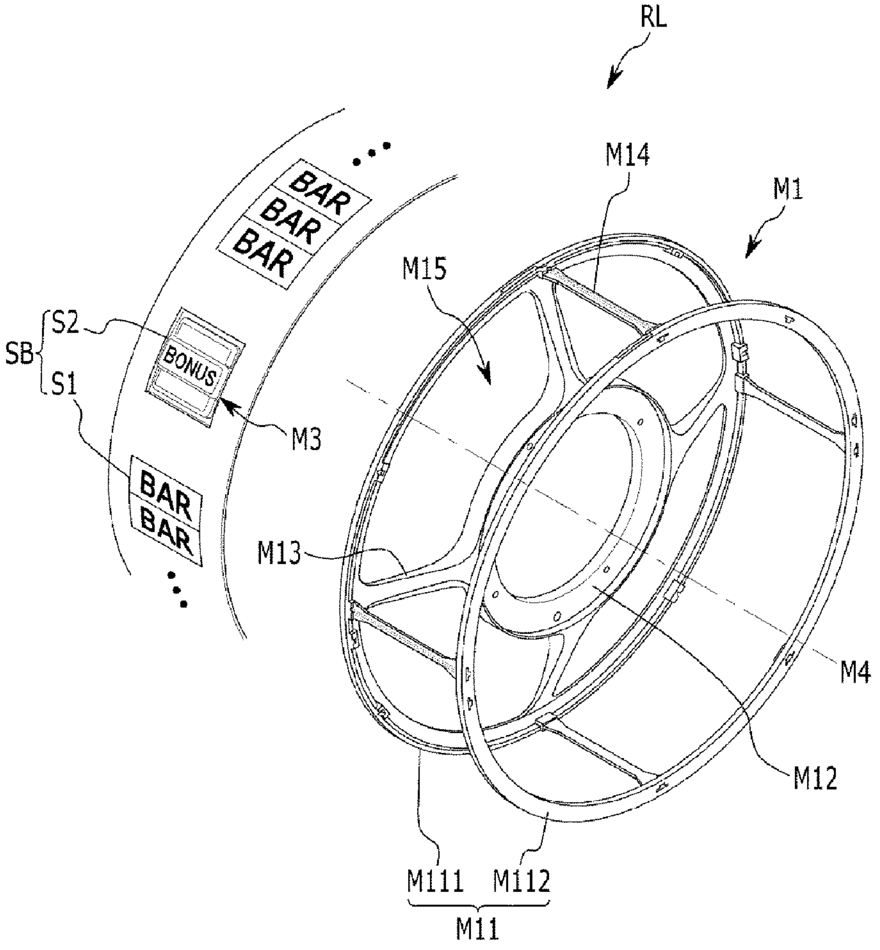
FIG. 4 is a schematic exploded perspective view of the reel shown in FIG. 3.
Figure 5:
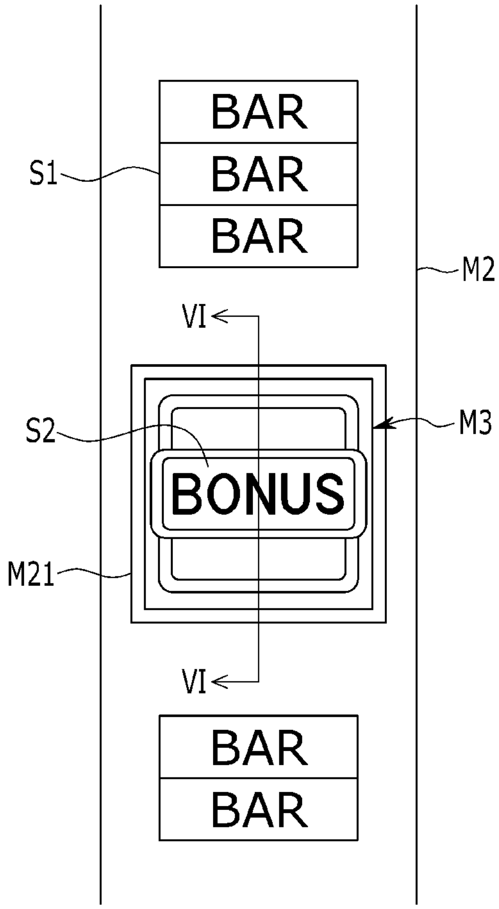
FIG. 5 is a schematic plan view of a reel stripe and a symbol piece of the reel shown in FIG. 4.
Figure 6:
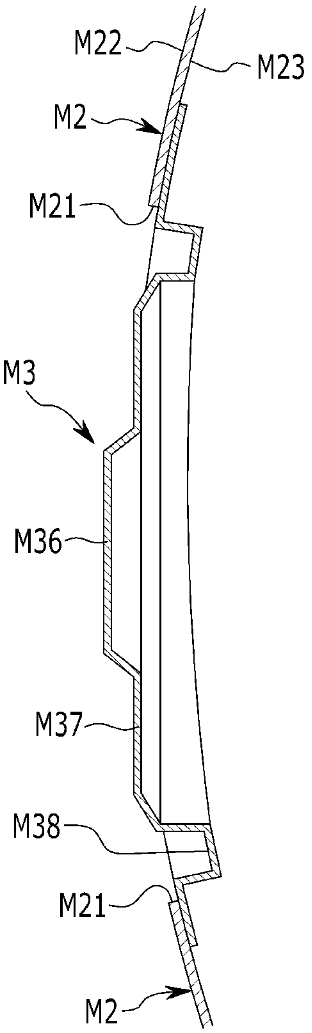
FIG. 6 is a schematic sectional view of the reel stripe and the symbol piece shown in FIG. 5 taken along ling VI-VI.
Figure 7:
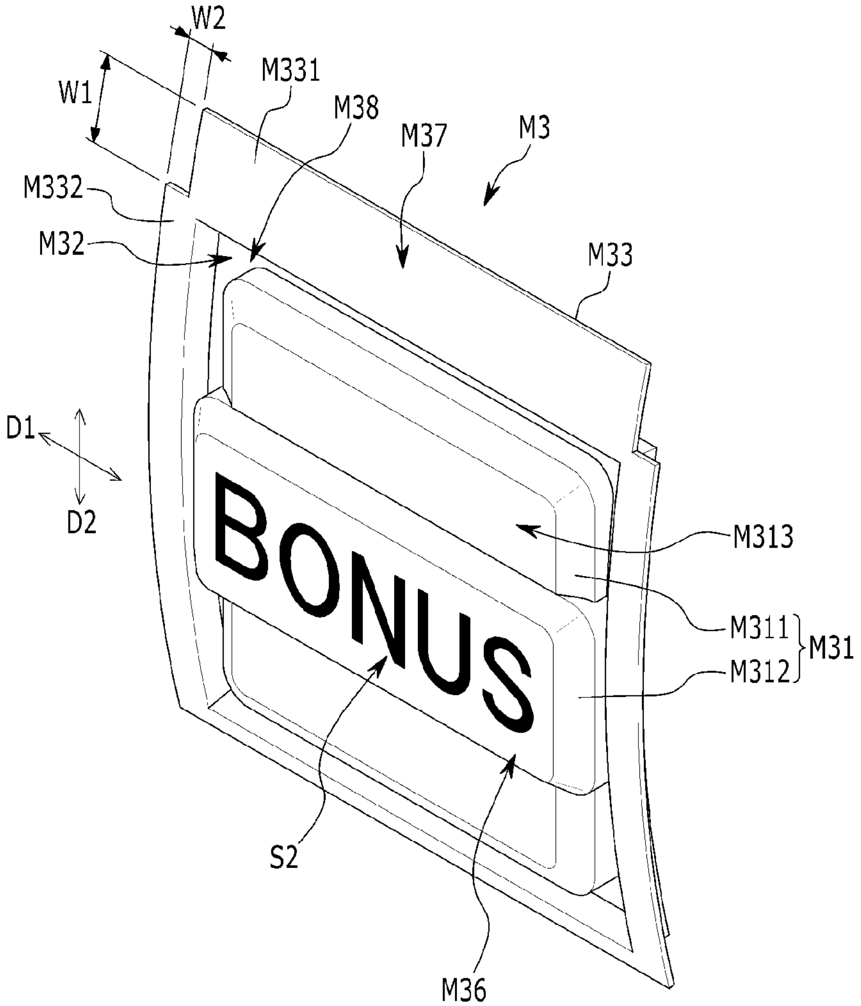
FIG. 7 is a schematic perspective view of a symbol piece.
Figure 8:
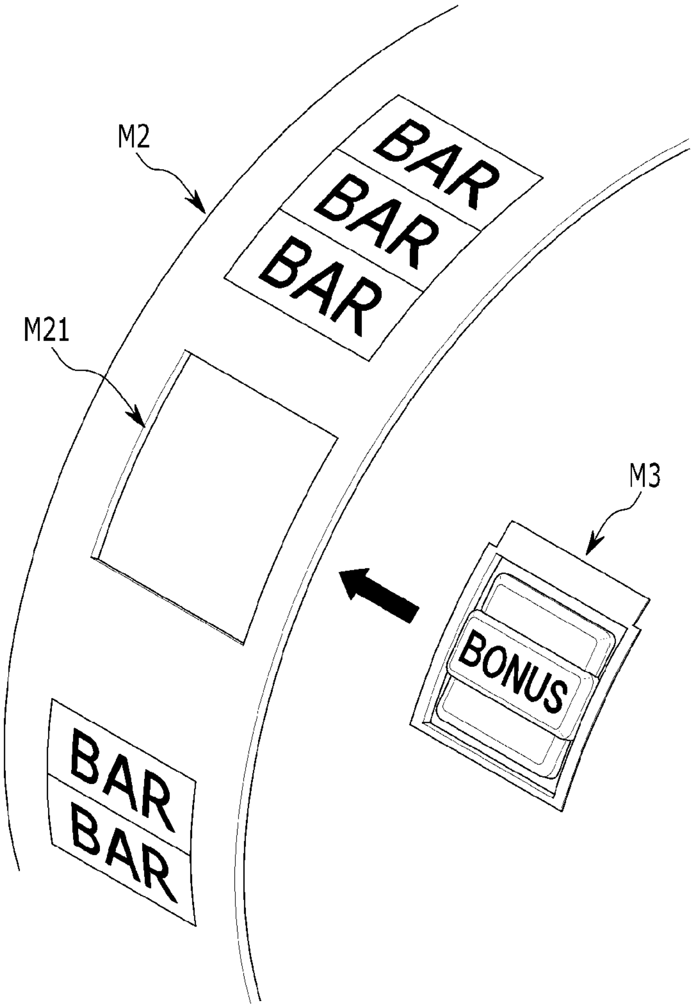
FIG. 8 is a schematic perspective view illustrating a combining process of a reel stripe and a symbol piece.

FIG. 3 is a schematic perspective view of an exemplary reel according to an embodiment, FIG. 4 is a schematic exploded perspective view of the reel shown in FIG. 3, FIG. 5 is a schematic plan view of a reel stripe of the reel shown in FIG. 4, FIG. 6 is a schematic right side view of the reel stripe shown in FIG. 5, FIG. 8 is a schematic perspective view of a symbol piece, and FIG. 8 is a schematic perspective view illustrating a combining process of a reel stripe and a symbol piece.

Referring to FIG. 3, a reel RL according to an embodiment may have a shape of a cylinder or a drum that may be rotatable around a central axis M4, and the reel RL includes a plurality of symbols SB on its outer circumference.

Referring to FIG. 4, the reel RL includes a reel frame M1, a reel stripe M2 disposed on an entire outer circumference of the reel frame M1, and a symbol piece M3 coupled with the reel stripe M2.

The reel frame M1 may receive rotational force from a rotational axis of a motor (not shown) to rotate the central axis M4. The reel frame includes a rim M11, a hub M12, a plurality of spokes M13, and a plurality of connecting rods M14.

The rim M11 includes a pair of circular loops M111 and M112 that are arranged substantially parallel to each other along the central axis M4 and are spaced apart from each other by a substantially uniform distance.

The hub M12 has a shape of a ring, and is disposed at a center of one 111 of the two loops M111 and M112 in a coaxial manner. The hub M12 and the loop M111 are connected by the spokes M13. The hub M12 may transmit the rotational force from the motor to the rim M11.

The connecting rods M14 are connected between the pair of loops M111 and M112 such that they keep the distance between the pair of loops M111 and M112. The connecting rods M14 are arranged substantially in parallel along a circumference of the rim M11. The connecting rods M14 and the rim M11 form a plurality of rectangle-like openings M15.

The reel stripe M2 and the symbol piece M3 includes a variety of symbols SB having different patterns. In this embodiment, the ordinary symbols S1 having different patterns are disposed on the reel stripe M2 and the scatter symbol S2 is disposed on the symbol piece M3. However, one of the ordinary symbols S1 may be disposed on the reel stripe M2 and the scatter symbol S2 may be disposed on the symbol piece.

Referring to FIG. 4 to FIG. 8, the scatter symbol S2 is printed on a top surface M36 of the symbol piece M3, and the ordinary symbols S1 are printed directly on a front surface (or main surface) M22 of the reel stripe M2. Since the top surface M36 of the symbol piece M3 is disposed higher than the front surface M22 of the reel stripe M2, the scatter symbol S2 is disposed higher than the ordinary symbols S1, and thus the scatter symbols S2 are easily recognizable.

The reel stripe M2 has openings M21, and the symbol piece M3 is attached to a rear surface M23 of the reel stripe M2 such that the scatter symbol S2 is exposed through the opening M21. The symbol piece M3 includes a platform M31, a depression M32 enclosing the platform M31 like a moat, and a peripheral portion M33 enclosing the depression M32 like a flange.

The platform M31 includes a first stage M311 having a top surface M313 and a second stage M312 having the top surface M36. The top surface M36 of the second stage M412 is disposed higher than the top surface M413 of the first stage M411 that may have almost the same height as a surface M37 of the peripheral portion M43. The top surface M36 of the second stage M312 may be flat so that the scatter symbol S2 may be printed thereon. The depression M32 has a bottom surface 38 that is lower than the surface M37 of the peripheral portion M33.

Although the depression M32 and the platform M31 are rectangular in this embodiment, the shape is not limited thereto.

The peripheral portion M33 is adhered to the rear surface M23 of the reel stripe M2 with an adhesive like glue. The peripheral portion M33 includes a first band portion M331 and a second band portion M332. The first band portion M331 is attached to the reel stripe M2 and extends in a direction D1 substantially perpendicular to a direction of rotation of the reel frame M1. The second band portion is also attached to the reel stripe M2 and extends in a direction D2 substantially parallel to the rotational direction of the reel frame M1.

When the symbol piece M3 is attached to the reel stripe M2, the top surface M36 is higher than the front surface M22 of the reel stripe M2. Therefore, the scatter symbol S2 is disposed higher than the ordinary symbols S1, and thus the scatter symbols S2 are easily noticeable.

A plurality of reels, each having a shape shown in FIG. 3 to FIG. 8, are used together in a symbol display of a game machine, an example of which is described in detail with reference FIG. 9 to FIG. 11.

Figure 9:
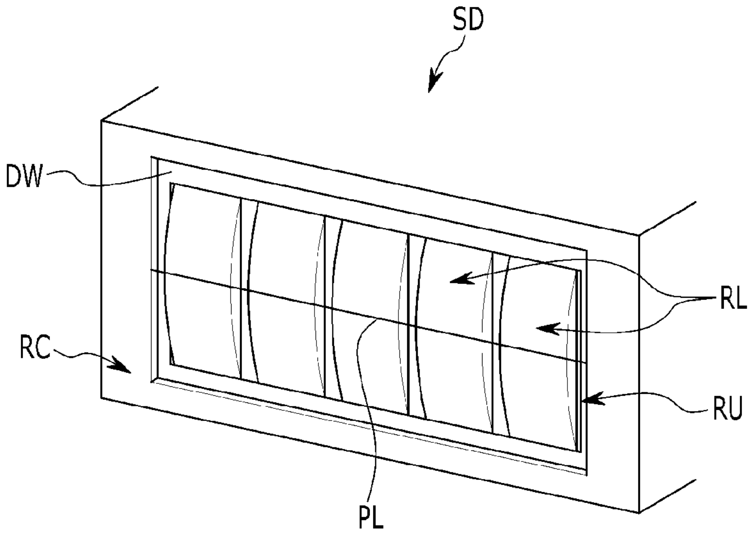
FIG. 9 is a schematic perspective view of an exemplary symbol display for a game machine.
Figure 10:
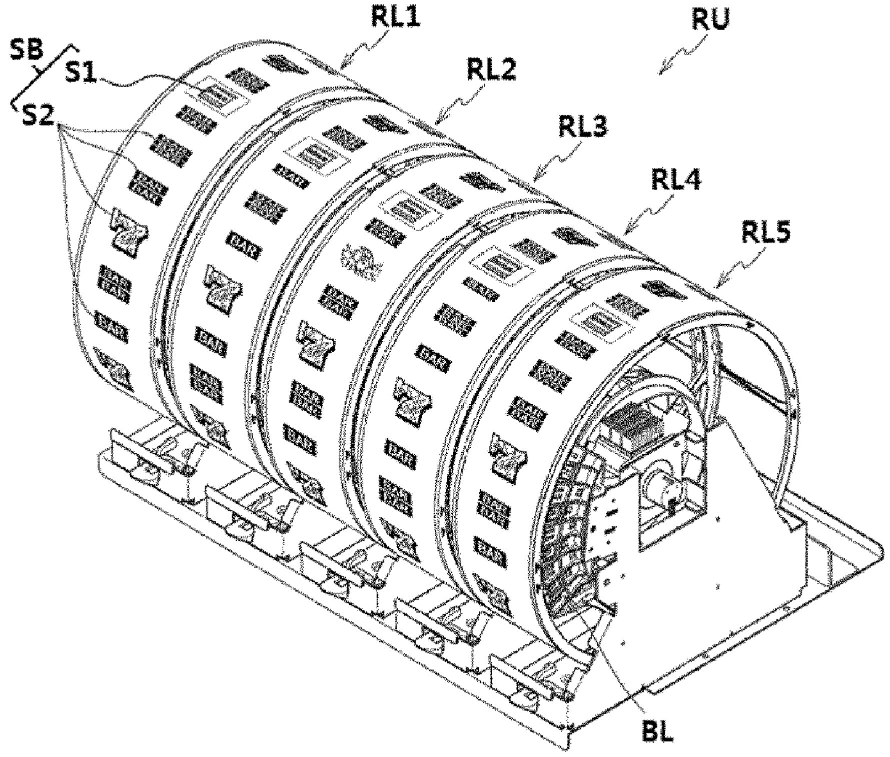
FIG. 10 is a schematic perspective view of an exemplary reel unit for the symbol display shown in FIG. 9.
Figure 11:
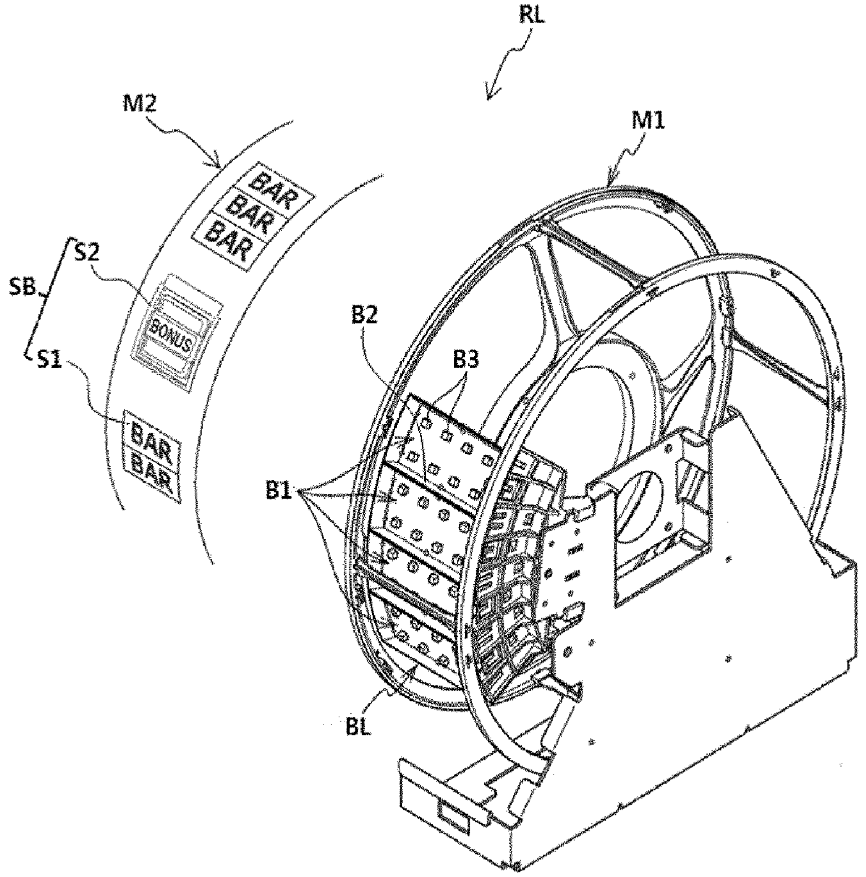
FIG. 11 is a schematic exploded perspective view of a reel shown in FIG. 10.

FIG. 9 is a schematic perspective view of an exemplary symbol display for a game machine, FIG. 10 is a schematic perspective view of an exemplary reel unit for the symbol display shown in FIG. 9, and FIG. 11 is a schematic exploded perspective view of a reel shown in FIG. 10.

Referring to FIG. 9, a symbol display SD according to an embodiment includes a reel unit RU including a plurality of mechanical reels RL and a reel cover RC that covers the reel unit RU and includes a display window DW exposing a portion of the reel unit RU.

Referring to FIG. 10, the reels RL1-RL5 of the reel unit RU may have substantially equal diameters and are arranged in a coaxial manner such that they can rotate or spin around a common rotational axis. The reels RL1-RL5 may be configured to rotate individually. Although the number of the reels RL1-RL5 is five in this embodiment, but it is not limited thereto.

Each of the reels RL1-RL5 includes a series of symbols SB on its outer circumference, and one, two, or more scatter symbols S2 may be included. Each reel RL1-RL5 may have substantially the same shape as that shown in FIG. 3 to FIG. 8 such that the scatter symbols S2 are disposed higher than ordinary symbols S1. Some of the symbols SB, for example, 3×5 symbols SB can be shown to a player through the display window DW in a stop state of the reel unit RU.

Referring to FIGS. 9 and 11, the reel unit RU further includes a backlight unit BL including a plurality of light sources B3 such as light emitting diodes (LED), etc., that illuminate the symbols SB. The light sources B3 are partitioned by a plurality of partitions B2. Each of a plurality of lighting areas B1 defined by the partitions B1 corresponds to a symbol SB on the reel stripe M2. The depression M32 of the symbol piece may be fit into the partition B1 to prevent the reel stripe M2 from moving around.

Referring to FIG. 9, a payline PL is provided on the display window DW that passes through all the reels RL. When a combination of the symbols SB on the payline PL in a game satisfies a predetermined condition, a player wins the game. For example, if all the symbols SB in a combination are the same, the gaming machine 1 awards a prize to the player. Such a combination of the symbols SB that provides a win is referred to as a "winning combination." The payline PL shown in FIG. 9 is merely an example, and various paylines may be drawn, and two or more paylines may be selected by a player.

In addition to a win with the payline PL (referred to as a "line win" hereinafter), there is another type of win referred to as "scatter win" that is given when the scatter symbol S2 is shown on the symbol display SD.

Now, a gaming method according to an embodiment is described in detail with reference to FIG. 12 to FIG. 15 as well as FIG. 1 and FIG. 2.

Figure 12:
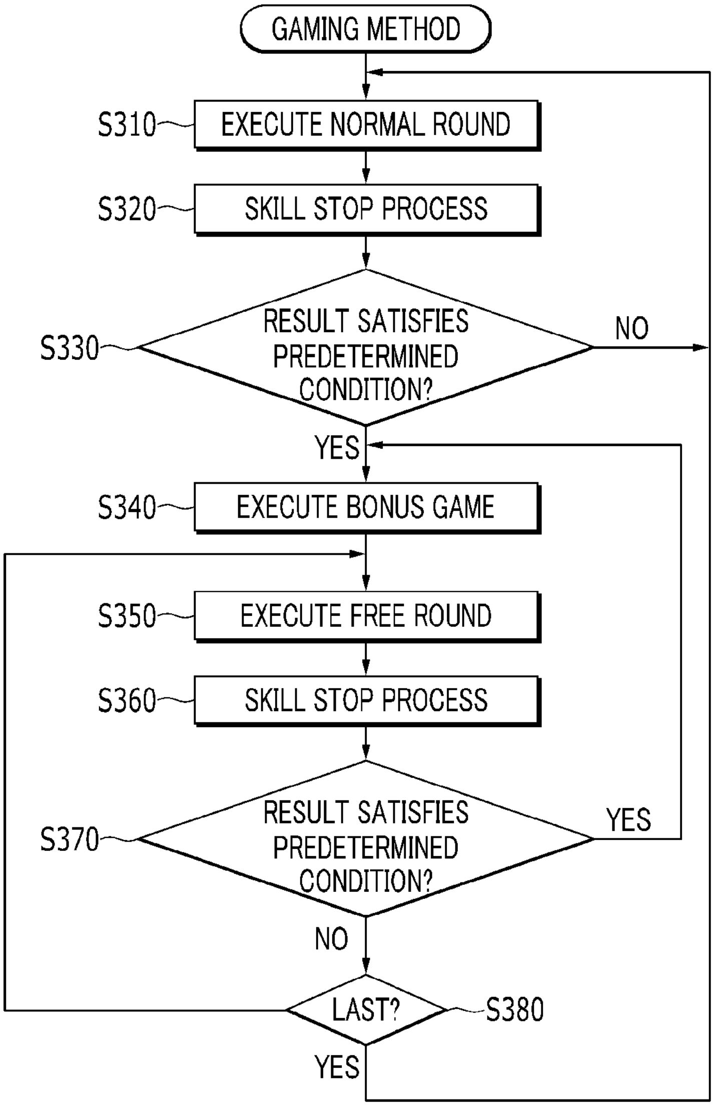
FIG. 12 and FIG. 13 is a schematic flow chart illustrating a gaming method according to an embodiment of the present invention.
Figure 13:
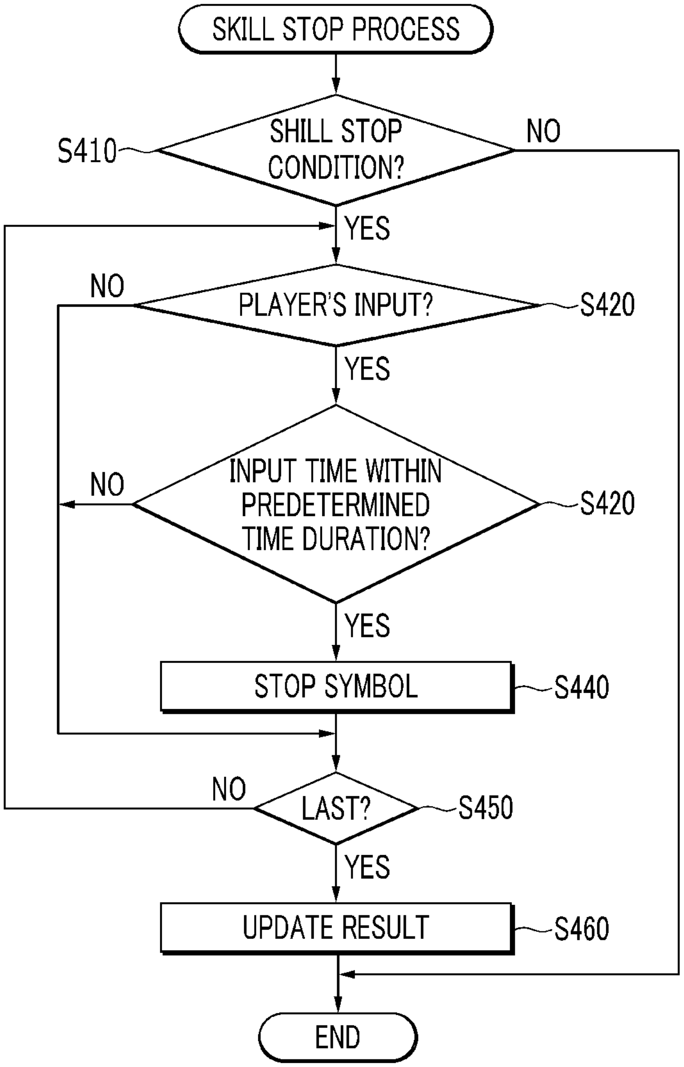
Figure 14:
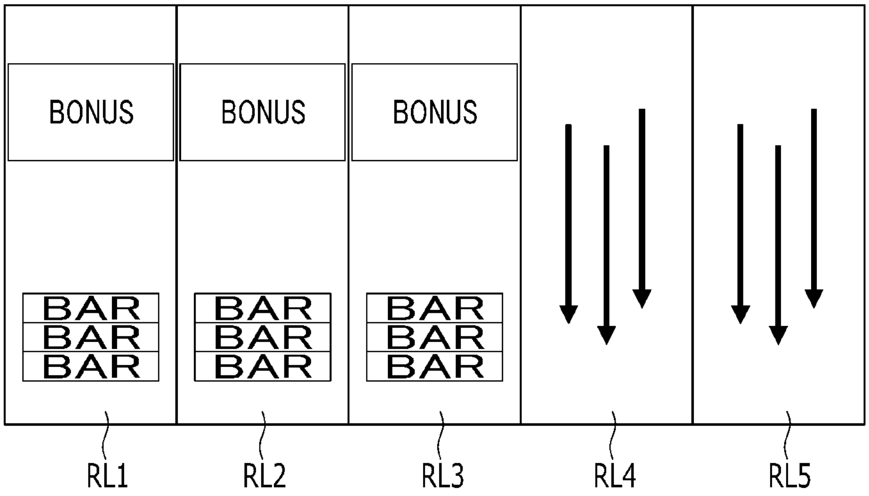
FIG. 14 and FIG. 15 are schematic diagrams of front view of an exemplary symbol display, illustrating a gaming method according to an embodiment of the present invention.
Figure 15:
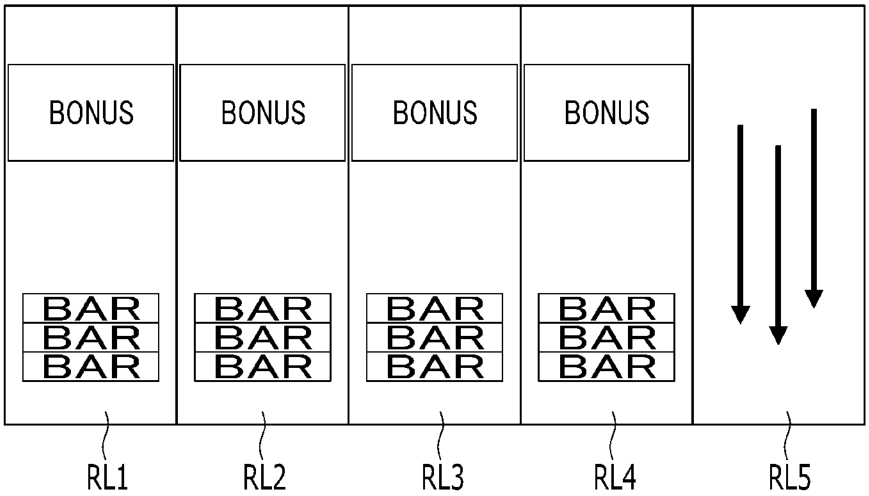

FIG. 12 and FIG. 13 is a schematic flow chart illustrating a gaming method according to an embodiment of the present invention, and FIG. 14 and FIG. 15 are schematic front views of an exemplary symbol display, illustrating a gaming method according to an embodiment of the present invention.

The controller CN of the gaming machine 1 make the symbol display SD display a plurality of symbols SB before starting a game.

Referring to FIG. 12, the controller CN executes a normal round of the base game according to inputs from a player (S310).

The inputs from the player include an input from the bet button and another input from the spin button. The player determines a bet amount by pressing the bet button, and starts the normal round of the base game by pressing the spin button.

Upon Receipt of the input from the spin button, the controller CN determines the arrangement of the symbols SB, for example, by using a random number generator (not shown), and determines whether one or more winning combinations occur. Based on the determined symbol arrangement and the available winning combinations, the controller CN determines a rendering movement mode of the symbols SB that may determine for example, moving speeds and directions of the symbols SB, and may further determine sound and/or lighting effect rendering to be supplied by a separately equipped rendering unit (not shown), and so on.

Thereafter, the controller CN makes the symbol display SD display the rendering movements of the symbols SB according to the determined rendering movement mode.

Next, the controller CN executes a skill stop process (S320).

Referring to FIG. 13, the controller CN determines whether the determined rendering movement mode satisfies a predetermined condition (S410). In the example shown in FIG. 2, for example, there may be some rendering movement modes called slow spinning modes that make the reels RL spin slowly in common or in sequence for a predetermined time. In detail, the reels RL start spinning, increase their speed to spin fast, decrease their speed, and then maintain their slow speed for the predetermined time before stopping their spin in the slow spinning modes. If the determined rendering movement mode is one of the slow spinning modes, the controller CN determines that the determined rendering movement mode satisfies the predetermined condition.

When the determined rendering movement mode satisfies a predetermined condition, the controller CN allows the player to perform skill stop on a predetermined symbol, for example, the scatter symbol S2 for a predetermined time duration. In detail, the controller CN may be configured to receive a player's input for the skill stop within the predetermined time duration during the rendering movement and not to not to receive the player's input before and after the predetermined time duration. The player's input may be a push of a stop button, for example, the spin button S2 or a separately provided stop button.

The predetermined time duration may depend on a position of the scatter symbol S2. For example, the beginning and the end the predetermined time duration may be determined by a time when the scatter symbol S2 arrives at a predetermined position, and the predetermined position may be, for example, a position on the symbol display SD. For example, the predetermined time duration begins a predetermined frame before the scatter symbol S2 arrives at a predetermined position, and ends when the scatter symbol S2 passes through the predetermined position. A frame denotes a time duration for one period of periodic motion of the scatter symbol S2, and the predetermined frame may be a half frame, a quarter frame, or another. In an example shown in FIG. 2, a frame may denote one rotation (or one spin) of a reel RL.

Once a skill stop chance is given to the player, the player may observe the movement of the symbols SB and try to stop the predetermined symbol (for example, the scatter symbol S2) on the symbol display SD by pressing the stop button (for example, the spin button S2) at an exact time within the predetermined time duration for obtaining a win. If the player presses the stop button at a time other than the predetermined time duration, there is no response from the gaming machine 1.

It is noted that the symbol for the skill stop is predetermined by the controller CN, and thus the player may not select a symbol for the skill stop. Although the predetermined symbol is the scatter symbol S2, it may be another symbol.

Therefore, the controller CN determines whether there is an input from the player when the determined rendering movement mode satisfies a predetermined condition (S420). When an input from the player is received, the controller CN determines whether a time of the input from the player is within the predetermined time duration (S430). When the input from the player is within the predetermined time duration (S430: YES), the controller CN stops the movement of at least a group of the symbols SB that move coincidentally with the scatter symbol S2 (S440). For example, the group of the symbols SB may be the symbols SB on the same reel RL in the example shown in FIG. 2.

Whether the player win or not may depend on the exact timing of the button pressing. If the player presses the spin button S2 at an exact time within the predetermined time duration, the scatter symbol S2 may stop at a position on the symbol display SD to cause the player win the game. Otherwise, the player fails to win.

FIG. 15 shows a situation where the player succeeded in stopping the scatter symbol S2 of the fourth reel RL4 at the first row using the skill stop.

Since the skill stop can be allowed for two or more scatter symbols S2, the controller CN repeats S420 to S440 until the last skill stop finishes (S450).

In the example shown in FIG. 2, the skill stop for the scatter symbol S2 may be performed reel by reel. For example, referring to FIG. 14, the controller CN may allow the skill stop for two right reels RL4 and RL5. In this case, after left three reels RL1-RL3 stop, the controller CN may allow the skill stop for the left of the two reels RL4 and RL5, and, after the action of the skill stop finishes, the controller CN may allow the skill stop for the right of the two reels RL4 and RL5.

The skill stop of the player may change the previously-determined arrangement of the symbols SB as well as the win status of the normal round. Therefore, the controller CN updates the result (S460), and then finishes the skill stop process.

If the player fails to press the stop button within the predetermined time or if the determined rendering movement mode does not give a chance to perform a skill stop, the controller CN may have the symbols SB maintain the rendering movement.

Referring to FIG. 12 again, when the result of the execution of the game and the skill stop process in the normal round, i.e., when the finalized arrangement of the symbols SB satisfies a predetermined condition (S330: YES), the controller CN triggers and executes the bonus game (S340). The predetermined condition may be a condition where five or more scatter symbols SB are shown in the symbol display SD. The bonus game may be visible on the symbol display SD, but may be visible on another display (not shown) especially when the symbol display SD includes actual reels. Examples of the bonus game may include a spinning wheel or a dice wheel, and the player may use the buttons for the start of the bonus game.

The bonus game may be repeated by a number determined by the arrangement of the symbols SB that triggers the bonus game. For example, the number of repetition of the bonus game may depend on the number of the scatter symbols S2 in the symbol arrangement.

After finishing the bonus game, the controller CN executes a free round of the base game (S350). The free round may be executed without actual betting of the player, and the betting amount used for determining the win prize of the free round may be that of the normal round executed just before the bonus game. The free round may be repeated by a determined number, for example, seven.

The controller CN performs the skill stop process for the free round like the normal round (S360).

When the result of the execution and the skill stop process in the free round, i.e., the arrangement of the symbols SB satisfies the predetermined condition (S370: YES), the controller CN retriggers the bonus game (S340). In addition, the controller CN may increase the number of the repetition of the free round. The increased number of the repetition of the free round may be also predetermined, for example, by five that is smaller than that given when triggered from the normal node.

When the last execution of the free game is finished (S380: YES), the controller CN executes a normal round again (S310).

The player may win an additional prize after finishing the free round. The additional prize is determined based on the number of the scatter symbols SB appeared in the free round and the prize amount determined in the bonus game. According to an embodiment of the present invention, the additional prize may be the product of the number of the scatter symbols SB and the prize amount determined in the bonus game.

(Outline of Gaming Machine)

A gaming machine according to another embodiment of the present invention is described with reference to FIG. 16 to FIG. 23.

Figure 16:
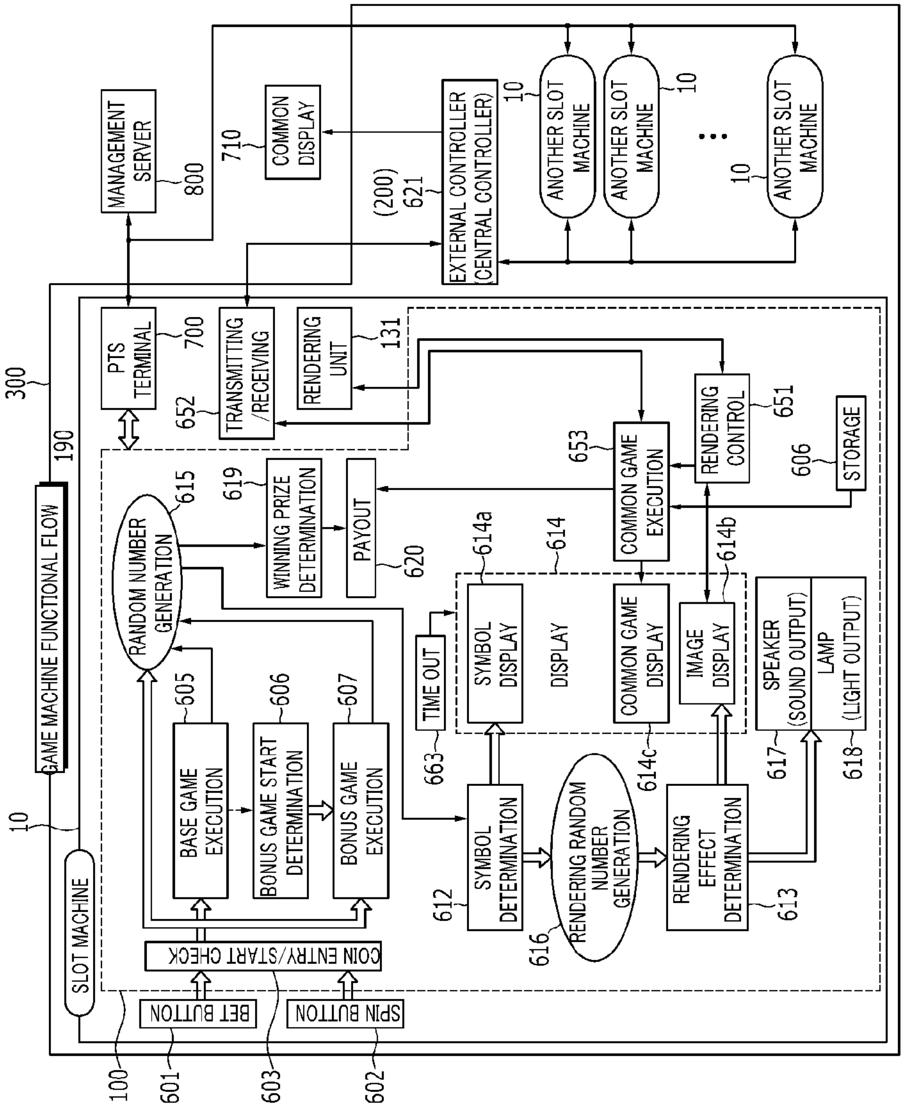
FIG. 16 is a schematic block diagram of an exemplary gaming machine showing a functional flow of the gaming machine.
Figure 17:
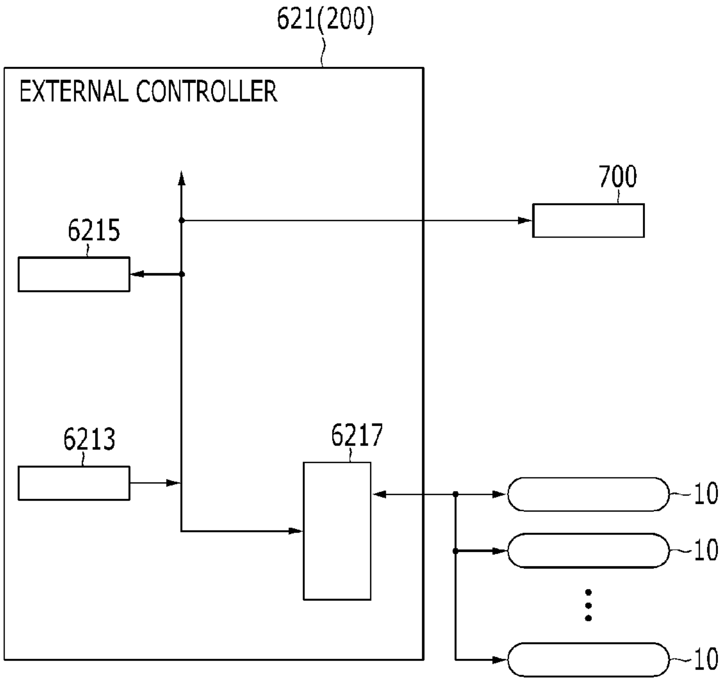
FIG. 17 is a schematic block diagram of an exemplary external controller.
Figure 18:
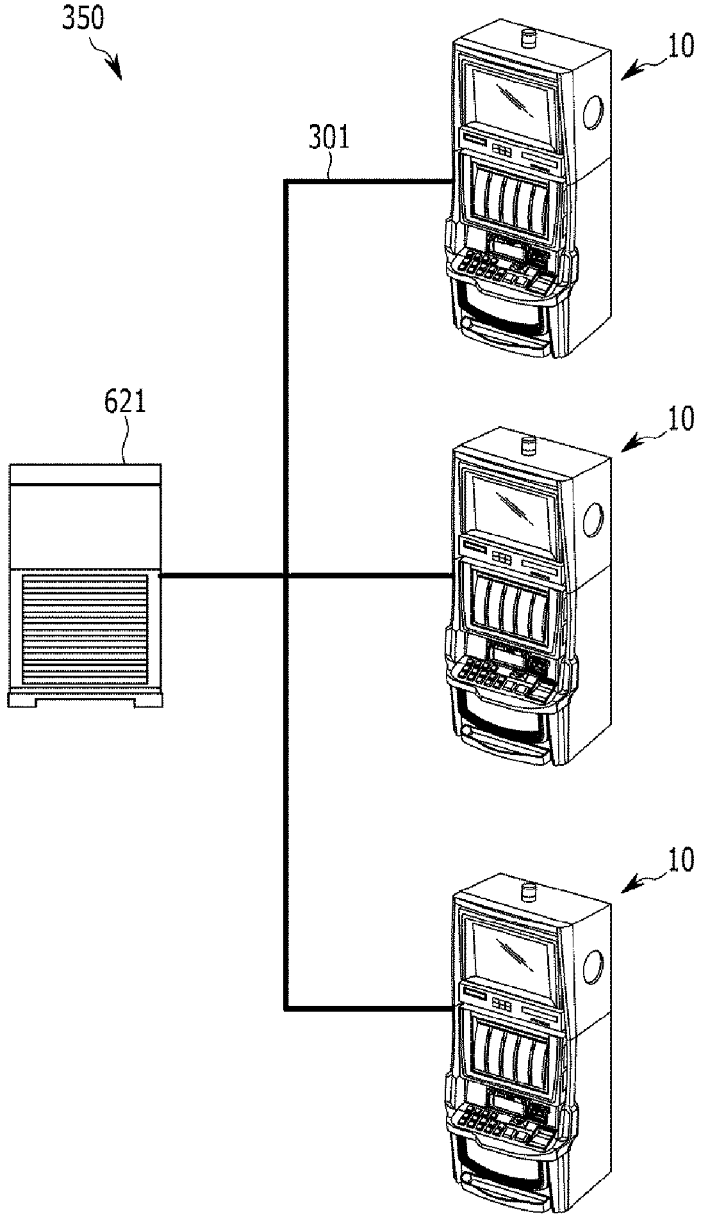
FIG. 18 is a schematic perspective view of an exemplary gaming machine.
Figure 19:
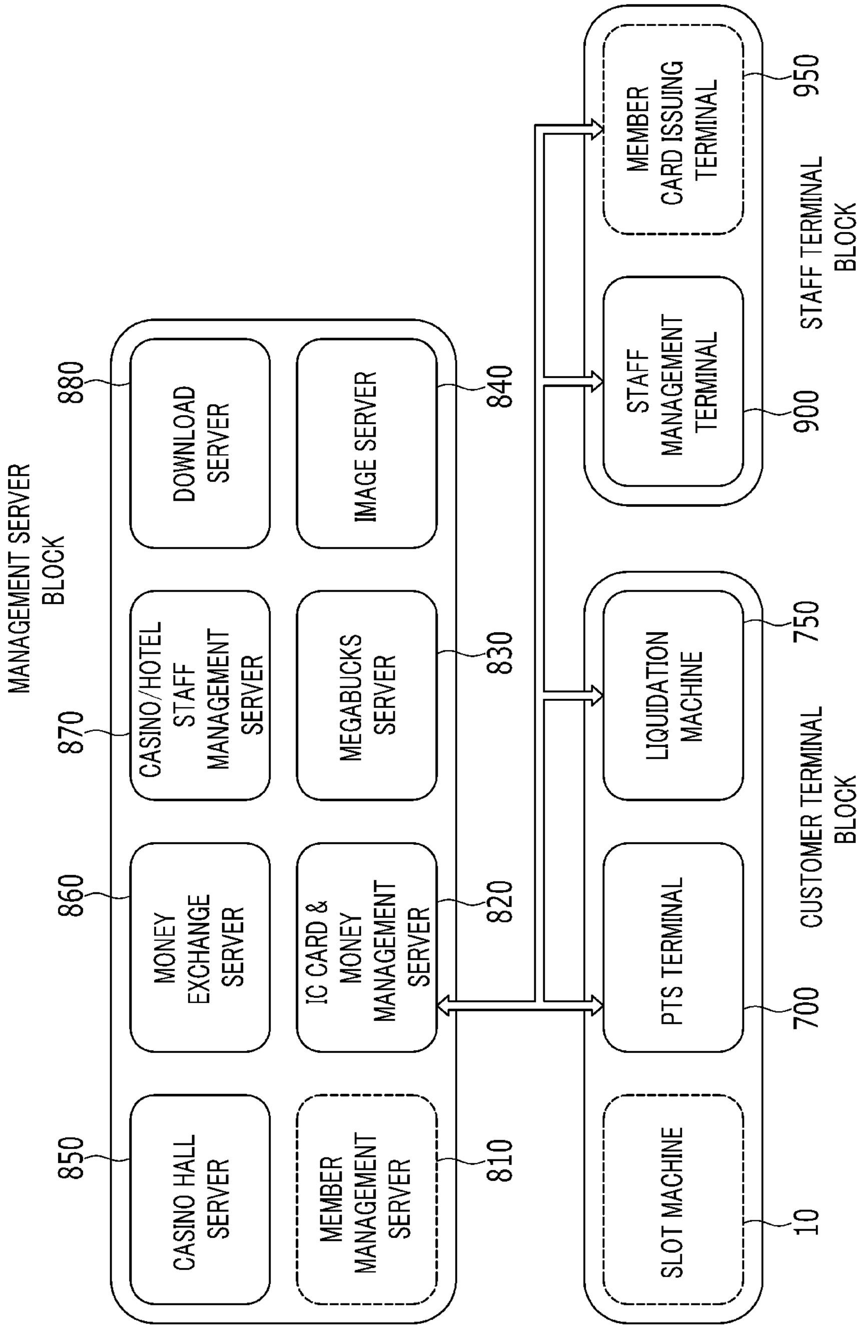
FIG. 19 is a schematic block diagram of an exemplary gaming system.
Figure 20:
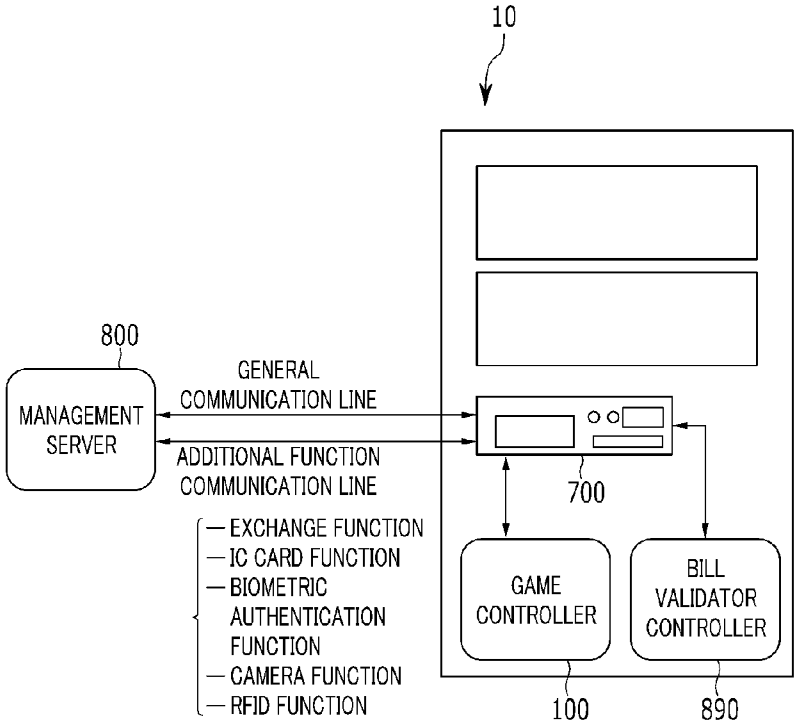
FIG. 20 is a schematic block diagram of an exemplary PTS system of a gaming machine.
Figure 21:
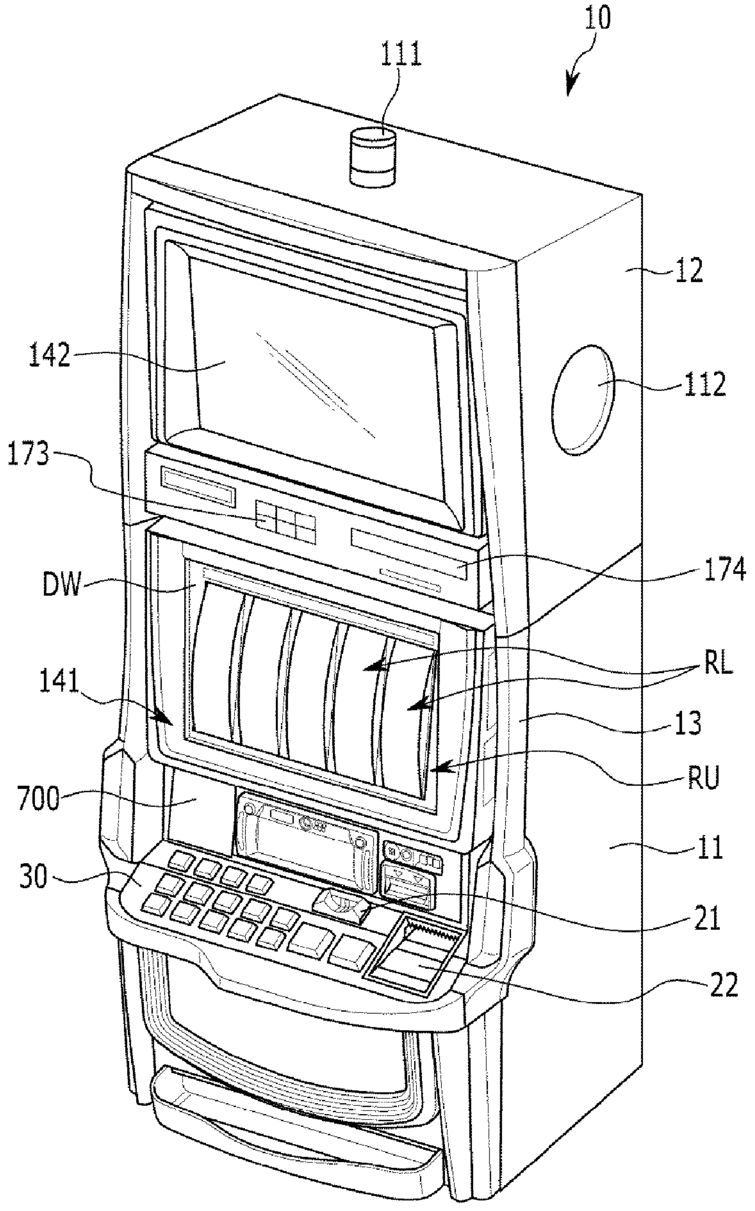
FIG. 21 is a schematic perspective view of an exemplary slot machine in a gaming machine according to an embodiment.
Figure 22:
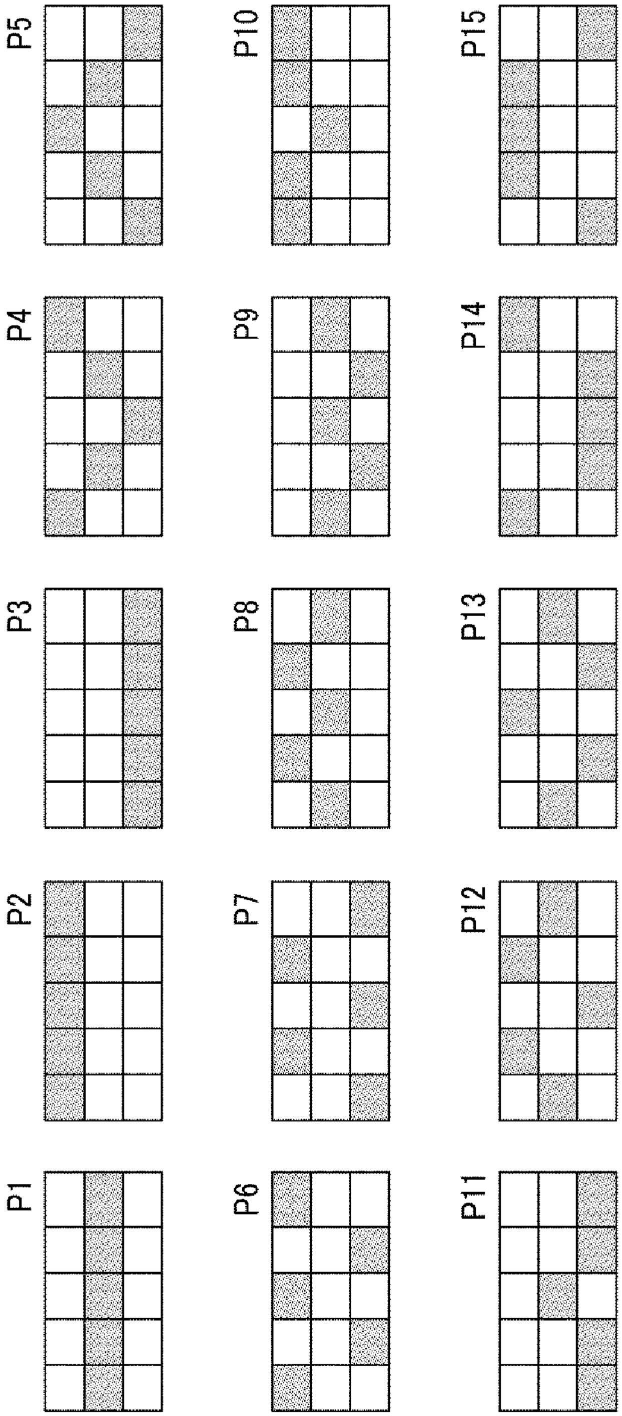
FIG. 22 and FIG. 23 are schematic diagrams of exemplary paylines.

FIG. 16 is a schematic block diagram of an exemplary gaming machine showing a functional flow of the gaming machine, FIG. 17 is a schematic block diagram of an exemplary external controller, FIG. 18 is a schematic perspective view of an exemplary gaming machine, FIG. 19 is a schematic block diagram of an exemplary gaming system, FIG. 20 is a schematic block diagram of an exemplary PTS system of a gaming machine, FIG. 21 is a schematic perspective view of an exemplary slot machine in a gaming machine according to an embodiment, and FIG. 22 is a schematic layout view of an exemplary control panel of a slot machine showing a button layout.

(Functional Flow of Gaming Machine 300: Slot Machine)

Referring to FIG. 16, a gaming machine 300 according to an embodiment includes a plurality of slot machines 10 and an external controller 621 (or a central controller 200) connected to the plurality of slot machines 10 such that the external controller 621 may perform data communication with the plurality of slot machines 10.

Each of the slot machines 10 includes a display unit 614, a player tracker system (PTS) terminal 700, a bet button 601, a spin button 602, a rendering unit 131, etc., and a game controller 100 controlling thereof. The slot machine 10 further includes a tranceiver 652 for data communication with the external controller 621.

The bet button 601 and the spin button 602 are input elements that operate by pushing or pressing of a player. The bet button 601 is configured to accept a bet amount, and the spin button 602 is configured to accept start of a game and to accept a player's skill stop action.

The display unit 614 displays still images related to a plurality of symbols used in gaming, numbers, or signs and moving images such as a rendering image. The display unit 614 includes a symbol display 614*a*, an image display 614*b*, and a common game display 614*c*. The symbol display 614*a* may include a plurality of actual or virtual reels (not shown) including a plurality of symbols thereon, and displays the symbols. The image display 614*b* displays a variety of images on rendering that is executed during a game in forms of mobile images or still images. The common game display 614*c* is adapted to display a common game such as a jackpot game, for example.

The game controller 100 includes a coin insertion/start check unit 603, a base game executing unit 605, a bonus game start determining unit 606, a bonus game executing unit 607, a random number generator 615, a symbol determining unit 612, a rendering random number generator 616, a rendering effect determining unit 613, a speaker 617, a lamp 618, a winning prize determining unit 619, and a payout unit 620.

The base game executing unit 605 is configured to execute a base game when the bet button 601 is operated. The bonus game start determining unit 606 determines whether or not to execute a bonus game based on an arrangement of symbols in a normal round of a base game. For example, when five or more scatter symbol are displayed in the symbol display 614*a*, the bonus game start determining unit 606 causes the bonus game executing unit 607 to execute a bonus game for a next round.

The bonus game executing unit 607 is configured to execute a bonus game in response to the operation of the spin button 602 without the operation of the bet button 601, the bonus game may be repeatedly executed by a predetermined number.

The symbol determining unit 612 is configured: to determine the arrangement of the symbols using random numbers from the random number generator 615; to arrange the symbols on the symbol display 614*a* of the display unit 614; to output the symbol arrangement information to the winning prize determining unit 619; and to output a signal to the rendering random number generator 616 to generate a random number for selecting a rendering mode based on the arrangement of the symbols.

The rendering random number generator 616 is configured: to generate a random number for rendering selection in response to the output from the symbol determining unit 612; and to output the generated random number to the rendering effect determining unit 613. The rendering effect determining unit 613 is configured: to determine the rendering mode with the use of the random number from the rendering random number generator 616; to output the determined rendering mode to the image display 614*b* of the display unit 614; and to output sound/lighting information of the determined rendering mode to the speaker 617 and the lamp 618.

The winning prize determining unit 619 is configured to determine the presence or absence of a winning prize based on the arrangement of the symbols displayed on the symbol display 614*a*; to calculate a payout amount based on the types of wins and betting amount; and to output a payout signal that informs of the payout amount to the payout unit 620. The payout unit 620 is configured to pay out the amount to a player in a form of a coin, a medal, a credit, or the like. In addition, the payout unit 620 is configured to add credit data based on a credit to be paid out to the credit that is stored in an IC card 500 inserted into a PTS terminal 700 to be described later.

Furthermore, the game controller 100 includes a storage 661 configured to store a variety of bet amount data. The storage 661 is a device configured to store data contained in a hard disk unit or a memory in a rewritable manner.

Furthermore, the game controller 100 includes a common game executing unit 653. The common game executing unit 653 is configured to output bet amount information that is based on a bet amount betted in a base game to the external controller 621 every time unit base game is played; to execute a common game by means of a game start command from the external controller 621; and to accept a BET input by means of the bet button 601 as to a bet amount that corresponds to data on a bet amount data for common game that can be betted in a common game.

The game controller 100 is connected to the PTS terminal 700. The PTS terminal 700 includes an LCD 719, microphones 704 and 705, and human body detecting cameras 712 and 713 or the like, which are integrated with each other. The PTS terminal 700 is configured to communicate with the game controller 100 to thereby perform rendering of a game, for example. In particular, a card insertion slot 706 is provided in the PTS terminal 700 so as to be able to insert an IC card 500. In this manner, a player inserts the IC card 500 into the card insertion slot 706 to thereby able to use a credit that is stored in the IC card 500 at a slot machine 10. A mechanical configuration of the PTS terminal 700 will be described later.

Moreover, the game controller 100 updates credit display of the display unit 614 when the credit controller has received credit data from the PTS terminal 700. Furthermore, the game controller 100 outputs liquidation credit data to the PTS terminal 700 in a case where a game liquidation has occurred.

In addition, the PTS terminal 700 included in a respective one of a plurality of slot machines 10 configuring a gaming machine 10 is connected to a management server 800 to enable communication therewith, and integrally performs image downloading or management of IC card 500 or credit.

(Functional Flow of Gaming Machine 300: External Control Device)

Referring to FIG. 17, the gaming machine 10 is connected to an external controller 621. The external controller 621 has a function of remotely operating and remotely monitoring an operating state of each slot machine 10 or a processing operation such as changing a variety of game setting values. Furthermore, the external controller 621 has a function of determining a common game start condition for each game terminal and then executing a common game in a plurality of slot machines 10 when a determination result satisfying the common game start condition has been obtained in any of the game terminals.

In a detailed description, the external controller 621 has a common game start unit 6213, a game terminal selecting unit 6215, and a tranceiver 6217 (not shown). The common game start determining unit 6213 has: a function of determining whether or not a common game start condition is established, based on a cumulative value of bet amount information that is transmitted from a slot machine 10 in each base game; a function of outputting a game start command to a plurality of slot machine 10; and a function of displaying a state that is established until the common game start condition has been established on a common display device 710.

Determination of whether or not the common game start condition is established may be made based on all of the cumulative values that are obtained by repetition of a unit base game as well as based on a cumulative value of bet amount information. For example, the number of base games or a base game playing time and the like may be a cumulative value.

Furthermore, the common game start unit 6213 has a function of outputting a game start command to a slot machine 10 in which a cumulative value increasing due to repetition of a base game satisfies a game execution condition. In this manner, the common game start unit 6213 enables a player to have a consciousness to actively repeat a base game because a qualification to participate in a common game is not provided to a slot machine 10 whose cumulative value is less than a minimum setting value.

Furthermore, the common game start unit 6213 has a function of monitoring a non-input time during which no start operation is made and then outputting a game start command to slot machines 10 other than a slot machine 10 whose non-input time is more than a timeout time. In this manner, the common game start unit 6213 is capable of determining that a player is absent as to a slot machine 10 in which no base game is executed over a timeout time or more, and is capable of avoiding execution of a common game for such a slot machine 10.

The game terminal selecting unit 6215 has a function of selecting a specific slot machine 10 from among a plurality of slot machines 10 and then outputting a common game start command signal to the specific slot machine 10. The tranceiver 6217 has a function enabling transmission/reception of data to/from the slot machine 10.

(Entire Configuration of Game System)

A game system 350 that includes gaming machines 300 having the respective functions described above will be described hereinafter.

As shown in FIG. 18, the game system 350 includes a plurality of slot machines 10 and an external controller 621 that is connected to each of the slot machines 10 via a communication line 301.

The external controller 621 is configured to control a plurality of slot machines 10. In the embodiment, the external controller 621 is a so called hall server that is installed in a gaming facility having a plurality of slot machines 10. Each of the slot machines 10 has its own identification number assigned thereto, and the external controller 621 determines a source of data to be transmitted from each of the slot machines 10, in accordance with the assigned identification number. In addition, in a case where data is transmitted from the external controller 621 to a slot machine 10 as well, a transmission destination is specified with the use of the assigned identification number.

The game system 350 may be constructed in one gaming facility that is capable of performing a variety of games, such as a casino, or may be constructed across a plurality of gaming facilities. In a case where the game system 350 is constructed in one gaming facility, the game system may be constructed every floor or every section in the gaming facility. The communication line 301 may be wired or wireless, and a leased line or a switched line and the like can be employed.

As shown in FIG. 19, the game system is divided into three sections, i.e. a management server block, a customer terminal block, and a staff terminal block. The management server block has a casino hall server 850, a money exchange server 860, a casino/hotel staff management server 870, and a download server 880.

The casino hall sever 850 is a server configured to manage an entire casino hall in which slot machines 10 have been installed. The money exchange server 860 is a server configured to prepare money exchange rate data based on money exchange information. The casino/hotel staff management server 870 is a server configured to manage staffs in a casino hall or a hotel associated with the casino hall. The download server 880 is a server configured to download information relating to games or the latest information such as news and then broadcast the downloaded information to players through the PTS terminals 700 of a variety of slot machines 10.

In addition, the management server block has a member management server 810, an IC card & money management server 820, a megabucks server 830, and an image server 840.

The member management server 810 is a server configured to manage members information on a player who plays a game at a slot machine 10. The IC card & money management server 820 is a server configured to manage an IC card 500 used in a slot machine 10. Specifically, the IC card & money management server 820 is a server configured to store fraction money data to be associated with an identification code or to output the fraction money data to the PTS terminal 700. The IC card & money management server 820 is also configured to prepare and manage denomination data or the like. The megabucks server 830 is a server configured to manage megabucks serving as games in which a total amount of betted money in a plurality of slot machines 10 installed in a plurality of casino hall is determined as a prize. The image server 840 is a server configured to download an image relating to a game or a latest image such as news, for example, and then, broadcast the downloaded image to players through the PTS terminal 700 of a variety of slot machines 10.

The customer terminal block has a slot machine 10, a PTS terminal 700, and a liquidation machine 750. The PTS terminal 700 can be mounted on the slot machine 10 and can communicate with the management server 800. The liquidation machine 750 is a machine configured to cash out and liquidate money data that is stored in an IC card 500 that a player owns or to store a coin or a bill as money data in the IC card 500.

The staff terminal block has a staff management terminal 900 and a member card issuing terminal 950. The staff management terminal 900 is a terminal for staffs in a casino hall to manage a variety of slot machines 10. In particular, in the case of the embodiment, the staffs in a casino hall manage whether too many IC cards 500 are stocked in the PTS terminal 700 or the number of IC cards 500 is insufficient. The member card issuing terminal 950 is a terminal for a player who plays a game in a casino hall to use when issuing a member card.

(PTS Terminal 700)

A PTS terminal 700, as shown in FIG. 20, is incorporated in a PTS system. The PTS terminal 700 that is mounted on a slot machine 10 is connected to a game controller 100 and a bill validator controller 890 of the slot machine 10 to enable communication therewith.

The PTS terminal 700 performs rendering of a game by means of sound or image and the like or updating of credit data in communication with the game controller 100. In addition, the PTS terminal 700 transmits credit data required for liquidation in communication with the bill validator controller 890.

In addition, the PTS terminal 700 is connected to a management server 800 to enable communication therewith. The PTS terminal 700 communicates with the management server 800 between two lines, i.e., between a general communication line and an additional function communication line.

The PTS terminal 700 makes communication of data such as money data or identification code data or members information on players, for example, in the general communication line. On the other hand, the PTS terminal 700 makes communication relating to functions to be newly added in the additional function communication line. In the case of the embodiment, the PTS terminal 700 makes communication relating to an exchange function, an IC card function, a biological authentication function, a camera function, or an RFID (Radio Frequency IDentification) function serving as a function of making solid identification with the use of radio waves.

(Mechanical Configuration of Slot Machine)

An exemplary structure of the slot machine 10 that includes elements other than those above listed is shown in FIG. 21, but the structure of the slot machine 10 is not limited thereto.

Referring to FIG. 21, the slot machine 10 includes a cabinet 11, a top box 12, a main door 13, a primary display (or first display) 141, a secondary display (or second display) 142, a PTS terminal (sometimes third display) 700, and a control panel 30.

The primary display 141 includes a display window DW that shows a plurality of reels RL. Each of the reels RL may include a plurality of symbols thereon. Each symbol may be one of, for example, "BAR," "DOUBLE BAR," "TRIPLE BAR," "BLUE 7," "RED 7," a scatter symbol (denoted by "BONUS"), a wild symbol (denoted by "X2"), and other symbols like "CHERRY," etc.

Figure 23:
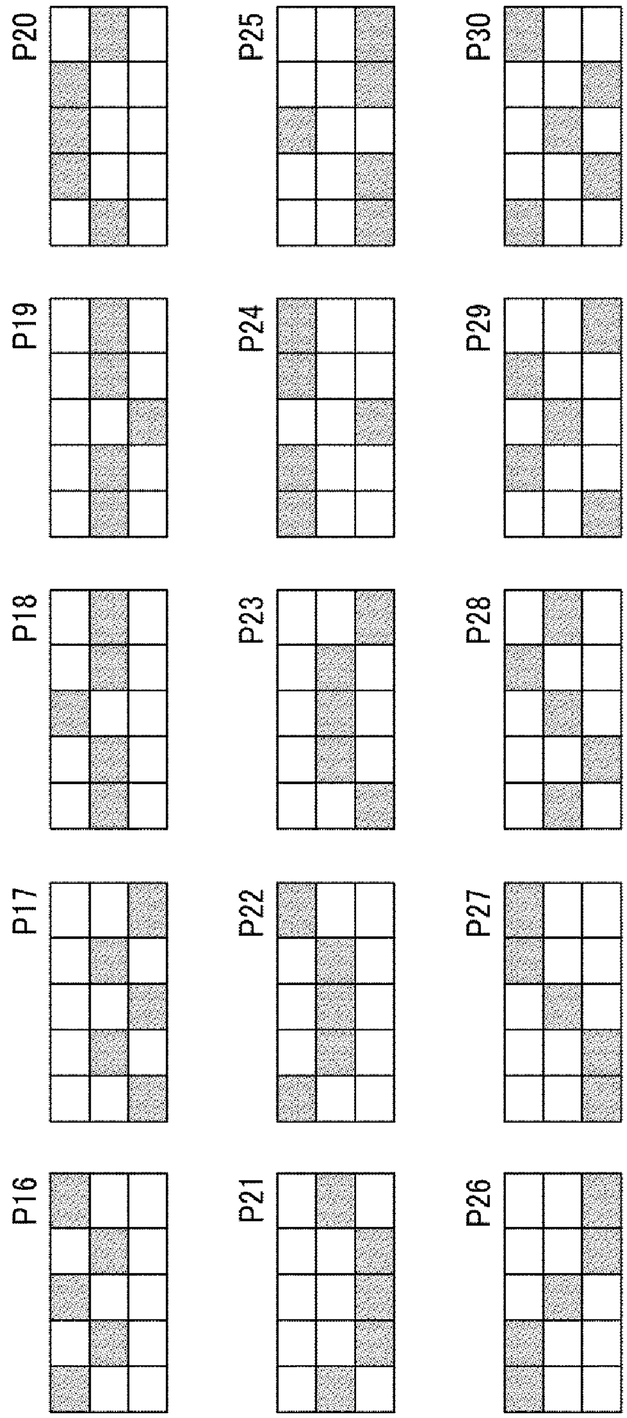

Referring to FIG. 22 and FIG. 23, a payline that is configured to establish a winning combination of the symbols is provided on the display window 500. The payline may connect five display blocks 28, one display block 28 per column, may be drawn. The payline may be, for example, one of thirty paylines PL1-PL30. An exemplary play line P1, P2 or P3 shown in FIG. 22 connects five blocks in the second, first, or third row, respectively, and another exemplary payline P11 shown in FIG. 22 connects four lower blocks in the first, second, fourth, and fifth columns and a middle block in the third column. Another exemplary payline P21 shown in FIG. 23 connects lower blocks in the second, third, and fourth columns and middle blocks in the first and fifth columns at the second row.

The number of the paylines may be two or more.

The primary display 141 may also display a variety of game-related information or images as required.

The video reels 411-415 of the primary display 141 may be substituted with mechanical reels.

Referring to FIG. 21 again, the primary display 141 may be disposed on an upper part of the main door 13 that may be provided on a front surface of the cabinet 11, and may include an LCD panel or an OLED panel. The primary display 141 may include a touch screen panel that enables a player to interact with the slot machine 10 by touching areas on a screen.

The secondary display 142 displays images related to free game information. The secondary display 142 may be disposed on a front surface of the top box that may be provided on the cabinet 11, and may include a display panel, for example, a liquid crystal display (LCD) panel or an organic light emitting display (OLED). The secondary display 142 may also display a variety of game-related information or images as required.

Figure 24:
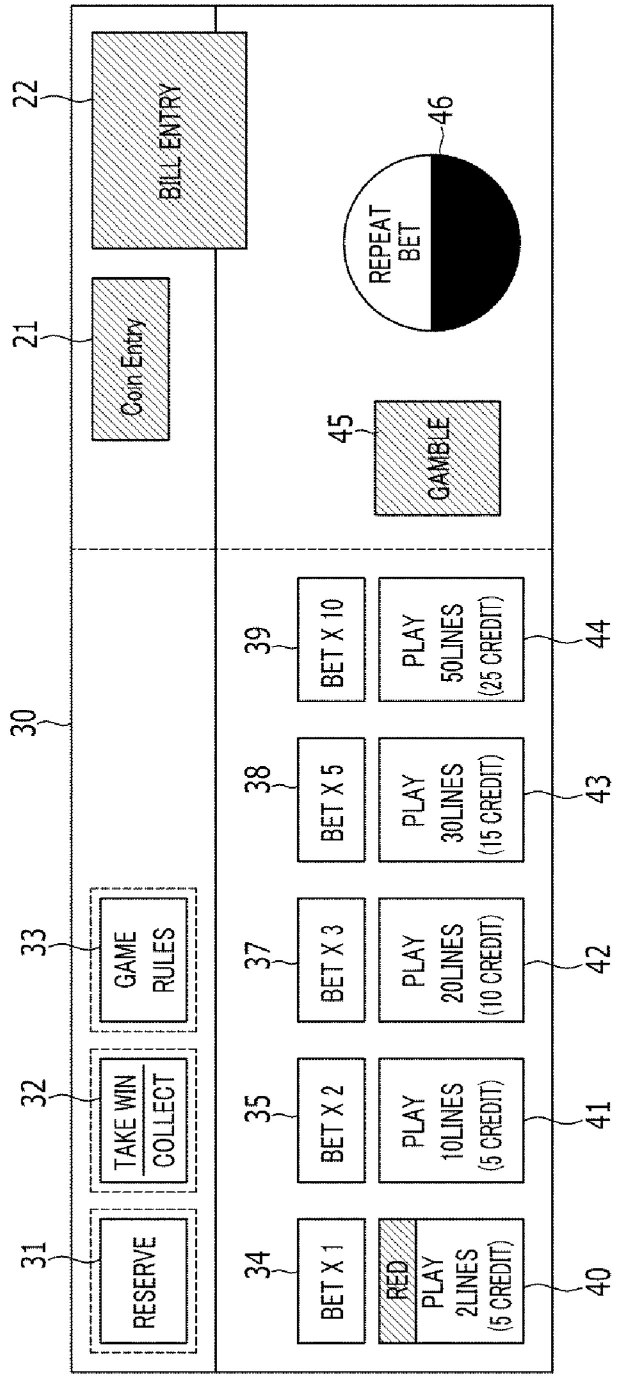
FIG. 24 is a layout view of an exemplary control panel.

Referring to FIG. 21 and FIG. 24, the control panel 30 includes a plurality of buttons 31-44, a coin entry 21, and a bill entry 22, and may be disposed below the primary display 141.

The plurality of buttons 31-44 may include a reserve button 31, a take win button (or collect button) 32, and a game-rules button (or help button) 33 that may be disposed on an upper stage of a left area of the control panel 30. The plurality of buttons 31-44 may further include a plurality of m-bet buttons (m=1, 2, 3, 5, 10) (or bet×n buttons) 34-39 and a plurality of n-LINE buttons (n=2, 10, 20, 30, 50) 40-45 that may be disposed at a lower stage of in a left area. The plurality of buttons 31-44 may further include a gamble button 45 and a start button (or repeat button) 46 that may be disposed right to the m-bet buttons 34-39. The coin entry 21 and the bill entry 22 may be disposed at a right unit of the control panel 30.

The reserve button 31 may be an operating button to be used when a player wants to leave a seat or when a player wants to request the staffs in a gaming facility to exchange money. The take win button 32 may be a cash-out button used to add the credit data relating to credits obtained in a variety of games to the credit data that is stored in the smart card or output the bill or the ticket corresponding to the total credits. The help button 33 may be a button to be used when a user does not clearly understand how to play a game or the like, and when the help button 33 is pressed, a variety of help information including game rules may be displayed on the primary display 141.

The 1-bet button 34 may be a button to be used when player's current credits are betted on a one-by-one basis for each winning payline every time the button is pressed. In this embodiment, an amount of 1 BET may correspond to 30 credits. The m-bet button (m>1) 35-39 may be a button for starting a game in m BETs for each winning payline. Therefore, a bet amount to for winning paylines may be determined by pressing any one of the m-bet button 34-39. If the player bets N BETs by pressing the N-bet button 34-39, default credits (for example 30 credits) of the winning paylines may be multiplied by N such that the multiplied credits are awarded to the player. Furthermore, the player can bet (N+M) BETs by pressing the N-bet button 34-39 and the M-bet button 34-39 in sequence. At this time, the slot machine 10 may restrict an upper limit of the bet amount.

The n-LINE buttons 40-45 may be used for determining the number of paylines.

The spin button 46 may be an operating button to be used when scrolling symbols in a game and when starting a rotation of a selection wheel in a bonus game.

The coin entry 21 may be configured to accept the coin in the cabinet 11. The bill entry 22 may be configured to validate whether the entered bill is legitimate or not and to accept a legitimate bill in the cabinet 11. Moreover, the bill entry 22 may accept the ticket having the barcode.

The PTS terminal 700 displays a variety of information on the games, and may be provided below the primary display 141.

Figure 25:
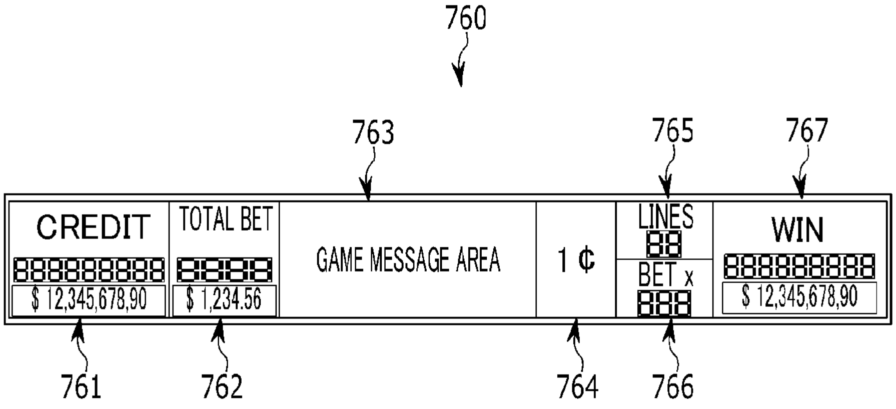
FIG. 25 is a front view of an exemplary PTS terminal.

Referring to FIG. 25, a PTS terminal 700 includes a credit meter 161, a total bet meter 162, a game message area 163, a denomination information area 164, a line count information area 165, a bet multiplication information area 166, and a win meter 167.

The credit meter 161 shows a player's current credits. The total bet meter 162 shows a bet amount in a current unit game, and the bet amount may be represented by the credits. The denomination information area 164 shows a current denomination. The line count information area 165 shows the number of chosen lines, and the bet multiplication information area 166 shows the number of BETs. The win meter 167 shows a payout value of credits at a winning combination.

The game message area 163 shows messages related to the game in one or more lines. For example, when a game is over, there may be no message in the game message area 163. When the reels are spinning, a message like "GOOD LUCK!" may be shown in the game message area 163, and when a win case occurs, a message like "SCATTER WIN=40," "LINE 22 WIN=80," "LINE 19 WIN×4=320," "GOLD PRIZE WIN=15300," and "LINE 22 WIN=80; TOTAL WIN=200."

In a free game, the game message area 163 show a message indicating that a current game is a free game, for example, "BONUS GAME REELS IN PLAY" that may be always shown in the first line during the free game. The game message area 163 may also show a message indicating the total number of the free games and the serial number of the current free game, for example, "FREE GAME xx OF xx."

In addition, a warning message, for example, "LOOK UP!" may be shown in the game message area 163. When a game is over, the game message area 163 may show a message to ask whether to continue a game or not, for example, "PLAY ON GAMBLE OR TAKE WIN." The game message area 163 may also shows a message indicating various features, for example, "RETRIGGER," "BIG GOLD BONUS," etc.

The slot machine 10 may further include a ticket printer provided below the primary display 141. The ticket printer may print, on a ticket, a barcode having encoded data containing credit-value, date and time, identification number of a slot machine 10, or the like, and issues the ticket having the barcode printed thereon. A player can play another gaming machine using the ticket with the barcode, or exchange the ticket for bills or the like at a change booth or the like of the game arcade.

The slot machine 10 further includes a speaker 112 for outputting sound effects and a lamp 111 for lighting effects.

(Electronic Configuration of Slot Machine)

Figure 26:
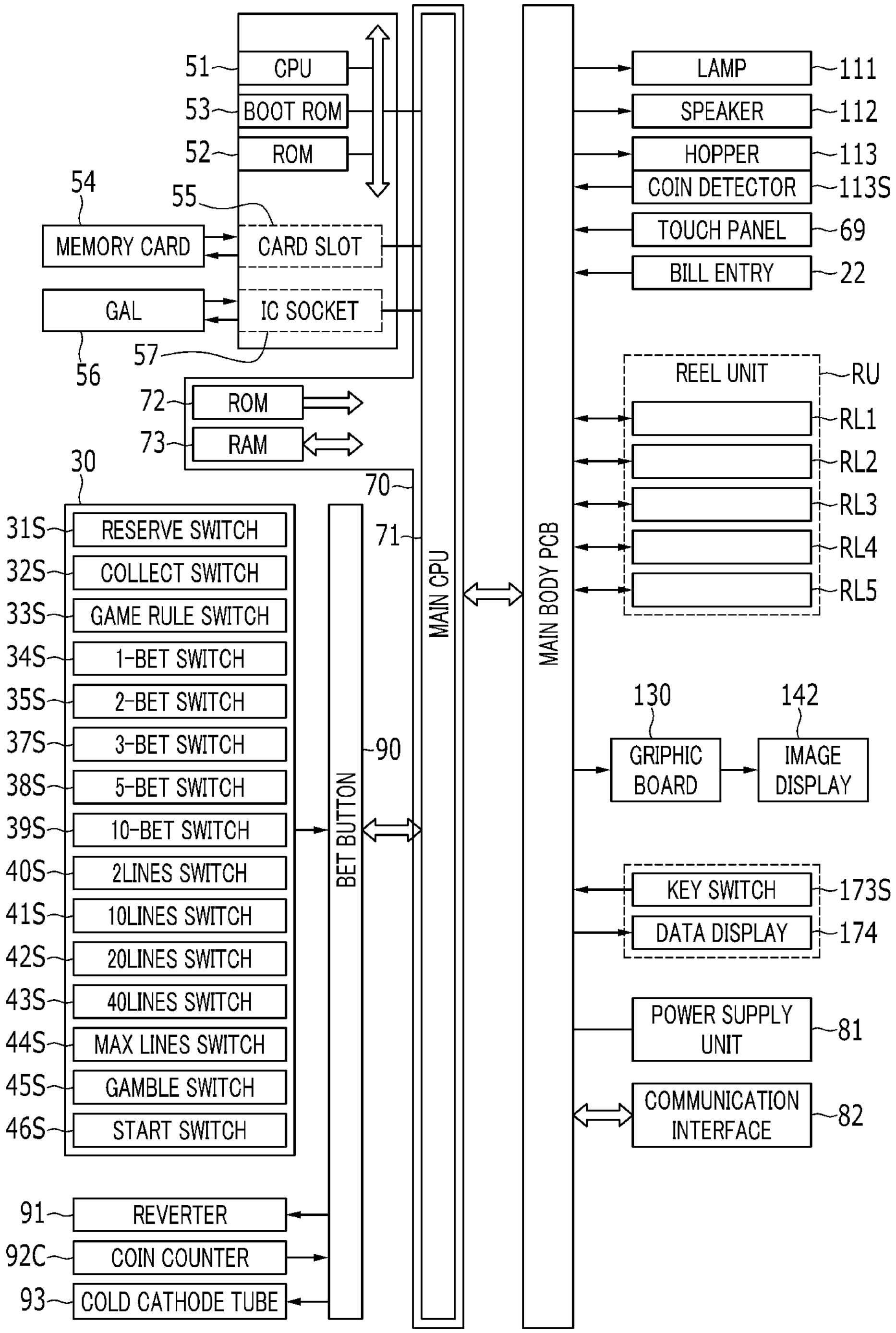
FIG. 26 is an electrical block diagram of a slot machine.

Next, a configuration of a circuit included in a slot machine 10 will be described with reference to FIG. 26.

A gaming board 50 includes: a CPU 51, a ROM 52, and a boot ROM 53 that are interconnected by means of an internal bus; a card slot 55 that corresponds to a memory car 54; and an IC socket 57 that corresponds to a GAL (Generic Array Logic) 56.

The memory card 54 is made of a nonvolatile memory, and stores game programs and game system programs. The game programs include a program relating to the progress of a game and a program for executing rendering by means of image or sound. In addition, the game programs include a symbol determination program. The symbol determination program is a program for determining symbols to be rearranged as symbols.

In addition, the game programs include: symbol table data for normal game indicating a correlation between each symbol of each symbol array in a display block, a code No., a random numeric value; a symbol table data for bonus game indicating a symbol table for bonus game indicating a correlation between each symbol of each symbol table in a display block, code No., and a random numeric value; a symbol No. determination table data indicating a symbol array determination table; a code No. determination table data indicating a symbol array determination table; a wild symbol increment determination table indicating a wild symbol increment determination table; a trigger symbol increment determination table data indicating a trigger symbol increment determination table; and odds data indicating a correlation between types and the number of symbols that are rearranged on a payline and a prize amount or the like.

In addition, the card slot 55 is configured to be able to insert or removing a memory card 54, and is connected to a motherboard 70 by means of an IDE bus. Therefore, the memory card 54 is removed from the card slot 53S, another game program is written in the memory card 54, and then, the memory card 54 is inserted into a card slot 53S, whereby types or contents of games to be played in a slot machine 10 can be changed.

The GAL 56 is one kind of PLD (Programmable Logic Device) having an OR-fixed type array structure. The GAL 56 includes a plurality of input ports and output ports, and outputs corresponding data from an output port if a predetermined input occurs in an input port.

In addition, the IC socket 57 is configured to be able to mount or remove the GAL 56, and is connected to the motherboard 70 by means of a PCI bus. The memory card 54 is replaced with another one in which another program is written, or alternatively, the program that is written in the memory card 54 is rewritten into another one, whereby the contents of a play to be played in a slot machine 10 can be changed.

The CPU 51, the ROM 52, and the boot ROM 53 that are interconnected by means of the internal bus are connected to the motherboard 70 by means of the PCI bus. The PCI bus transmits a signal between the motherboard 70 and the gaming board 50, and supplies electric power from the motherboard 70 to the gaming board 50.

An authentication program is stored in the ROM 52. A preliminary authentication program and a program (a boot code) for the CPU 51 to start up the preliminary authentication program or the like are stored in the boot ROM 53.

The authentication program is a program (tampering check program) for authenticating a game program and a game system program. The preliminary authentication program is a program for authenticating the authentication program described above. The authentication program and the preliminary authentication program are described along a procedure (an authentication procedure) for authenticating the fact that a target program is not tampered.

The motherboard 70 is configured using a commercially available general purpose motherboard (a printed wiring board implementing basic parts of a personal computer), and includes a main CPU 71, a ROM (Read Only Memory) 72, a RAM (RANDOM Access Memory) 73, and a communication interface 82. The motherboard 70 is equivalent to a game controller 100 in the embodiment.

The ROM 72 is made of a memory device such as a flash memory, and stores programs such as a BIOS (a Basic Input/Output System) to be executed by means of the main CPU 71 and permanent data. When the BIOS is executed by means of the main CPU 71, initialization processing of predetermined peripheral devices is performed. In addition, acquisition processing of the game programs and game system programs that are stored in the memory card 54 is started via the gaming board 50. In the present invention, the ROM 72 may be the one of which the contents are rewritable or are not rewritable.

The RAM 73 stores data employed when the main CPU 71 operates or programs such as a symbol determination program. For example, when the acquisition processing of the game programs and game system programs or authentication program described previously has been performed, these programs can be stored. In addition, a work region for executing the programs described above is provided in the RAM 73. For example, there are provided a region for storing a counter managing the number of games played, the number of BETs, the number of payouts, or the number of credits, for example, or a region for storing symbols (code numbers) that are determined by means of lottery.

The communication interface 82 is configured to make communication with an external control device 621 such as a server via a communication line 301. In addition, a door PCB (Printed Circuit Board) 90 and a main PCB 110 to be described later are respectively connected to the motherboard 70 by means of a USB. In addition, a power unit 81 is connected to the motherboard 70. Further, a PTS terminal 700 is connected to the motherboard 70 by means of the USB.

When electric power is supplied from the power unit 81 to the motherboard 70, the main CPU 71 of the motherboard 70 is started up, and electric power is supplied to the gaming board 50 via the PCI bus and then the CPU 51 is started up.

Input devices such as switches or sensors or peripheral devices whose operations are controlled by means of the main CPU 71 are respectively connected to the door PCB 90 and the main PCB 110.

A control panel 30, a reverter 91, a coin counter 92C, and a cold cathode-ray tube 93 are respectively connected to the door PCB 90.

On the control panel 30, in association with the respective buttons described previously, there are provided: a reserve switch 31S; a collect switch 32S; a game rule switch 33S; a 1-BET switch 34S; a 2-BETS switch 35S; a 3-BETS switch 37S; a 5-BETS switch 38S; a 10-BETS switch 39S; a PLAY 2 LINES switch 40S; a PLAY 10 LINES switch 41S; a PLAY 20 LINES switch 42S; a PLAY 40 LINES switch 43S; a MAX LINES switch 44S; a gamble switch 45S; and a start switch 46S. Each switch detects that a corresponding button has been pressed by a player, and outputs a signal to the main CPU 71.

The reverter 91 and the coin counter 92C are provided inside of the coin entry 36. Then, the reverter 91 identifies whether or not a coin inserted into the coin entry 36 is legitimate, and ejects a coin other than a legitimate coin from a coin payout exit. In addition, the coin counter 92C detects the accepted legitimate coins and counts the number of these coins.

The reverter 91 operates based on a control signal that is output from the main CPU 71, and distributes the legitimate coins that are screened by the coin counter 92C into a hopper 113 or a cashbox (not shown). In a case where the holler 113 is not filled with coins, they are distributed to the hopper 113, or alternatively, in a case where the hopper 113 is filled with coins, they are distributed to the cashbox.

The cold cathode-ray tube 93 functions as a backlight that is installed at a rear face side of an secondary display 142, and lights based on a control signal that is output from the main CPU 71.

A lamp 111, a speaker 112, a hopper 113, a coin detecting unit 113S, a bill entry 22, a graphic board 130, a key switch 173S, and a data display 174 are connected to the main PCB 110.

The speaker 112 outputs a sound such as BGM based on a control signal that is output from the main CPU 71.

The hopper 113 operates based on a control signal that is output from the main CPU 71 and then pays out coins whose payout number is specified from the coin payout exit to a coin tray, although not shown. The coin detecting unit 113S detects the coins to be paid out by means of the hopper 113 and then outputs a signal to the main CPU 71.

A touch panel may be provided on a front face of the primary display 141. The touch panel detects a position that touched by a player's finger and then outputs a signal that corresponds to the detected position to the main CPU 71.

The bill entry 22 is configured to identify whether or not a bill is legitimate and accept a legitimate bill in the cabinet 11. Then, the bill entered in the cabinet 11 is converted to the number of coins, and credits equivalent to the number of coins converted are added as the player owned credits.

The graphic board 130 controls an image to be displayed by means of the lamp 111 and the primary display 141, based on a control signal that is output from the main CPU 71. The graphic board 130 includes a VDP (a Video Display Processor) configured to generate image data or a video RAM configured to store the image data that is generated by means of the VDP. The image data employed when the image data is generated by means of the VDP is included in the game programs that are read out from the memory card 54 and are stored in the RAM 73.

The graphic board 130 includes a VDP (a Video Display Processor) configured to generate image data, based on a control signal that is output from the main CPU 71, or a video RAM or the like configured to temporarily store the image data that is generated by means of the VDP. The image data employed when the image data is generated by means of the VDP is included in the game programs that are read out from the memory card 54 and are stored in the RAM 73.

The key switch 173S is provided in a keypad 173, and when the keypad 173 is operated by a player, a predetermined signal is output to the main CPU 71.

The data display 174 displays the data that a card reader 172 has read based on a control signal that is output from the main CPU 71 or the data that is input by a player via the keypad 173.

During the execution of the normal round and the free round with the rendering process, the slot machine 10 displays a variety of images and actions on the displays 141 and 142 the PTS terminal 710, embodiments of which is described in detail.

A primary display, i.e., a reel unit reel device RU is connected to the main PCB 110 described above. The reel unit RU may have five reels, i.e., first to fifth reel units RL1 to RL5.

Figure 27:
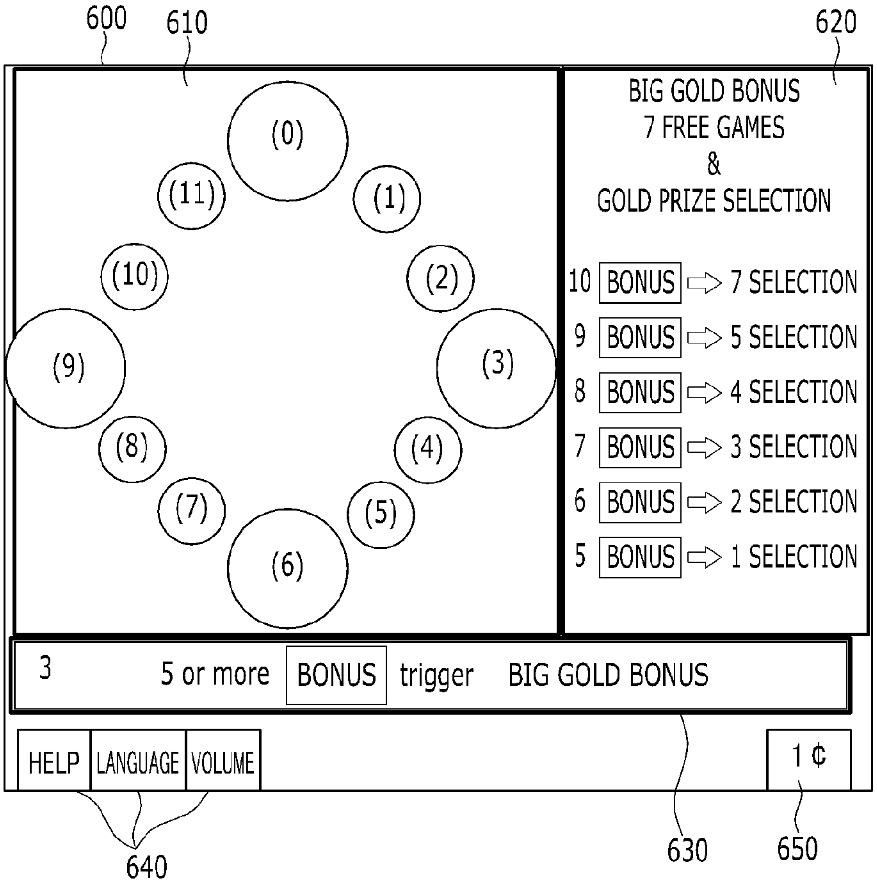
FIG. 27 is a screen image displayed by the secondary display according to an embodiment of the present invention.

FIG. 27 is a screen image displayed by the secondary display according to an embodiment of the present invention.

The secondary display 142 shown in FIG. 1 may display a main window shown in FIG. 27 a normal round. The main window may include a plurality of areas A1, A2, A3, A4 and A5 that show images related to a free round.

A first area A1 shows a selection wheel related to an additional prize in a free round. The wheel may include a plurality of selection zones in shapes of large and small circles (0)-(11), and the circles (0)-(11) may be denoted by respective prize amounts. The large circles (0), (3), (6), (9) may be denoted by large prize amount, and the small circles (1), (2), (4), (5), (7), (8), (10), (11) may be denoted by small prize amount. The prize amount written in each circle (0)-(11) may be may depend on the BET amount. When a scatter symbol is shown in a free round, one of the circles (0)-(11) is selected, and the player may win the prize amount written in the selected circle. In FIG. 27, the number of the circles (0)-(11) in the wheel may be twelve, but it is not limited thereto.

The first area A1 may further show a title of the selection wheel, for example, "GOLD PRIZE SELECTION."

A second area A2 may show a title and contents of a bonus providing free rounds and additional prizes, for example, "BIG GOLD BONUS," and "7 FREE ROUNDS & GOLD PRIZE SELECTION." The second area A2 may further show the number of selections determined by the number of the scatter symbols shown in a base game. For example, if the number of the scatter symbols is 5, 6, 7, 8, 9 or 10, the number of the selections may be 1, 2, 3, 4, 5, or 7, respectively. Therefore, when seven scatter symbols occur in a free round, the selection of the selection wheel is executed three times.

A third area A3 may show a message related to the bonus, for example, "5 or more BONUS trigger BIG GOLD BONUS."

A fourth area A4 may show a plurality of buttons such as "HELP," "LANGUAGE," and "VOLUME," and a fifth area A5 may show denomination.

(Win Plate)

Next, screen images for a win case displayed in the primary display 141 in a normal round or a free round according to an embodiment of the present invention is described with reference to FIG. 28 to FIG. 32.

Figure 28:
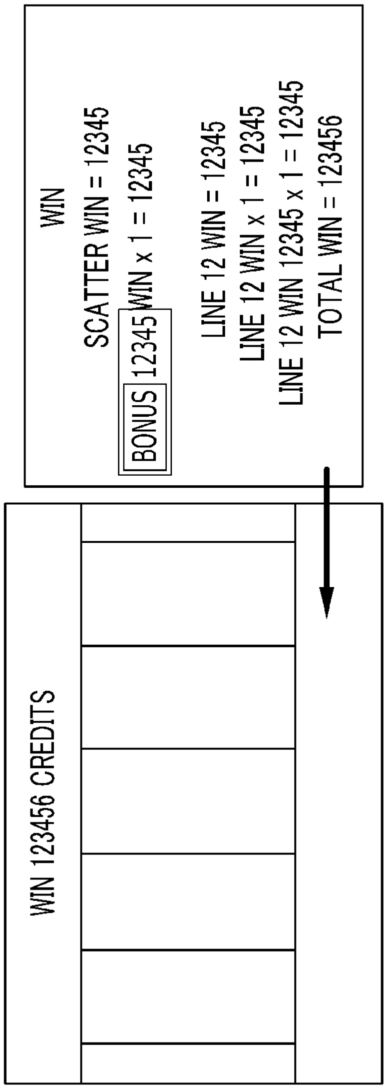
FIG. 28 is a schematic screen image that illustrates a schematic win plate shown in a primary display according to an embodiment of the present invention.

FIG. 28 is a schematic screen image that illustrates a schematic win plate shown in a primary display according to an embodiment of the present invention, and FIG. 29 to FIG. 32 are schematic screen images showing various win actions, which is shown on the primary display.

Referring to FIG. 28, when a win case occurs, a win plate including an upper area, a middle area, and a lower area arranged in sequence from the top to the bottom may be shown in a primary display (141 of FIG. 12). The middle area shows a plurality of symbols. The upper area shows a win prize amount obtained by the win case, and the lower area shows win information.

Figure 29:
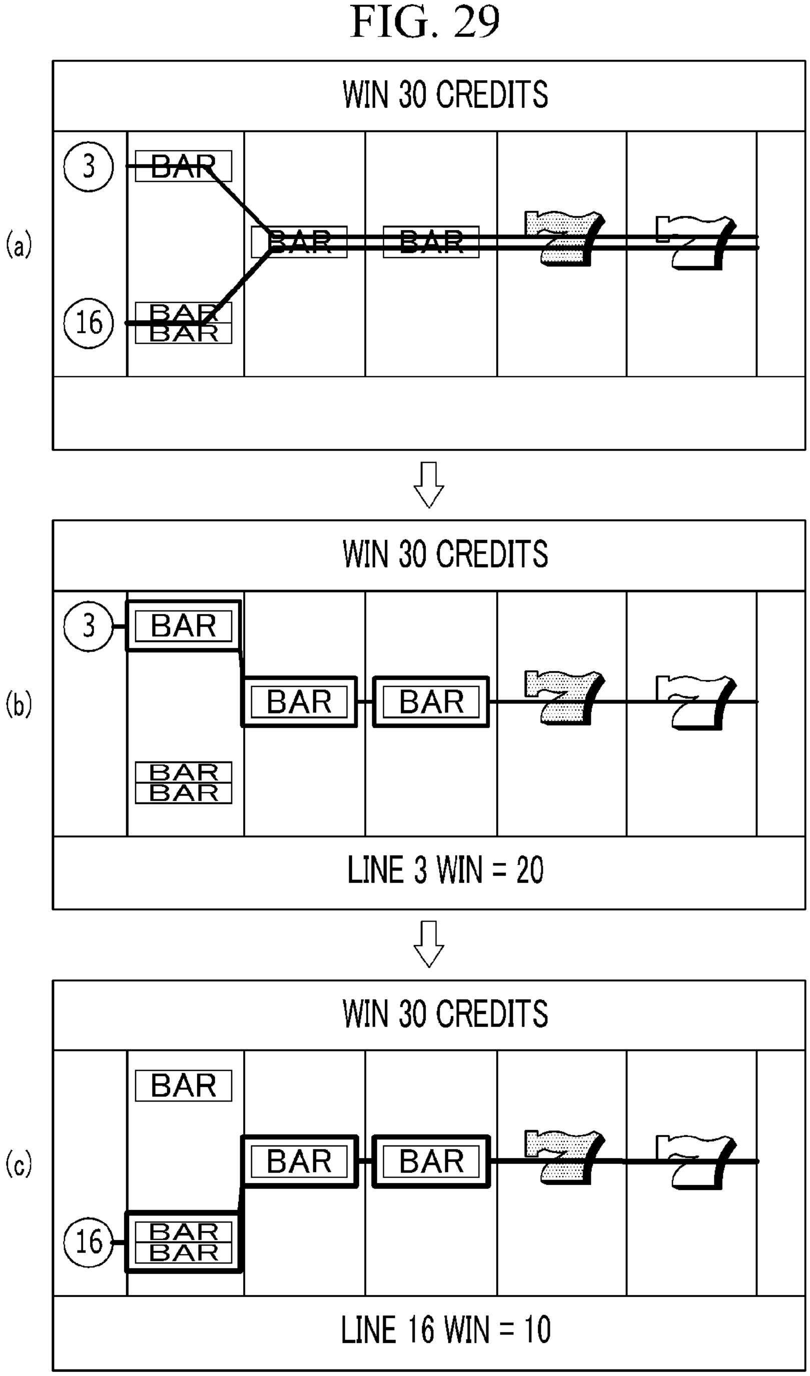
FIG. 29 to FIG. 32 are schematic screen images showing various win actions, which is shown on the primary display.

For example, referring to FIG. 29, when a win case having a plurality of line wins with, for example, pay lines 3 and 16 occurs in a normal round, the pay lines 3 and 16 may be shown and highlighted in the middle area for a predetermined time and the credit number of the win is shown in the upper area. Thereafter, in the middle area, boundaries of one (for example, the pay line 3) of the pay lines 3 and 16 may be highlighted and the symbols related to the pay line 3 flash on and off, and corresponding win information may be shown in the lower area. Next, in the middle area, the boundaries of the next pay line, for example, the pay line 16 may be highlighted and the symbols related thereto flash on and off, and corresponding win information may be shown in the lower area.

Figure 30:
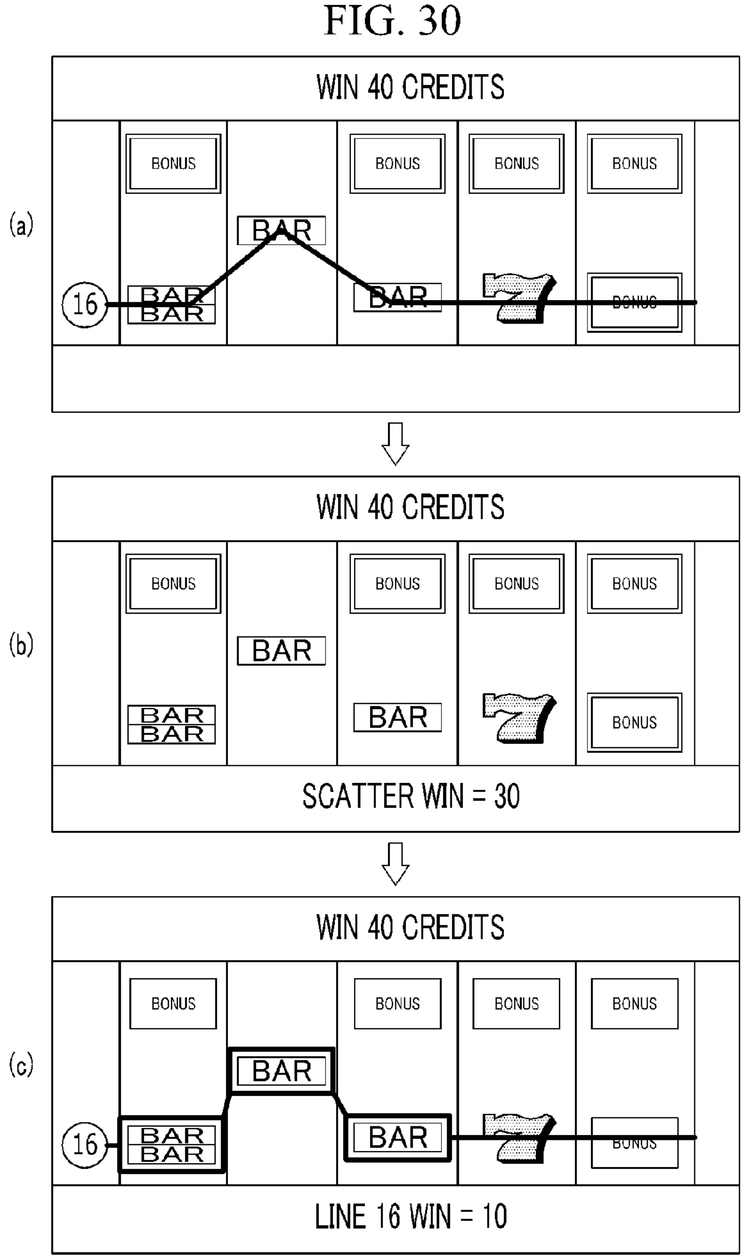

Referring to FIG. 30, when a win case having a scatter win and a line win with, for example, a pay line 16 occurs, both the scatter win and the line win may be shown and highlighted in the middle area for a predetermined time and the credit number of the win is shown in the upper area. Thereafter, in the middle area, boundaries of the symbols related to the scatter win may be highlighted and the symbols flash on and off, and win information related to the scatter win may be shown in the lower area. Next, in the middle area, the boundaries of the pay line 16 may be highlighted and the symbols related to the pay line 16 flash on and off, and win information may related to the line win be shown in the lower area.

Figure 31:
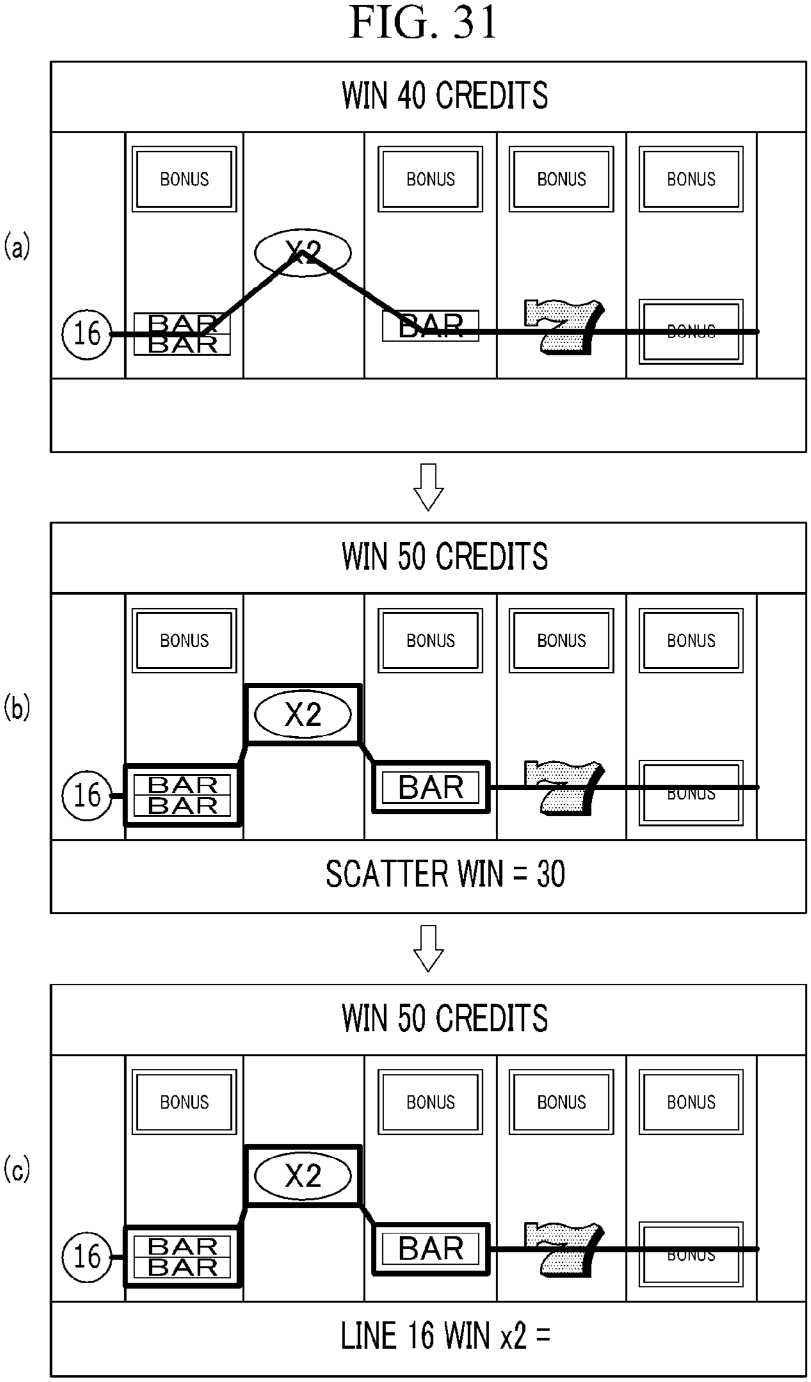

Referring to FIG. 31, when a win case having a scatter win and a doubled line win with, for example, a pay line 16 occurs, the action may be substantially the same as FIG. 30. In detail, both the scatter win and the line win may be shown and highlighted in the middle area for a predetermined time and the credit number of the win is shown in the upper area. Thereafter, in the middle area, boundaries of the symbols related to the scatter win may be highlighted and the symbols flash on and off, and win information related to the scatter win may be shown in the lower area. Next, in the middle area, the boundaries of the pay line 16 may be highlighted and the symbols related to the pay line 16 flash on and off, and win information related to the doubled line win may be shown in the lower area.

Figure 32:
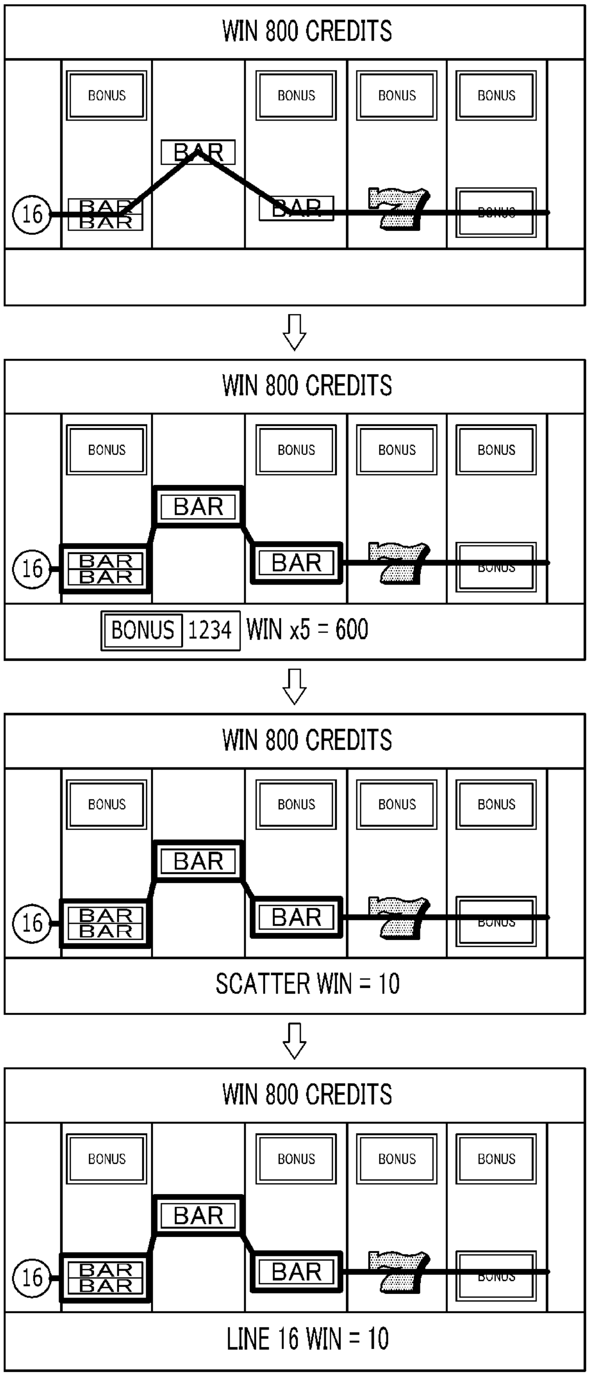

Referring to FIG. 32, when a win case having a scatter win and a line win with, for example, a pay line 16 occurs in a free round, the action may be substantially the same as FIG. 30. In detail, both the scatter win and the line win may be shown and highlighted in the middle area for a predetermined time and the credit number of the win is shown in the upper area. Thereafter, in the middle area, boundaries of the symbols related to the scatter win may be highlighted and the symbols flash on and off, and win information related to the scatter win may be shown in the lower area. Next, in the middle area, the boundaries of the pay line 16 may be highlighted and the symbols related to the pay line 16 flash on and off, and win information may related to the line win be shown in the lower area.

The above-described action shown in FIG. 29 to FIG. 32 may repeat from the occurrence of the win before the next game starts. However, the action may stop when a take win button, a BET button, or a spin button is pressed, or a coin or a bill is inserted.

Next, screen images for various states of a slot machine are described with reference to FIG. 33 to FIG. 42.

Figure 33:
FIG. 33 is still screen images for a free round shown in primary and secondary displays and in a PTS terminal of a game machine according to an embodiment of the present invention.
Figure 34:
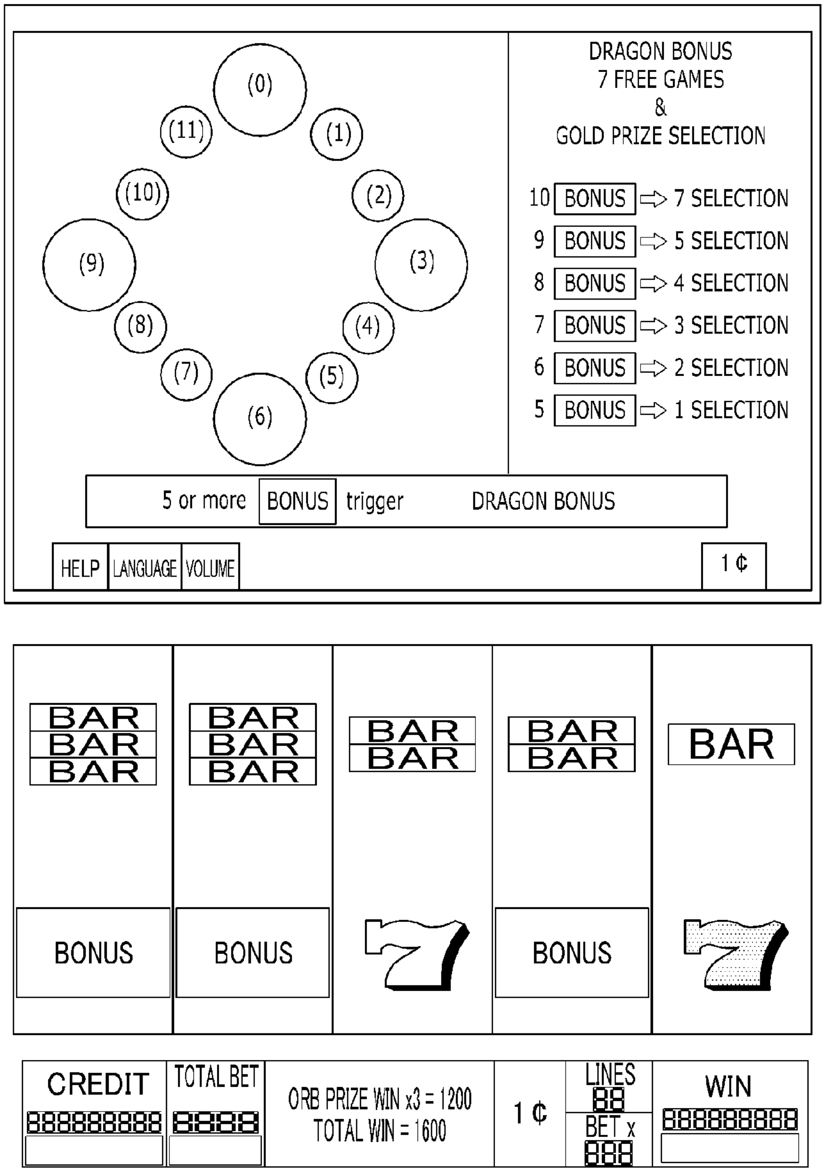
FIG. 34 is still screen images for a normal round shown in primary and secondary displays, and a PTS terminal according to an embodiment of the present invention.

FIG. 33 is still screen images for a free round shown in primary and secondary displays and in a PTS terminal of a game machine according to an embodiment of the present invention, and FIG. 34 is still screen images for a normal round shown in primary and secondary displays, and a PTS terminal according to an embodiment of the present invention.

In FIG. 33 and FIG. 34 and following figures, the images of the primary and secondary displays 141 and 142 and in the PTS terminal 700 are arranged in sequence from top to bottom.

Referring to FIG. 33 and FIG. 34, the primary display 141 displays a display window for a free round that is substantially the same as that in a normal round. However, the background color or the color of the symbols for the free round may be different from those for the normal round.

The secondary display 142 may display a main window for the free round, which is different from that in the normal round.

The PTS terminal 700 may display the values regardless of the type of the game.

FIG. 33 further shows a small window showing a win plate for total win after executing a last free round.

Figure 35:
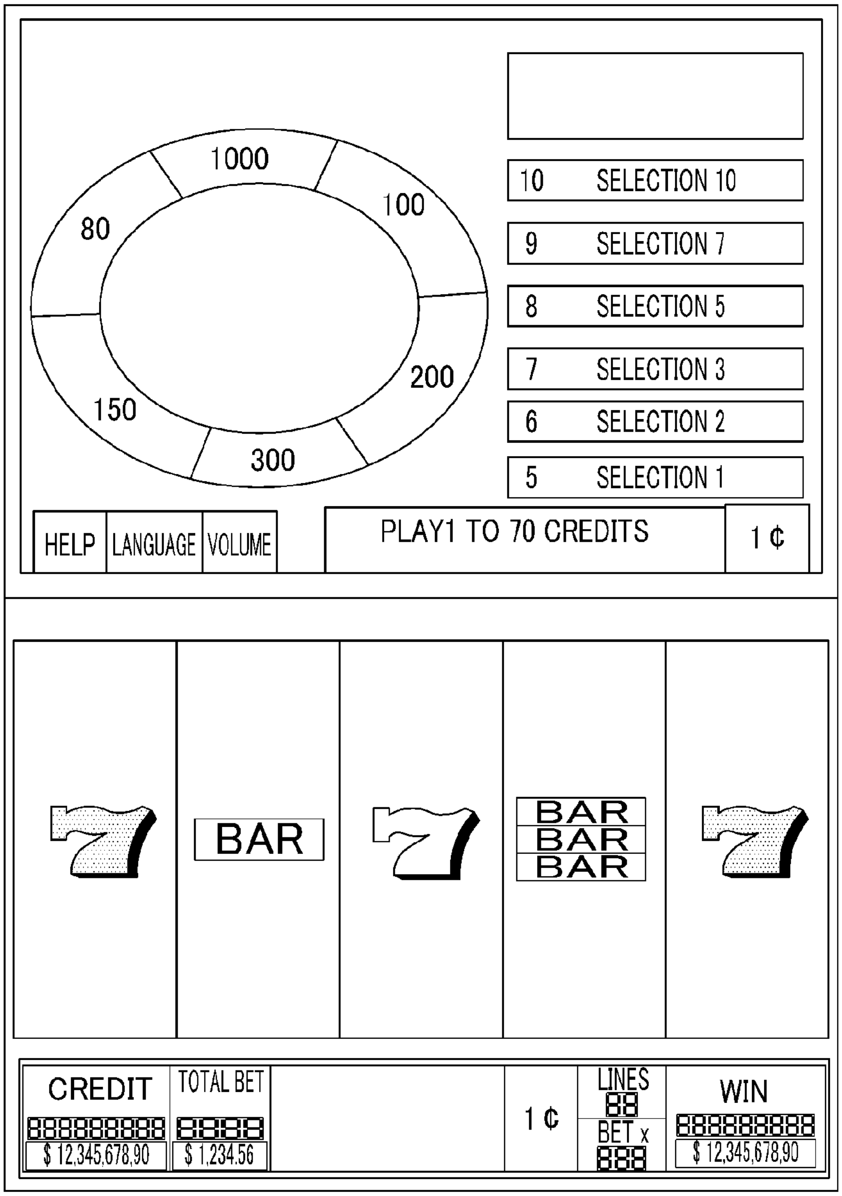
FIG. 35 and FIG. 36 are still screen images for an initial state according to an embodiment of the present invention.
Figure 36:
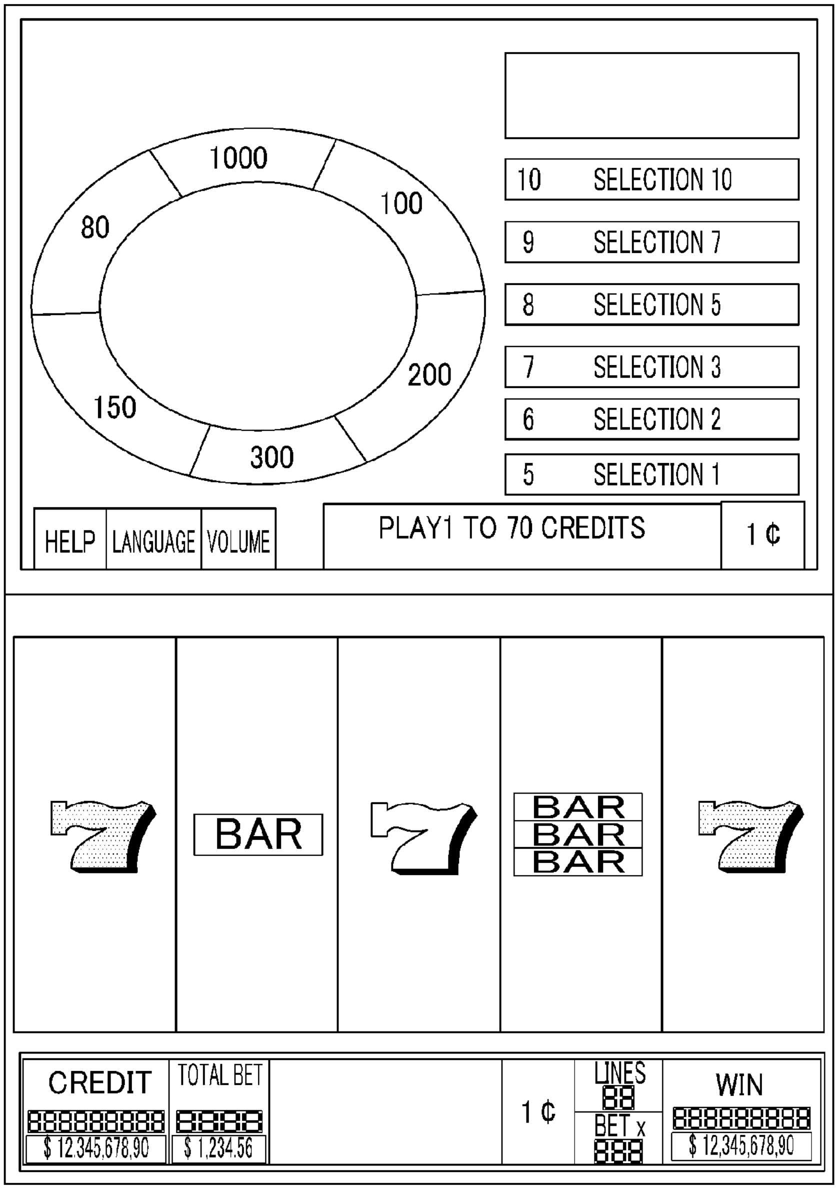
Figure 37:
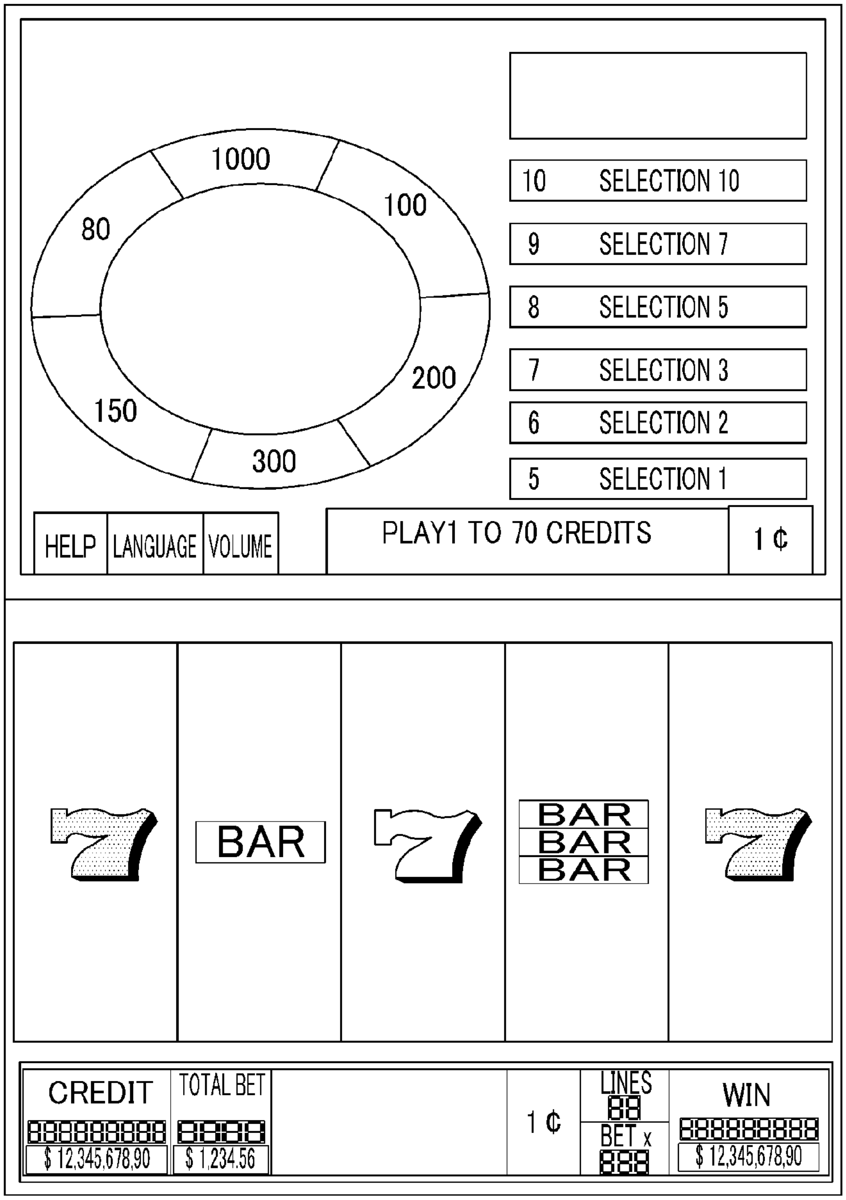
FIG. 37 is a still screen image for an idle state according to an embodiment of the present invention.

FIG. 35 and FIG. 36 are still screen images for an initial state according to an embodiment of the present invention, and FIG. 37 is a still screen image for an idle state according to an embodiment of the present invention.

Referring to FIG. 35, after power on, the primary display 141 shows symbols in a still state. The secondary display 142 may show a tilt history of a system and game information, etc., and may highlight game options and denomination, and the PTS terminal may make the values minima in all the meters, and then may show an ordinary image in a normal round. The image on the secondary display 142 includes a selection wheel, information on the number of selections depending on the number of the scatter symbols, a plurality of buttons, and denomination similar to those shown in FIG. 15. However, the images further includes a message box informing of how to start a game, and the detailed shapes of the selection wheel and the exemplary number of selections depending on the number of the scatter symbols are different from those shown in FIG. 15. FIG. 15, FIG. 35, and following figures show merely examples and modifications thereof may be made.

Referring to FIG. 36, when a player presses BET buttons, corresponding bet multiplication and line counts may be shown in the PTS terminal 700.

Referring to FIG. 37, after a game is finished and before a new game starts, the displays 141, 142 and 700 may be in an idle state where they maintain their previous images.

Figure 38:
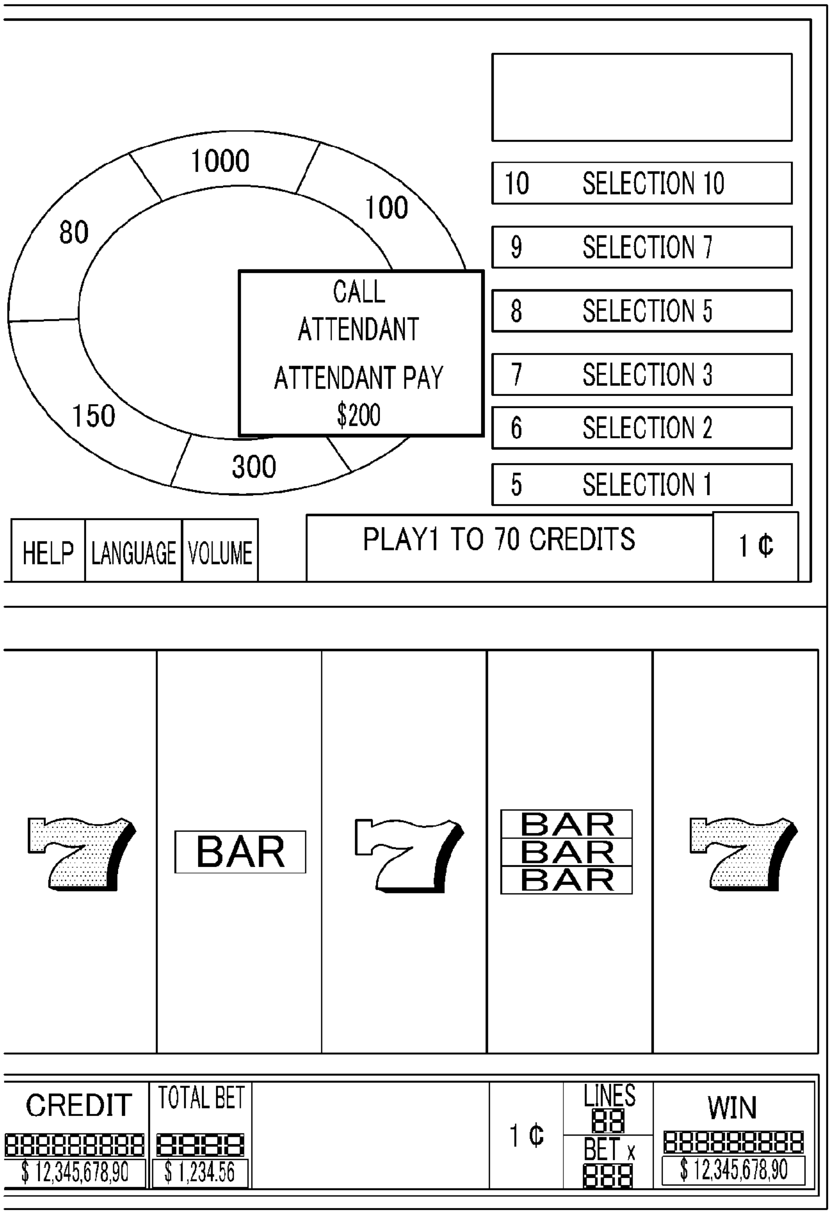
FIG. 38 is a still screen image for a cash-out state according to an embodiment of the present invention.

FIG. 38 is a still screen image for a cash-out state according to an embodiment of the present invention.

Referring to FIG. 38, when a take-win button (or a cash-out button) is pressed, the secondary display 142 may display a new small window showing a message, for example, "CALL ATTENDANT" over the main window of the secondary display 142, and the small window may also show a message informing the amount to be paid, for example, "ATTENDANT PAY $200." The PTS terminal 700 may show the same message in the game message area. The primary display may stop its operation to prevent the image movement.

When a payment is performed and a key reset is performed by an attendant, the small window of the secondary display 142 and the message in the game message area of the PTS terminal 700 may be deleted when a key reset is performed.

The credit meter maintains its value before the key reset, and makes its value zero when the key reset is performed.

Figure 39:
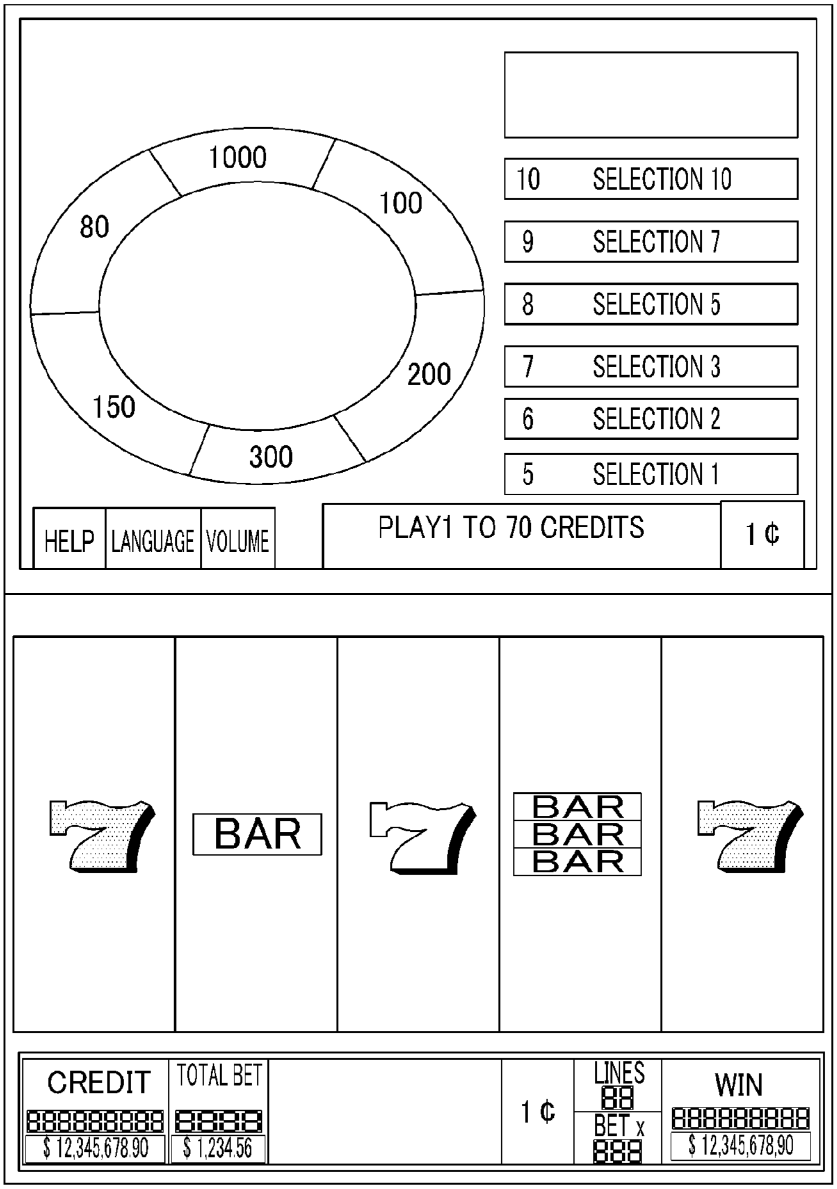
FIG. 39 and FIG. 40 are still screen images for a win and cash-out state according to an embodiment of the present invention.
Figure 40:
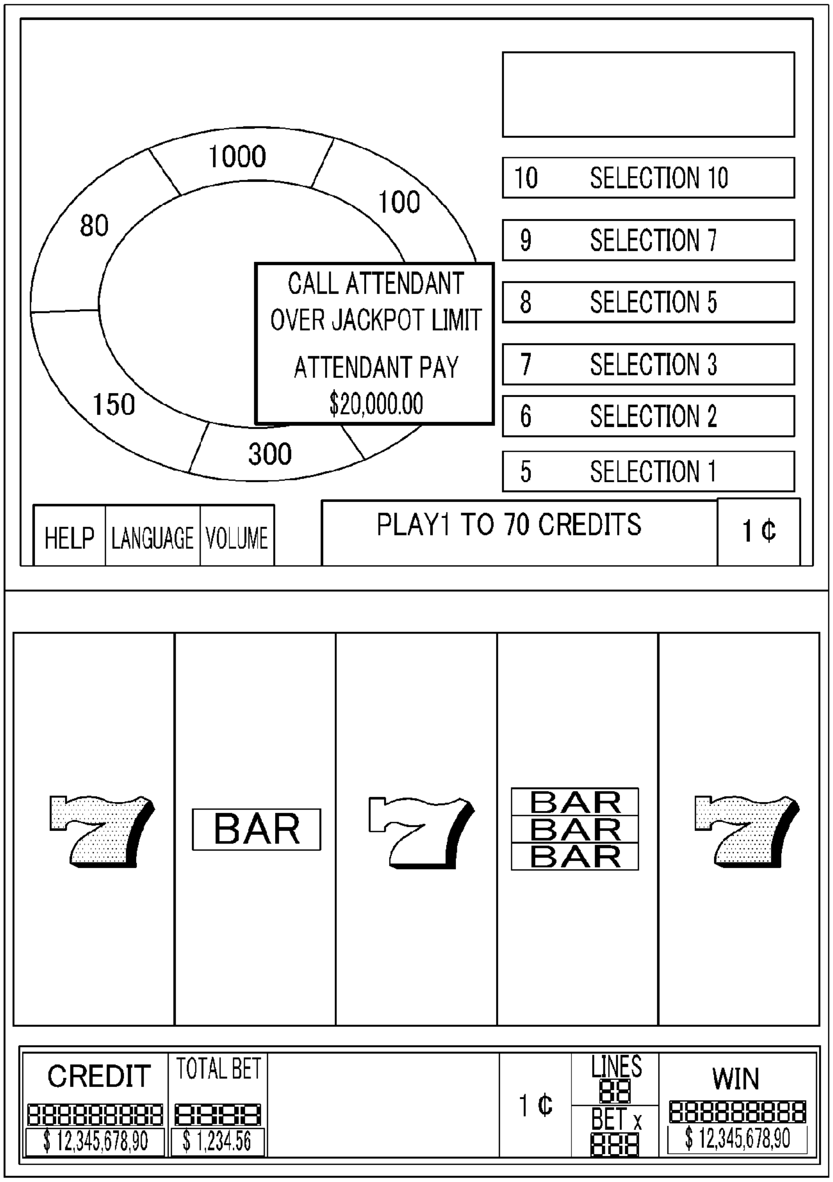

FIG. 39 and FIG. 40 are still screen images for a win and cash-out state according to an embodiment of the present invention.

Referring to FIG. 39, immediately before a win case finishes, the displays may show substantially the same as shown in FIG. 37.

Referring to FIG. 40, when a take-win button (or a cash-out button) is pressed, the secondary display 142 may display a new small window showing a message, for example, "CALL ATTENDANT OVER JACKPOT LIMIT" over the main window of the PTS terminal 700, and the small window may also show a message informing the amount to be paid, for example, "ATTENDANT PAY $20,000.00." The PTS terminal 700 may show the same message in the game message area. The primary display may stop its operation to prevent the image movement.

When a payment is performed and a key reset is performed by an attendant, the small window of the secondary display 142 and the message in the game message area of the PTS terminal 700 may be deleted when a key reset is performed.

The credit meter and the win meter maintain their values before and after the key reset is performed.

Figure 41:
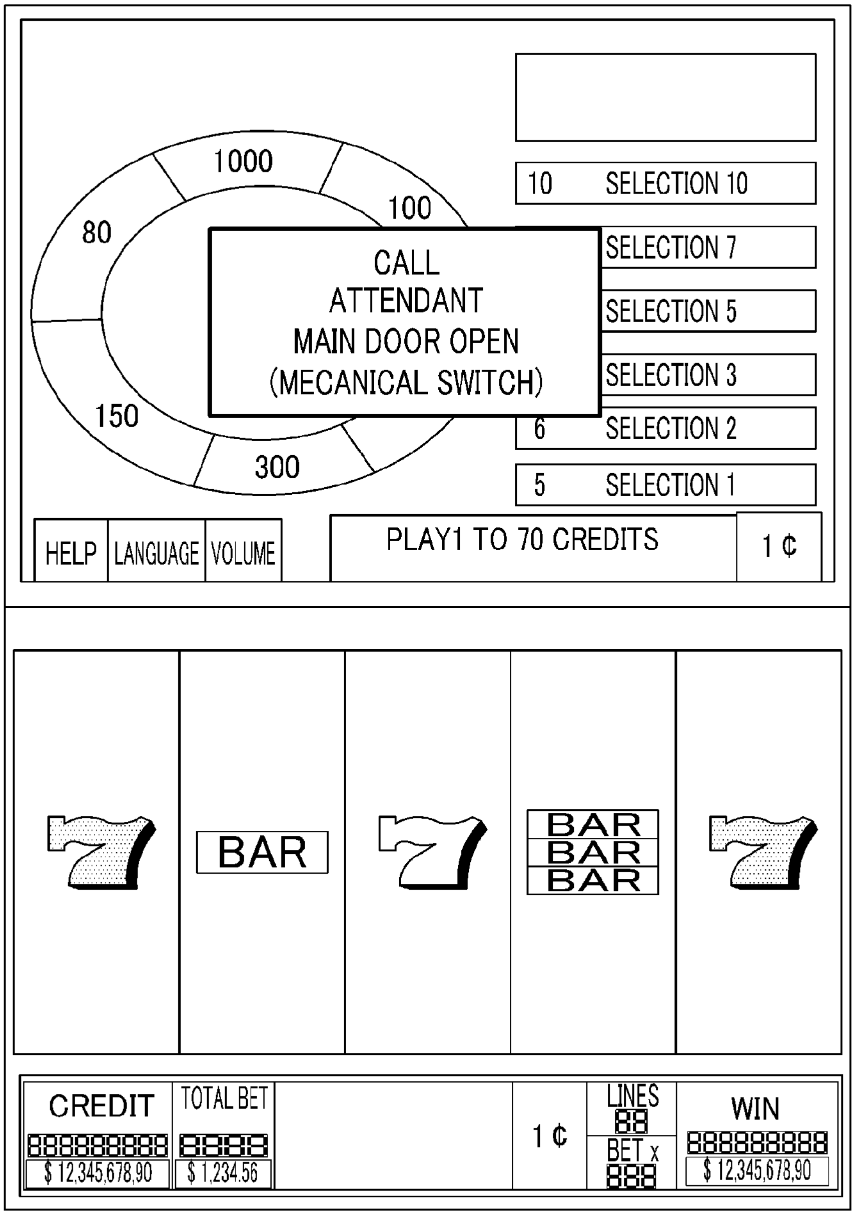
FIG. 41 is a still screen image for an audit state according to an embodiment of the present invention.

FIG. 41 is a still screen image for a tilt state according to an embodiment of the present invention.

Referring to FIG. 41, when an error is made in the slot machine, the secondary display 142 may display a new small window showing a message related to the error, for example, "CALL ATTENDANT MAIN DOOR OPEN (MECHANICAL SWITCH)" over the main window of the PTS terminal 700, and the PTS terminal 700 may show the same message in the game message area. The primary display 141 may stop its operation to prevent the image movement.

When the error is fixed by an attendant, the small window of the secondary display 142 and the message in the game message area of the PTS terminal 700 may be deleted.

(Audit Display)

Figure 42:
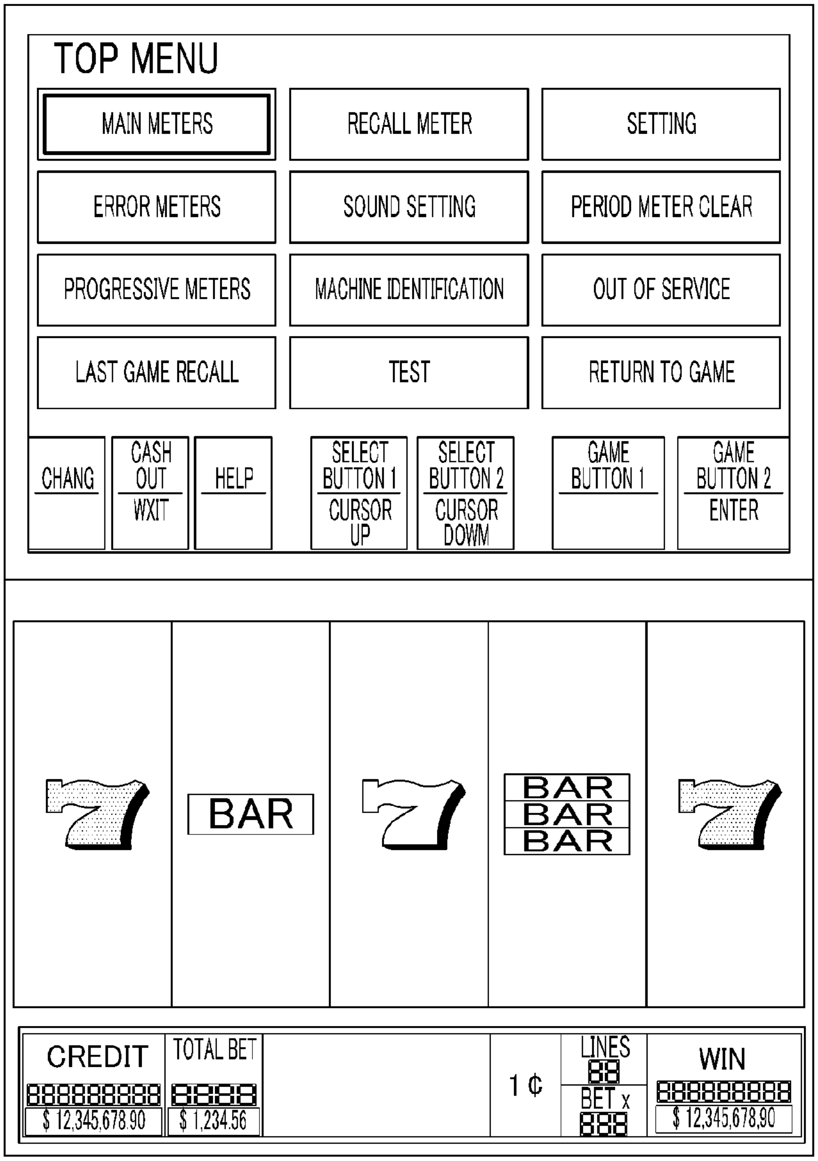
FIG. 42 to FIG. 56 are screen images in a normal round showing a trigger operation.

FIG. 42 is a still screen image for an audit state according to an embodiment of the present invention.

Referring to FIG. 42, the secondary display 142 displays a plurality of buttons for audit, while the primary display 141 and the PTS terminal 700 maintain their screen images. During the audit, no game may be executed, and coins and bills may not be inserted.

(Trigger)

FIG. 43 to FIG. 56 are screen images in a normal round showing a trigger operation. As described above, when a predetermined condition is satisfied, for example, when five or more scatter symbols are shown in the primary display 141 in a normal round, free rounds are triggered, and a corresponding win case occurs.

Figure 43:
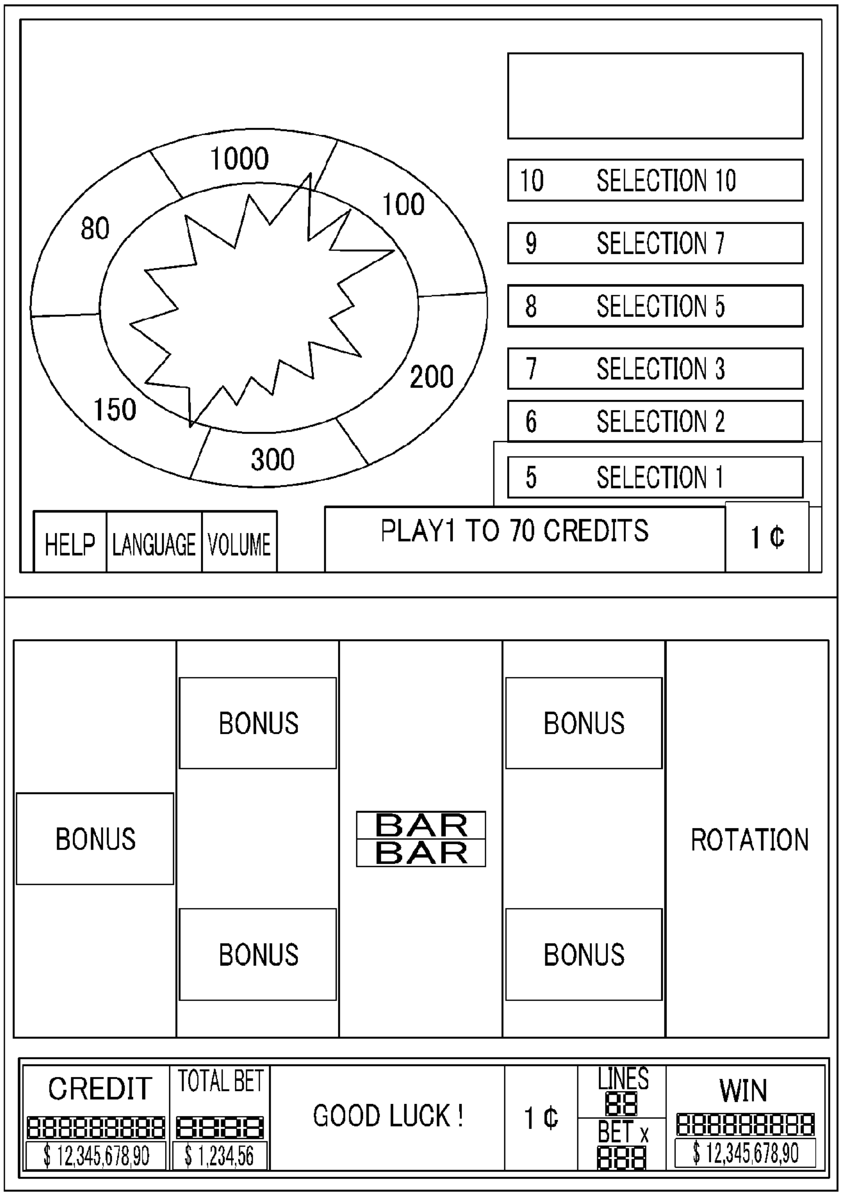

Referring to FIG. 43, at the time that first to fifth scatter symbols stop on the primary display 141, a lowest number box, for example, denoted by "5 SELECTION 1" in the secondary display 142 may be highlighted, and then the highlight may move upward depending on the number of subsequent scatter symbols. A polygon that may be filled with rainbow is shown at the center of the selection wheel of the secondary display 142, and the scatter symbols on the primary display 141 may be filed with rainbow.

In FIG. 43, although four reels including the five scatter symbols stop, one reel is still spinning.

Figure 44:
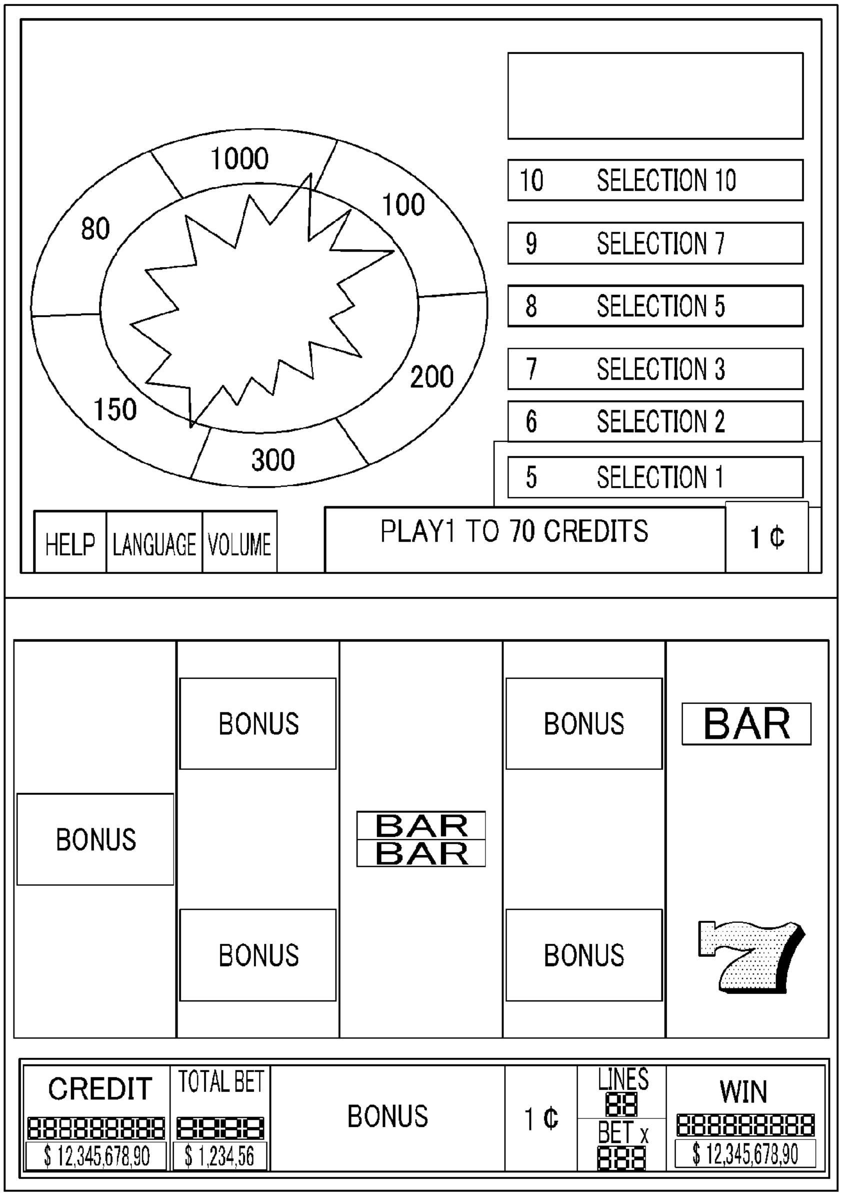

Referring to FIG. 44, when the last reel stops spinning, the game message area 163 of the PTS terminal shows a message "BONUS." In this state, the slot machine 10 may not receive input for a time, and a sound effect may be added.

Figure 45:
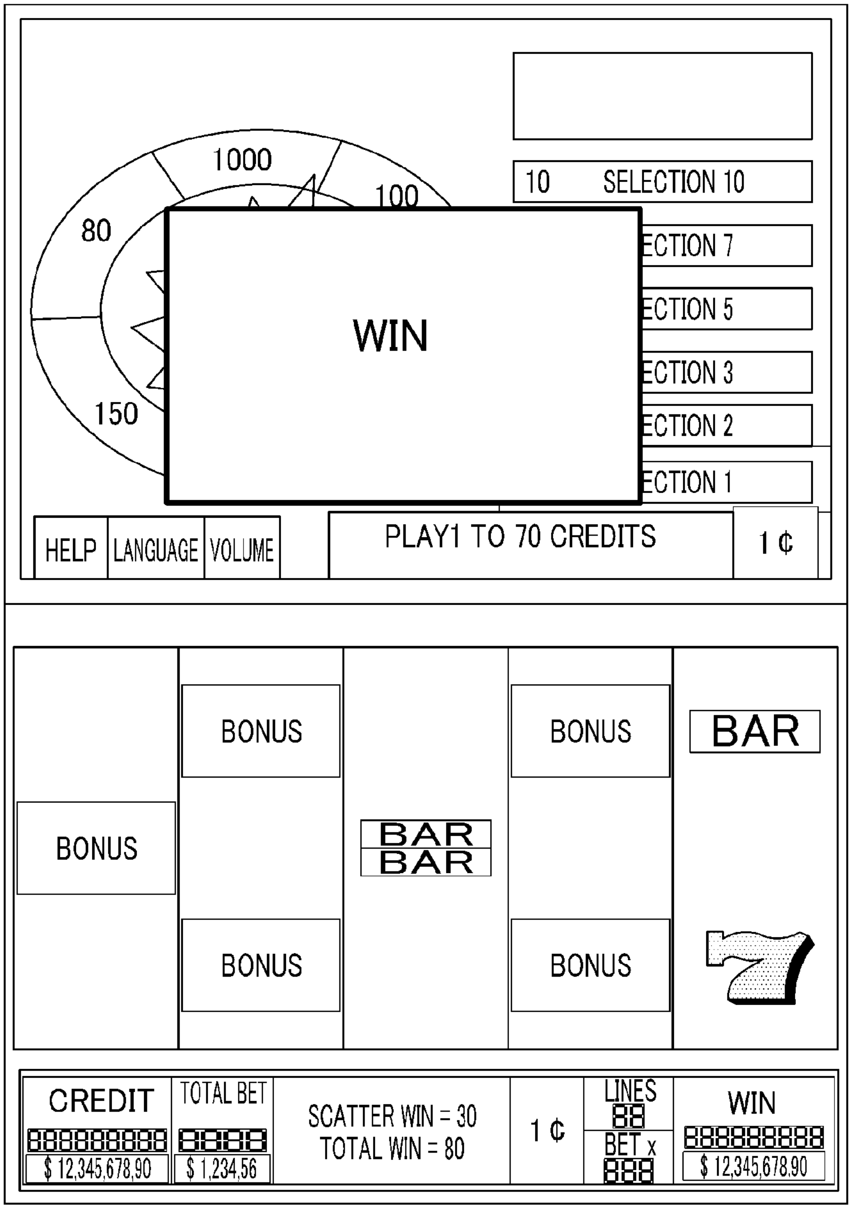

Referring to FIG. 45, the secondary display 142 displays a win plate showing win information that is also shown in the game message area 163 in the PTS terminal 700. The win meter A7 of the PTS terminal 700 is incremented. The occurrence of five or more scatter symbols may generate three kinds of wins, i.e., a scatter win of the scatter symbols, line wins contributed by the scatter symbols, and win per scatter symbol. The primary display 141 may show a rendering.

Figure 46:
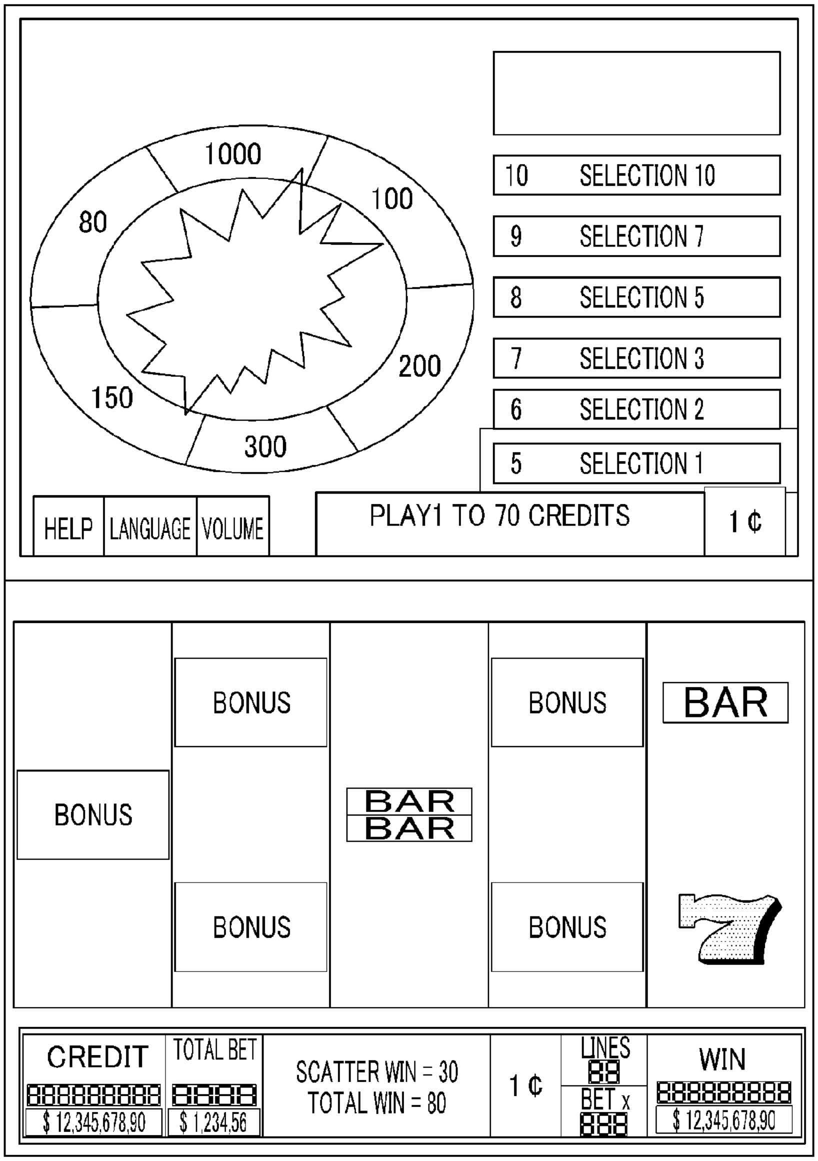
Figure 47:
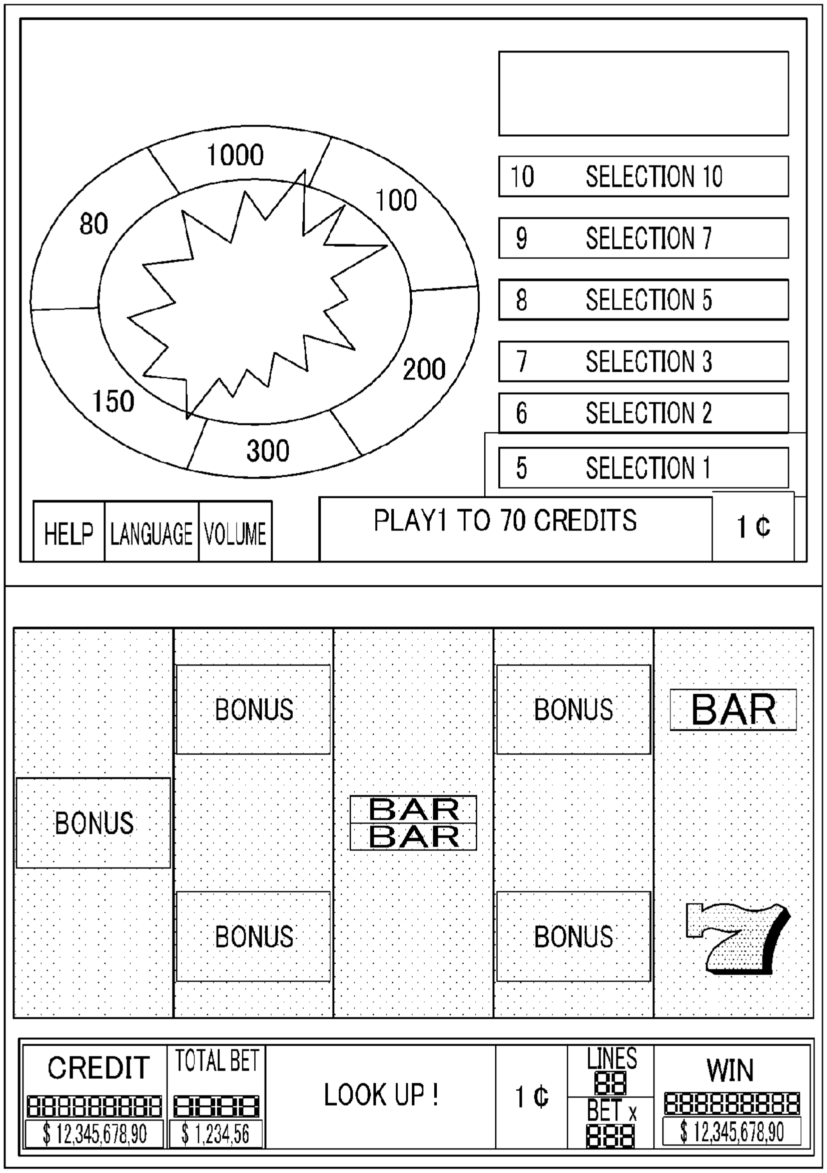

Referring to FIG. 46, a polygon that may be filled with rainbow is shown again at the center of the selection wheel of the secondary display 142 after the win plate vanishes. An entire area of the primary display 141 is filled with rainbow for a time Referring to FIG. 47, the primary display 141 becomes dark, and the game message area 163 of the PTS terminal 700 shows a message "LOOK UP!"

Figure 48:
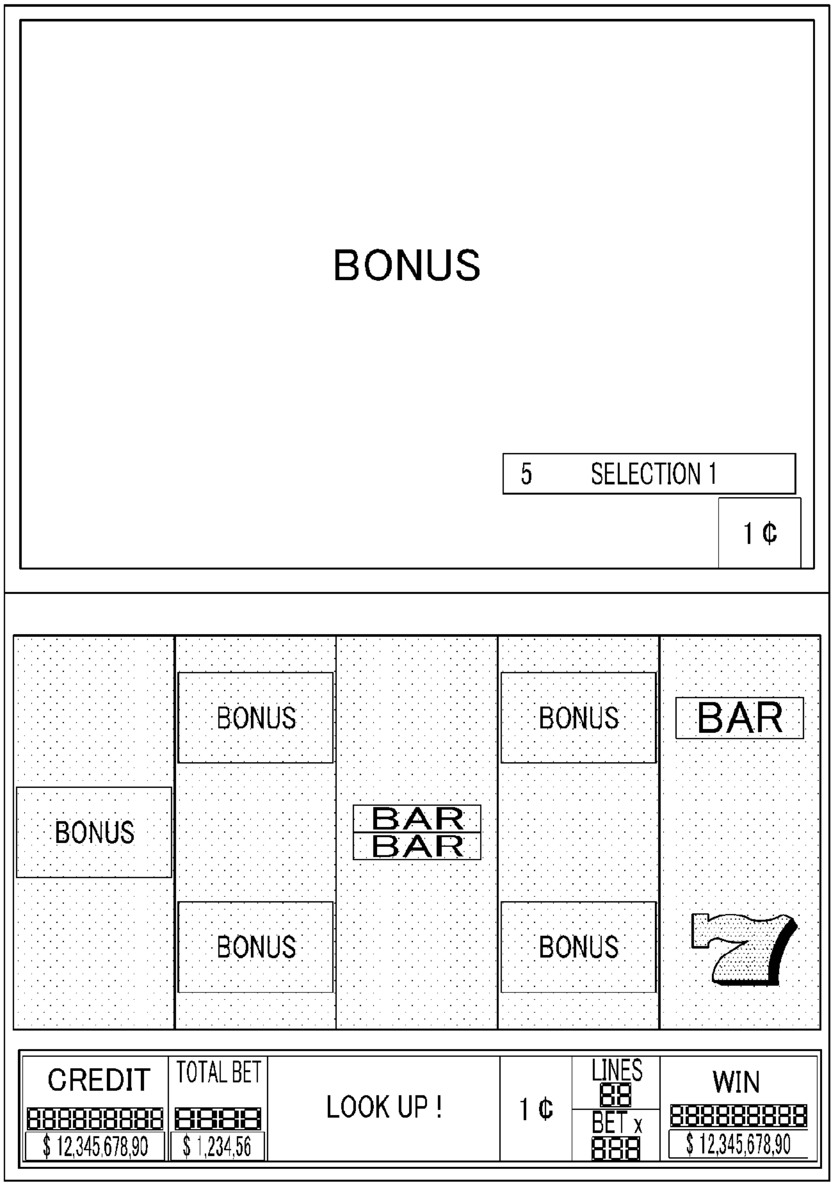

Referring to FIG. 48, the image on the secondary display 142 except for the highlighted number box and the denomination area disappears. An introduction movie may be shown on the secondary display 142.

Figure 49:
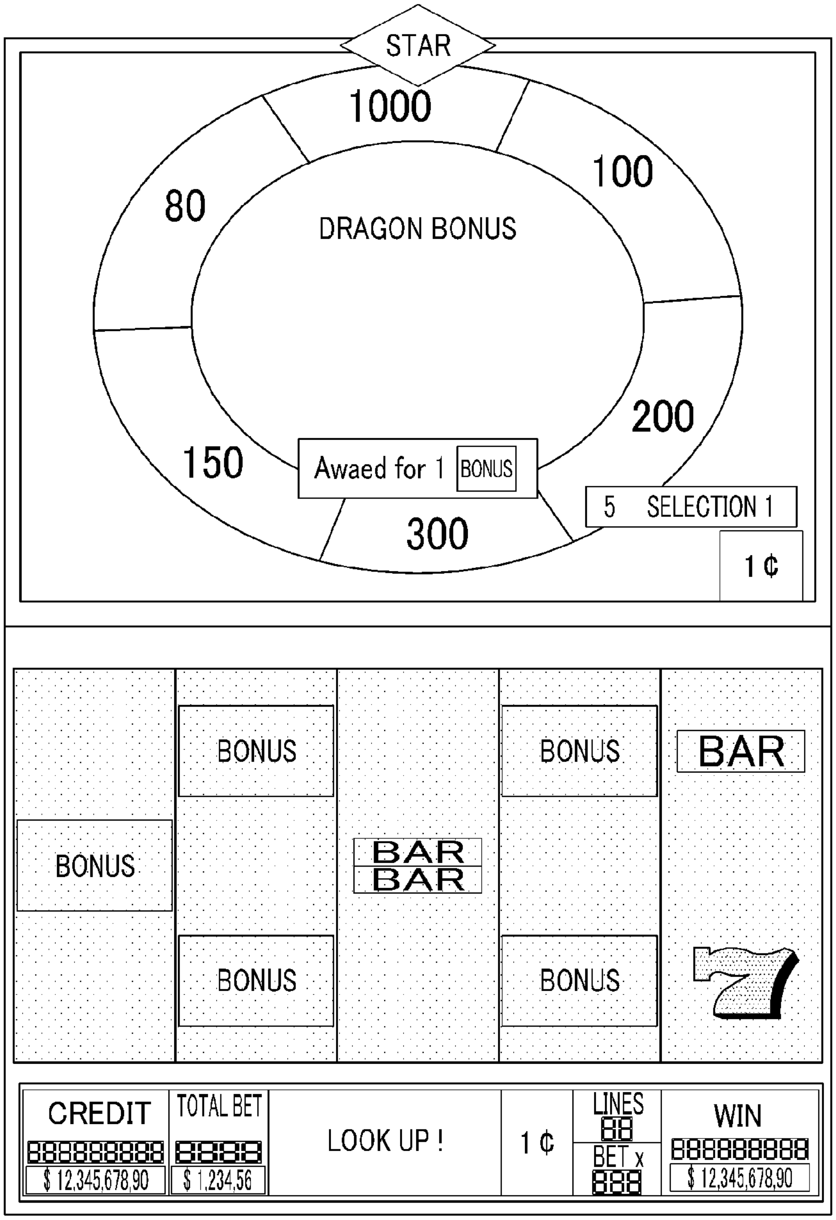

Referring to FIG. 49, the selection wheel is shown on the entire area of the secondary display 142 after the introduction movie finishes. The name of the bonus "BIG GOLD BONUS" and the number of remaining selections may be shown at the center of the selection wheel. A "START" mark is disposed near a selection zone, for example, denoted by "1000" where a lottery starts, and the starting selection zone may be a selection zone disposed at a twelve o'clock position. A small window with a message "Award for 1 BONUS" is displayed at a lower central portion of the selection wheel.

After a time elapses after the images shown in FIG. 49 are displayed, the preparation of the lottery is ready.

Figure 50:
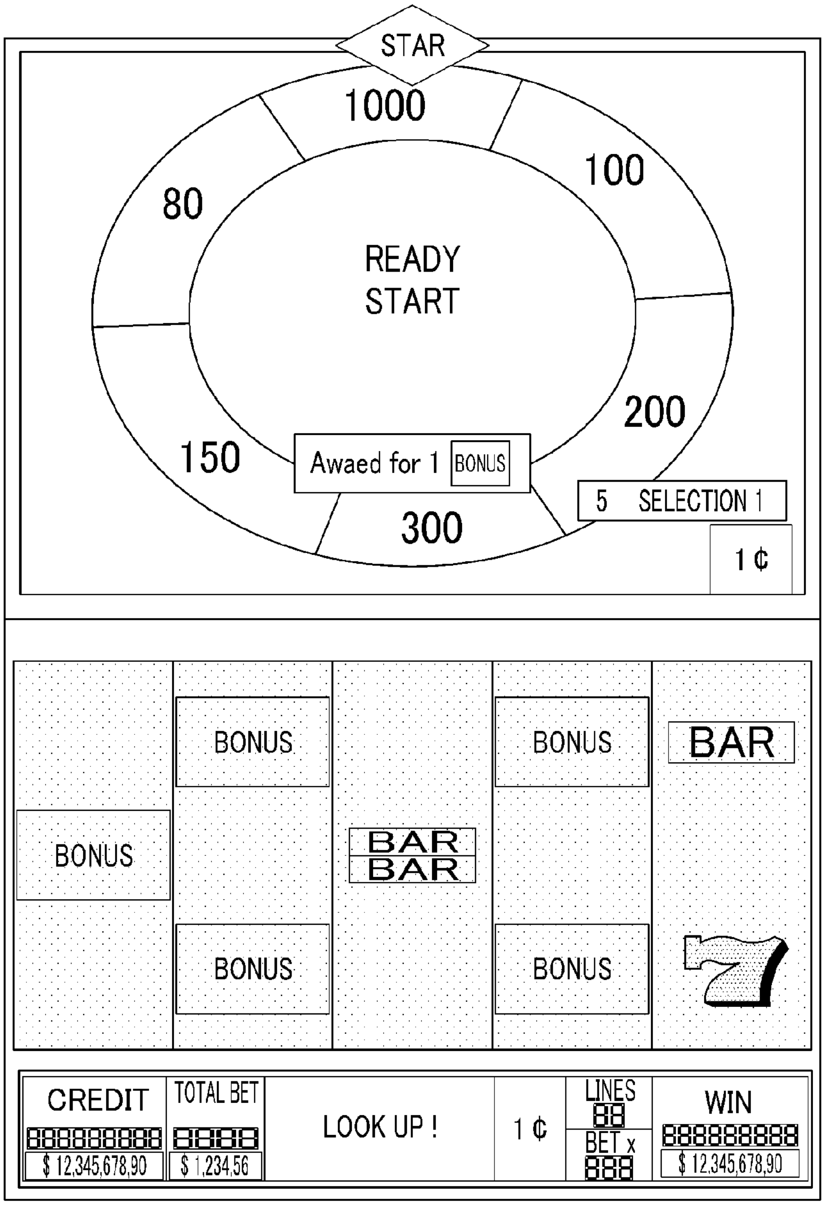

Referring to FIG. 50, a message "READY START" is shown at the center of the selection wheel, and the highlighted number box disappears. The primary display 141 becomes dark, and the game message area 163 of the PTS terminal 700 shows a message "LOOK UP!"

Figure 51:
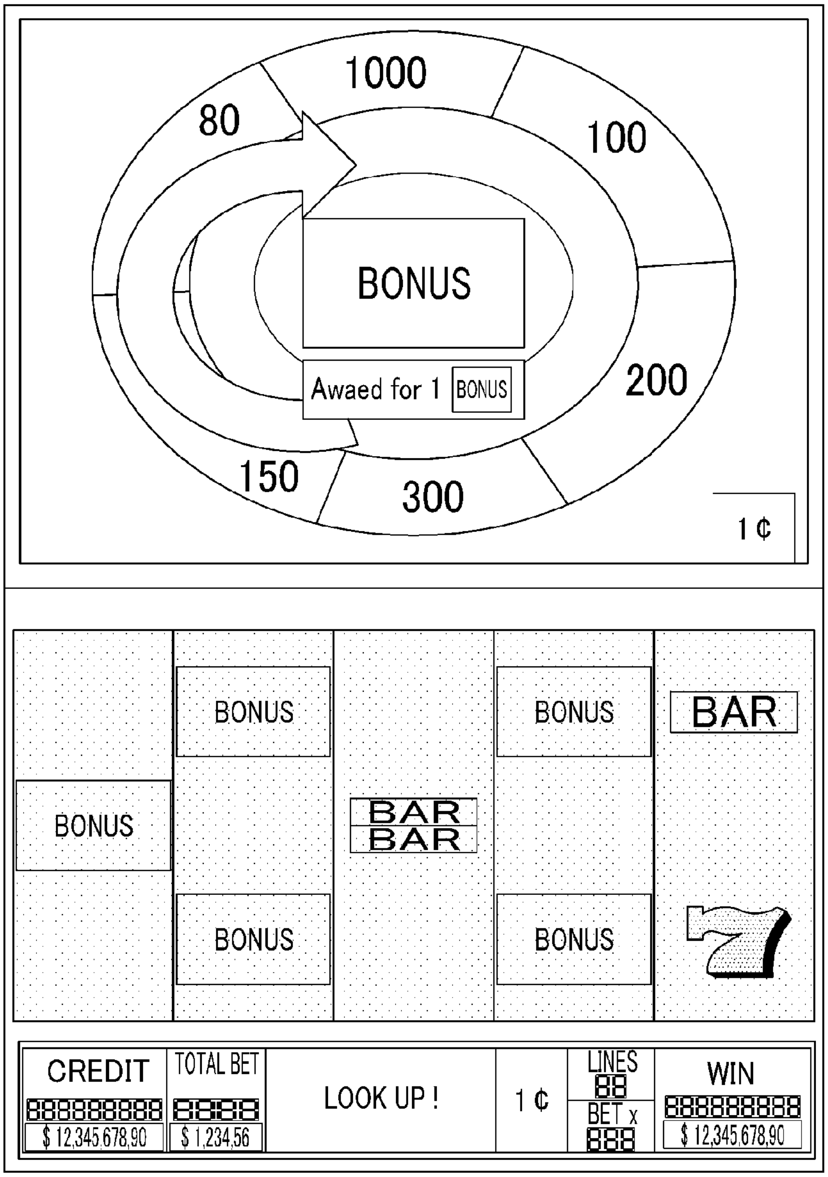

Referring to FIG. 51, when a player presses a start button or a spin button, the selection wheel starts rotation such that the lottery begins. The message "READY START" and the highlighted number box disappear, and a scatter symbol is displayed at the center of the wheel.

Figure 52:
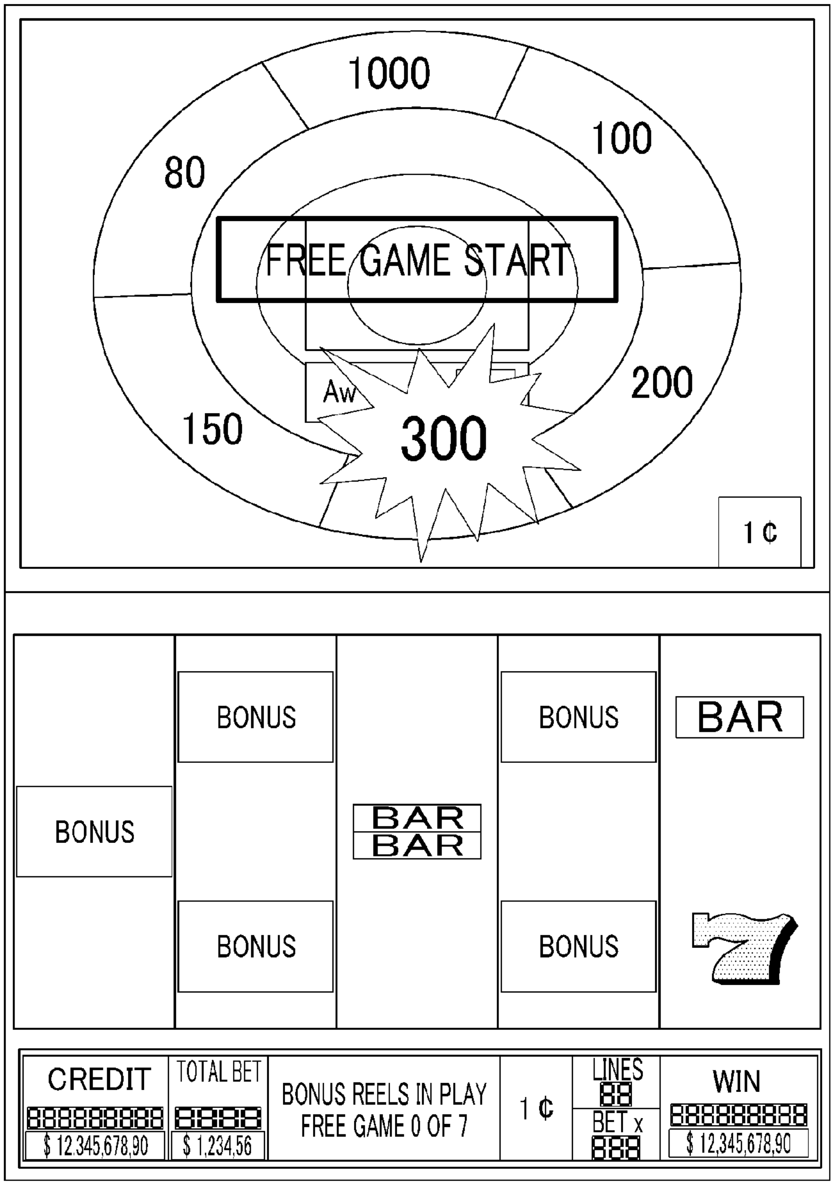

Referring to FIG. 52, the lottery is completed by selecting one the zones of the selection wheel, and then the prize amount is determined. The determined win prize is shown in the scatter symbol at the center of the selection wheel. The prize amount written in the selected zone may be highlighted with, for example, a flashing polygon.

When the number of the scatter symbols is more than five, the number of the lotteries may be two or more. In this case, all the prize amounts produced by the lotteries are added to the win prize in the scatter symbol at the wheel center. The win prize may be assigned to each of the scatter symbols, and therefore, the win prize multiplied by the number of the scatter symbols may be the total prize for the win case. It is noted that when multiple selections are performed, it may not be allowed to select a zone twice or more.

After the total prize is shown at the center, a message window with a message "FREE ROUND START" is displayed over the main window of the secondary display 142. The primary display 141 is brightened again, and the background colors of the first display 141 and the PTS terminal 700 and the colors of the scatter symbols may be changed to be different from those in a normal round. The game message area 163 of the PTS terminal 700 shows a message "BONUS REELS IN PLAY" and two counters informing of the serial number of the current free round and the total number of free rounds in a form "FREE ROUND XX OF XX."

Figure 53:
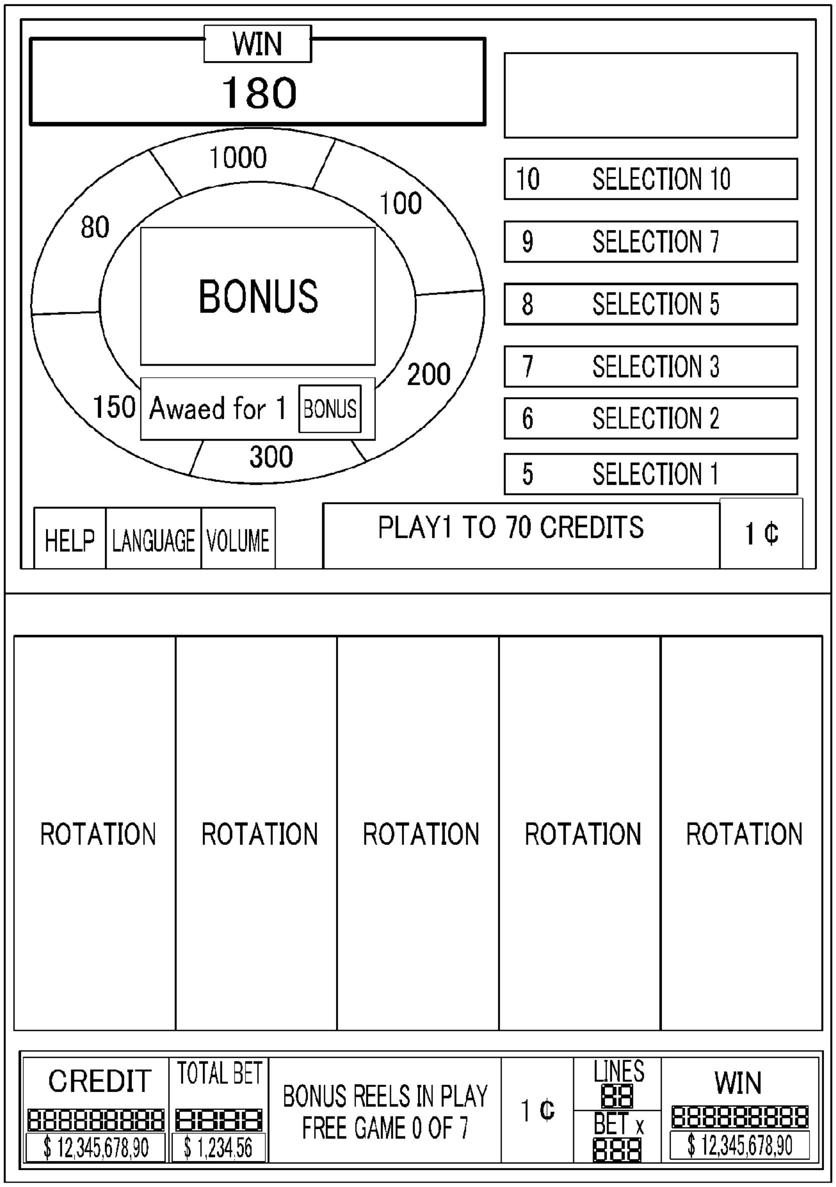

Referring to FIG. 53, the secondary display 142 returns to show its ordinary image. However, a wind meter for free rounds is displayed at an upper side of the secondary display 142, and the game information area shows the number (N1) of executed free rounds and the total number (N2) of the free rounds in a form of "FREE ROUND N1 OF N2." In an example shown in FIG. 53, the number of free rounds triggered in a normal round is 7 and a first free round is about to be executed.

The occurrence of five or more scatter symbols may generate three kinds of wins, i.e., a scatter win of the scatter symbols, line wins contributed by the scatter symbols, and win per scatter symbol. Therefore, the win meter for free rounds may include the sum of the three kinds of wins.

Figure 54:
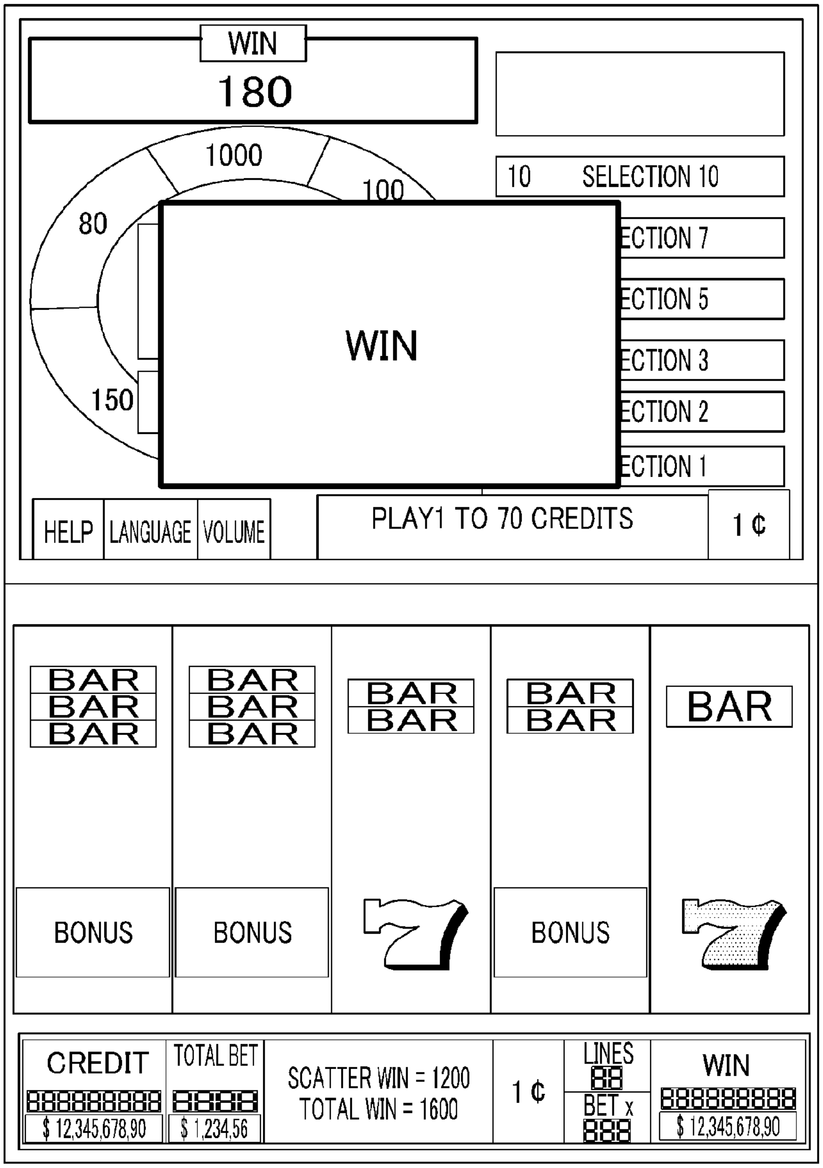

FIG. 54 shows screen images for a win case occurs in a free round. A win plate showing win information is displayed on the secondary display 142 to hide the win prize window, and the win information is also shown in the game message area 163 of the PTS terminal 700. Various renderings may be performed as described above. For example, the symbols related to a scatter win are highlighted, and then the symbols related to line wins are highlighted.

Figure 55:
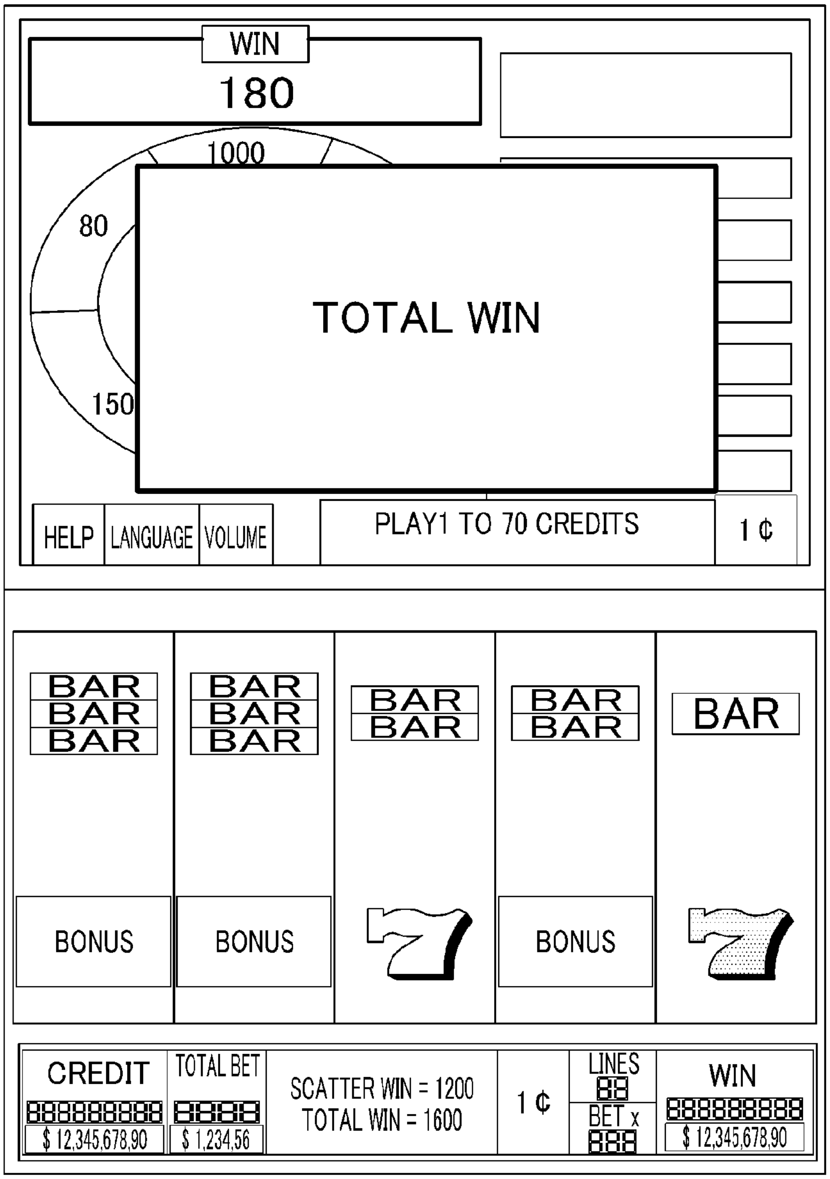

Referring to FIG. 55, when there is no free round left to be executed, a total win plate informing of the result of the execution of a series of free rounds is displayed in the secondary display 142.

Figure 56:
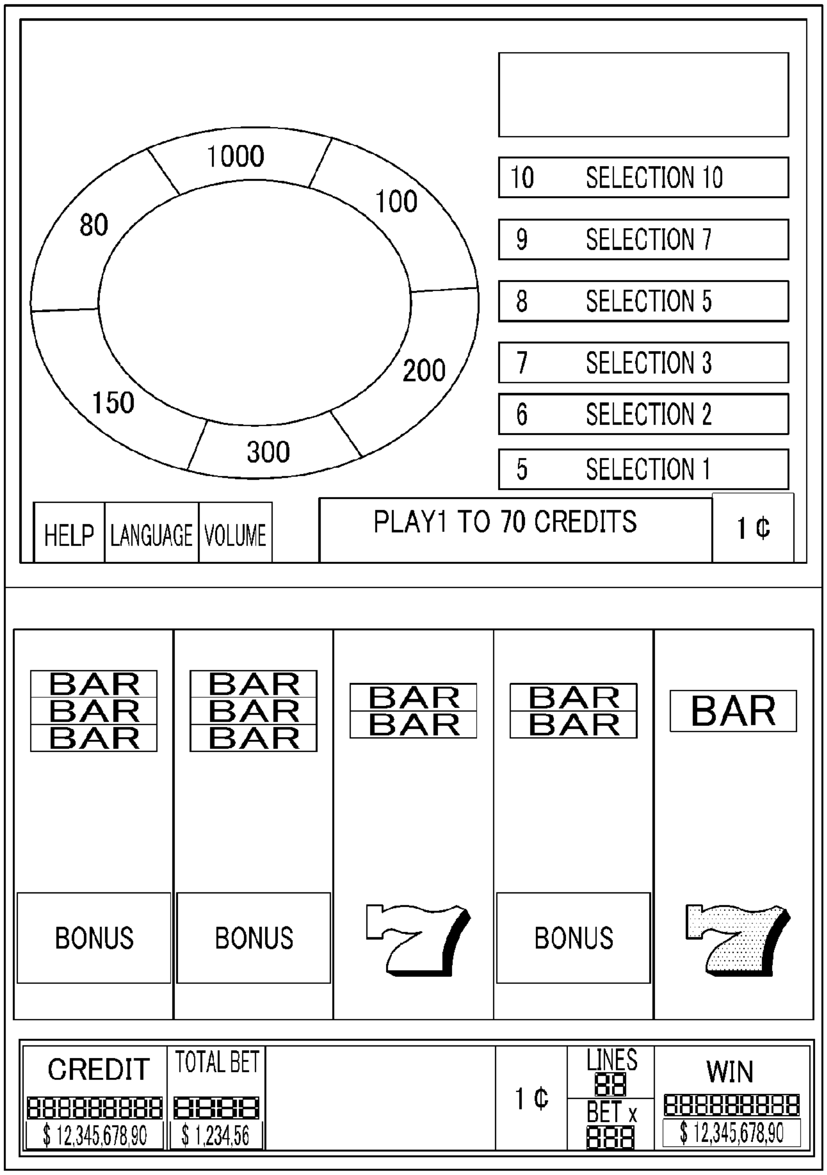

Referring to FIG. 56, the first and second displays, and the PTS terminal return to show their ordinary images for a normal round.

[Retrigger]

FIG. 57 to FIG. 65 are screen images in a free round showing a retrigger operation.

As described above, when a predetermined condition is satisfied, for example, when five or more scatter symbols are shown in the primary display 141 in a free round, free rounds are retriggered, and a corresponding win case occurs.

Figure 57:
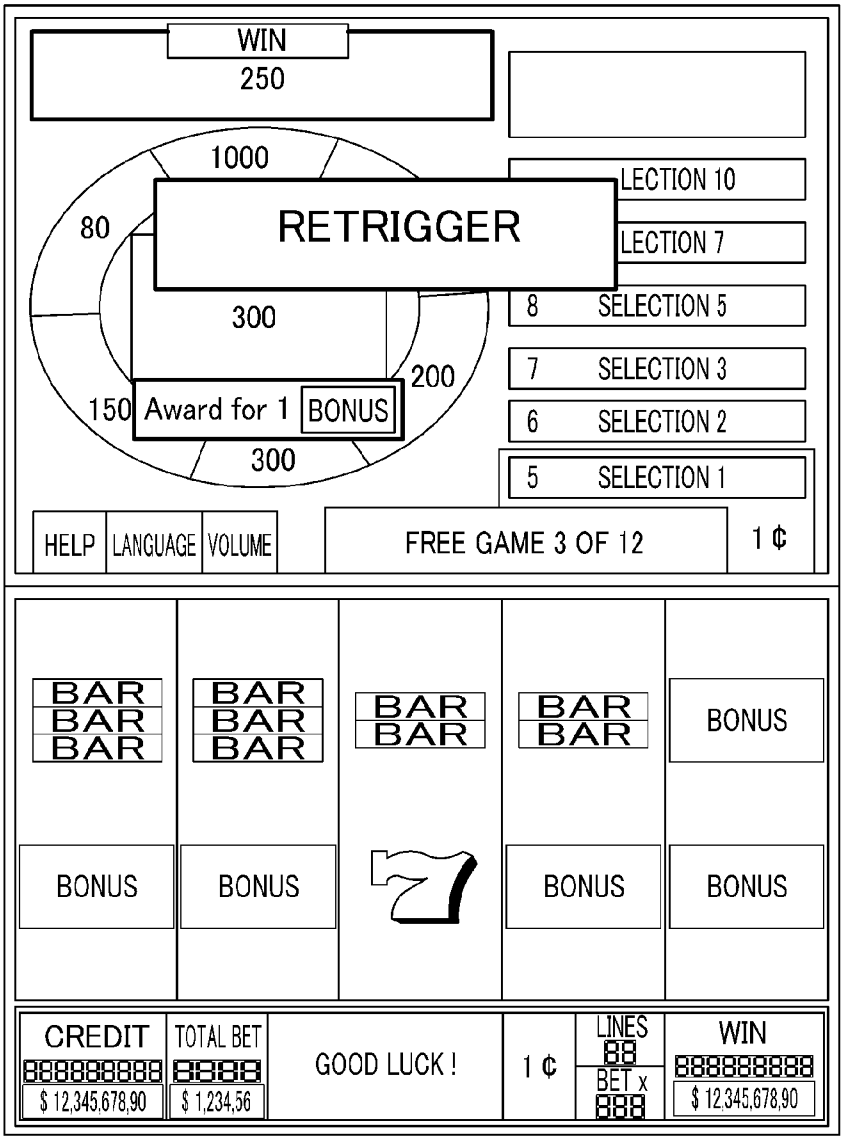
FIG. 57 to FIG. 65 are screen images in a free round showing a retrigger operation.

Referring to FIG. 57, since the free rounds are being executed, the game information area shows the serial number of the current free round and the total number of the free rounds is displayed at a lower side of the secondary display 142. Furthermore, a win meter for free rounds is displayed at an upper side of the secondary display 142.

At the time that first to fifth scatter symbols stop on the primary display 141, a lowest number box, for example, denoted by "5 SELECTION 1" in the secondary display 142 may be highlighted, and then the highlight may move upward depending on the number of subsequent scatter symbols. A message window with a message "RETRIGGER" is shown over the main window of the secondary display 142, and the same message is shown in the game message area of the PTS terminal. In addition, a window showing a win prize related to the win case is shown near the center of the selection wheel and may be hid by the message window. The number of additional free rounds generated by the retrigger is added to the total number of the free rounds.

In this state, the slot machine 10 may not receive input for a time, and a sound effect may be added.

Figure 58:
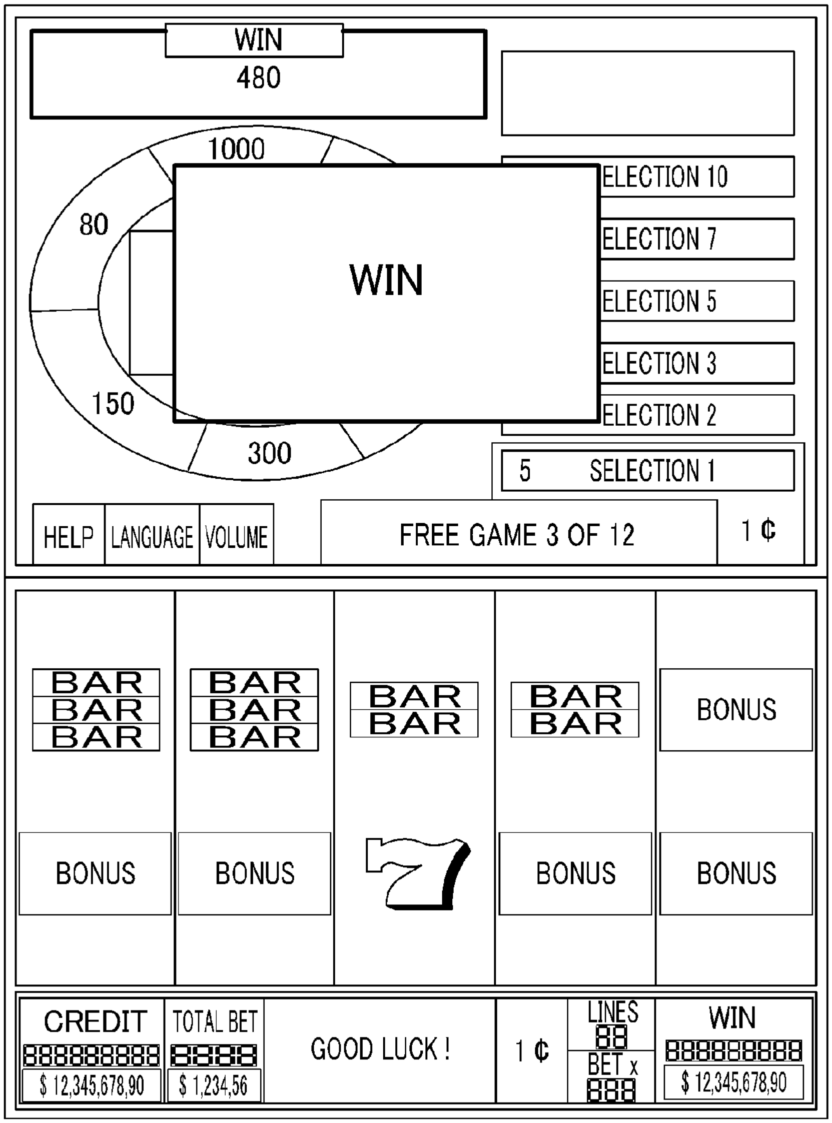

Thereafter, referring to FIG. 58, the secondary display 142 displays a win plate showing win information, and the win information is also shown in the game message area 183 in the PTS terminal 700. The win meters on the secondary display 142 and PTS terminal 700 are incremented. The occurrence of five or more scatter symbols may generate three kinds of wins, i.e., a scatter win of the scatter symbols, line wins contributed by the scatter symbols, and win per scatter symbol. The primary display 141 may show a rendering.

Figure 59:
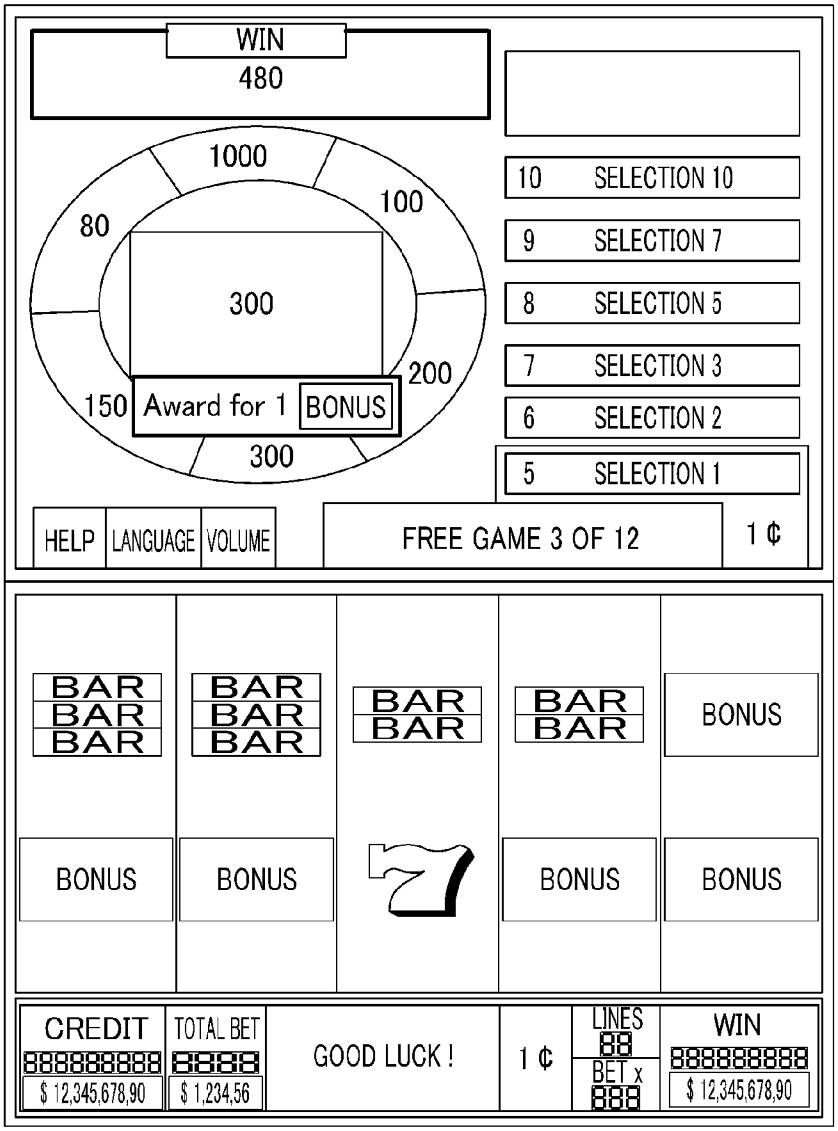

Referring to FIG. 59, an entire area of the primary display 141 is filled with rainbow for a time after the win plate vanishes.

Figure 60:
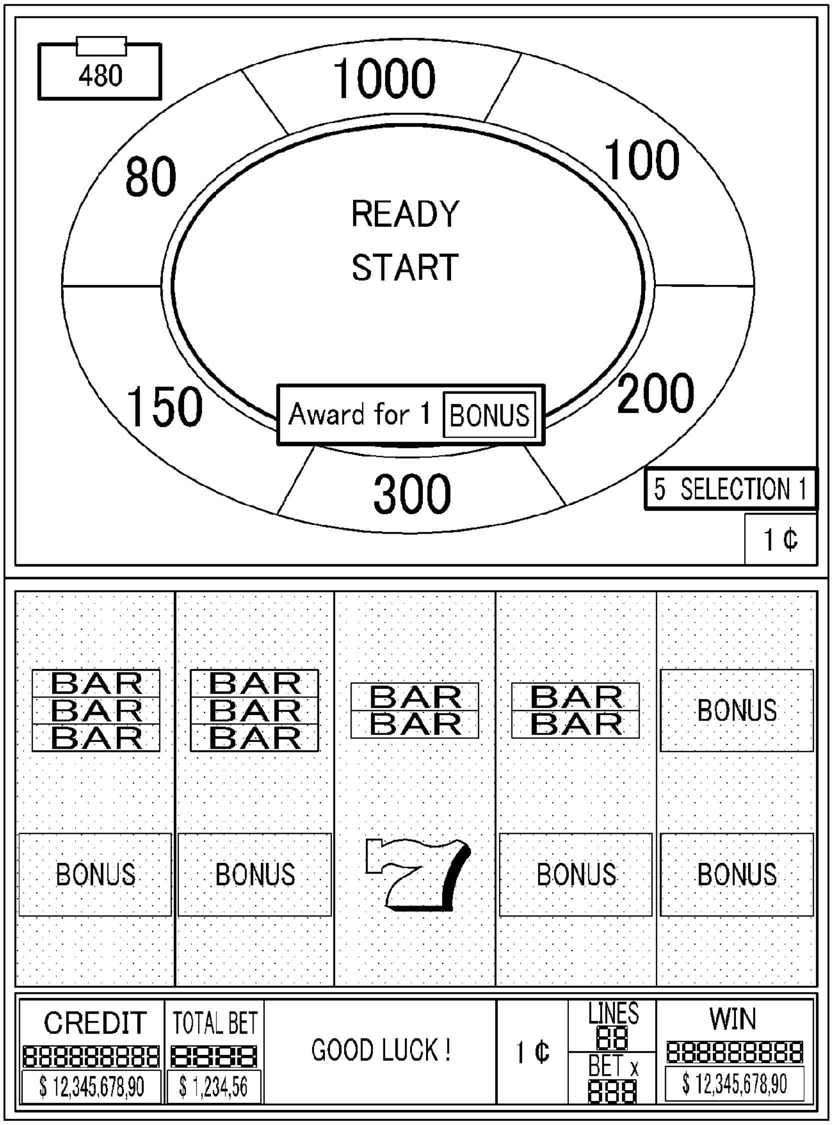

Referring to FIG. 60, the selection wheel expands to occupy the entire area of the secondary display 142, and a message "READY START" is shown at the center of the selection wheel. In addition, the number boxes except for the highlighted number box disappear, and the win meter reduces its size and moves to the upper left corner of the secondary display 142. The primary display 141 becomes dark, and the game message area 183 of the PTS terminal 700 shows a message "LOOK UP!"

Figure 61:
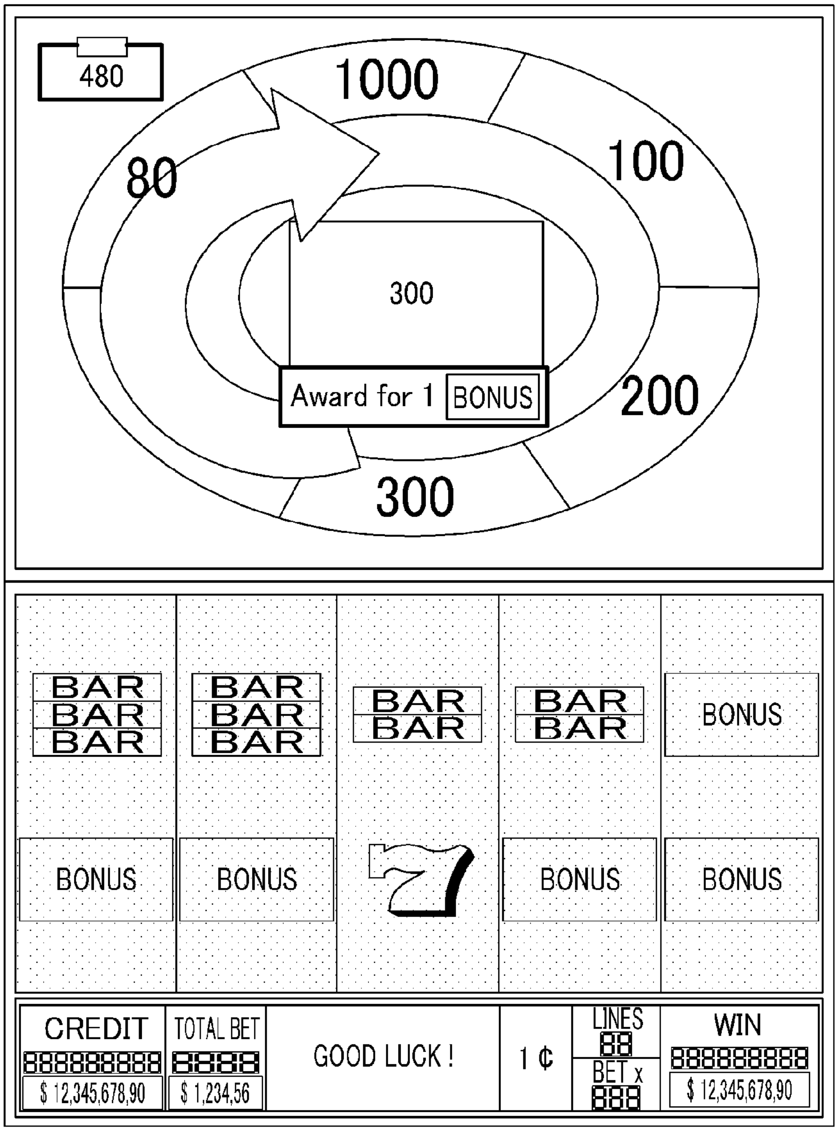

Referring to FIG. 61, the highlighted number box disappears, and a lottery using the selection wheel is performed. During the lottery, a highlight may move around along the zones of the selection wheel.

Figure 62:
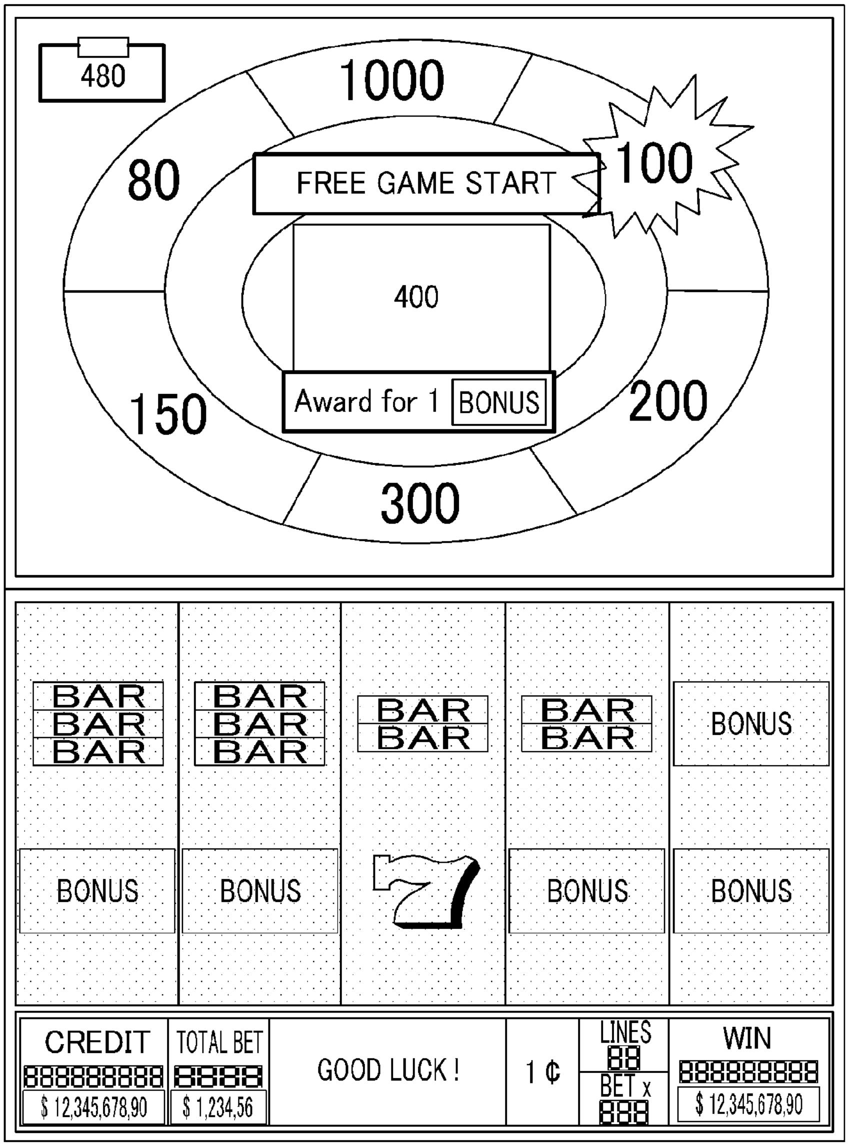

Referring to FIG. 62, the lottery is completed by selecting one the zones of the selection wheel, and then the prize amount is determined, and the prize amount is added to the win prize shown at the center of the selection wheel. The prize amount written in the selected zone may be highlighted with a flashing polygon.

When the number of the scatter symbols is more than five, the number of the lotteries may be two or more. In this case, all the prize amounts produced by the lotteries are added to the win prize shown at the center. The win prize may be assigned to each of the scatter symbols, and therefore, the win prize multiplied by the number of the scatter symbols may be the total prize for the win case. It is noted that when multiple selections are performed, it may not be allowed to select a zone twice or more.

After the total prize is shown at the center, a message window with a message "FREE ROUND START" is displayed over the main window of the second display.

Figure 63:
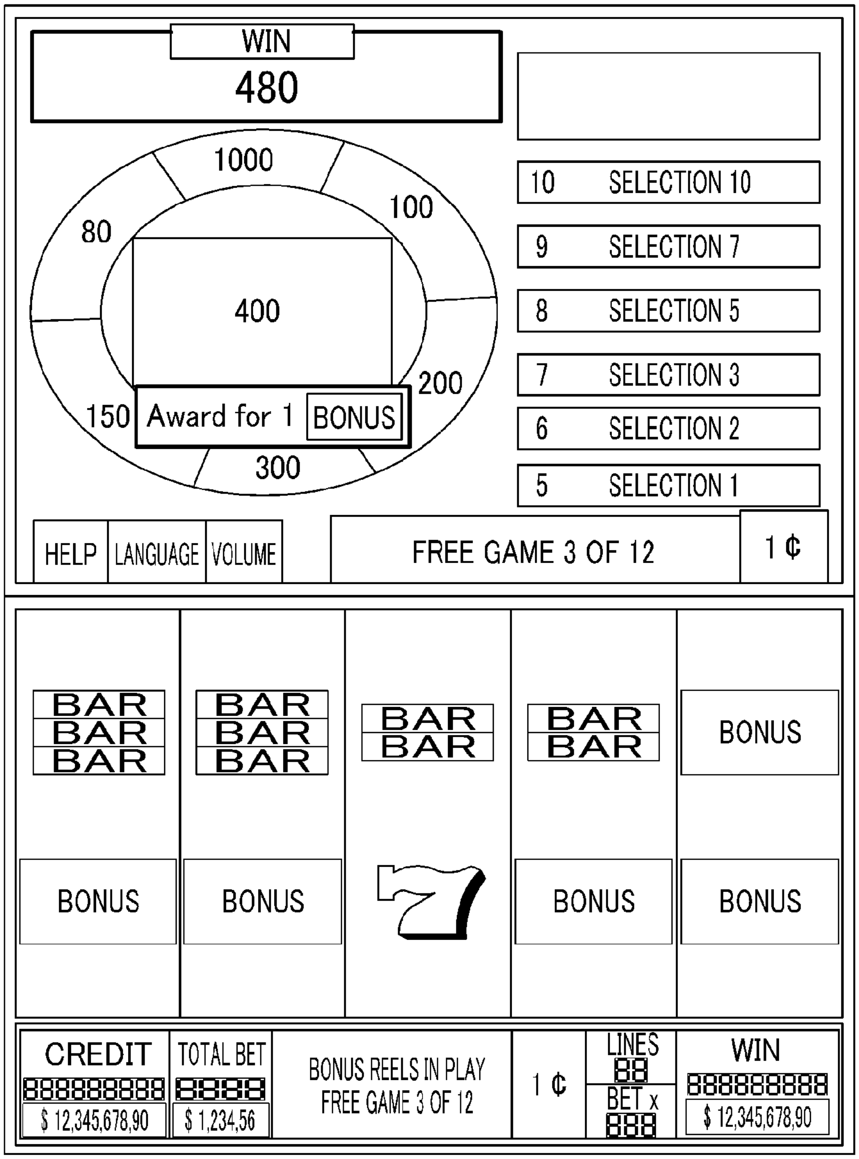

Referring to FIG. 63, when a new free round begins, the first and second displays 141 and 142 return to show ordinary images for a free round. T background colors of the first display 141 and the PTS terminal 700 for a free round may be different from that for a normal round. The game message area 183 of the PTS terminal shows a message "BONUS REELS IN PLAY" and two counters informing of the serial number of the current free round and the total number of free rounds in a form "FREE ROUND XX OF XX."

Figure 64:
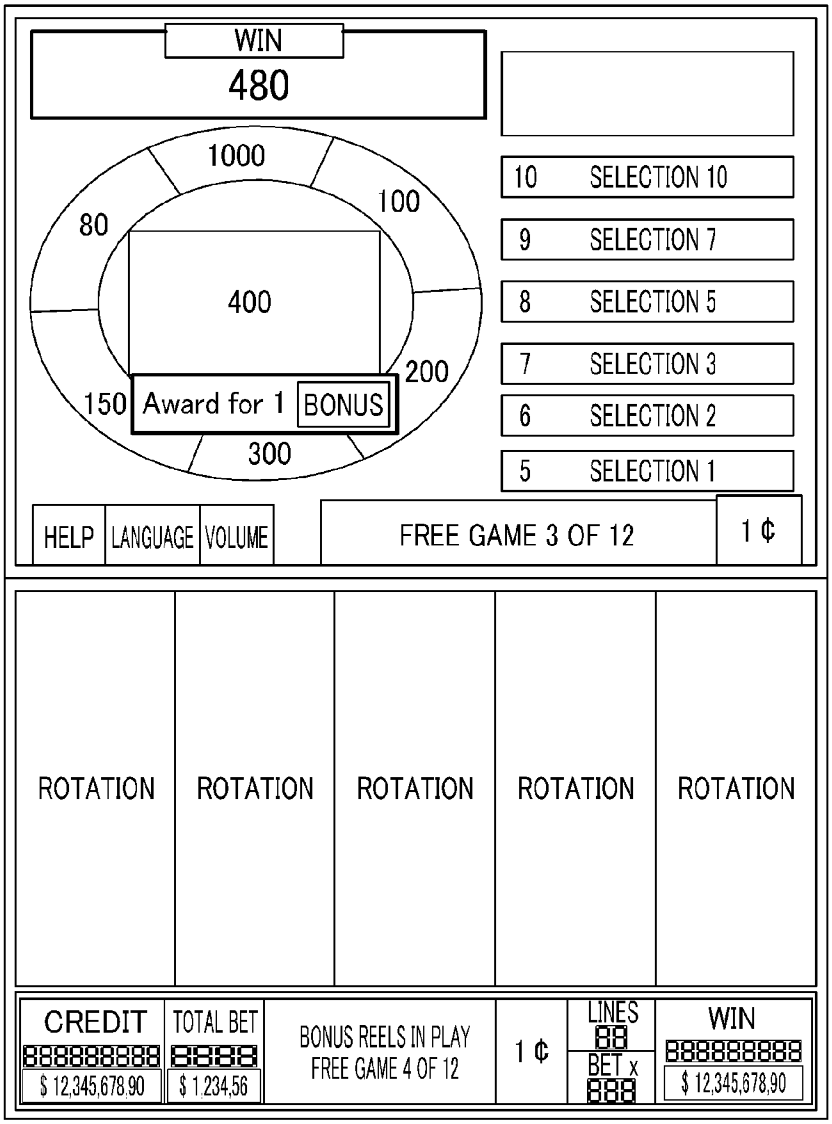
Figure 65:
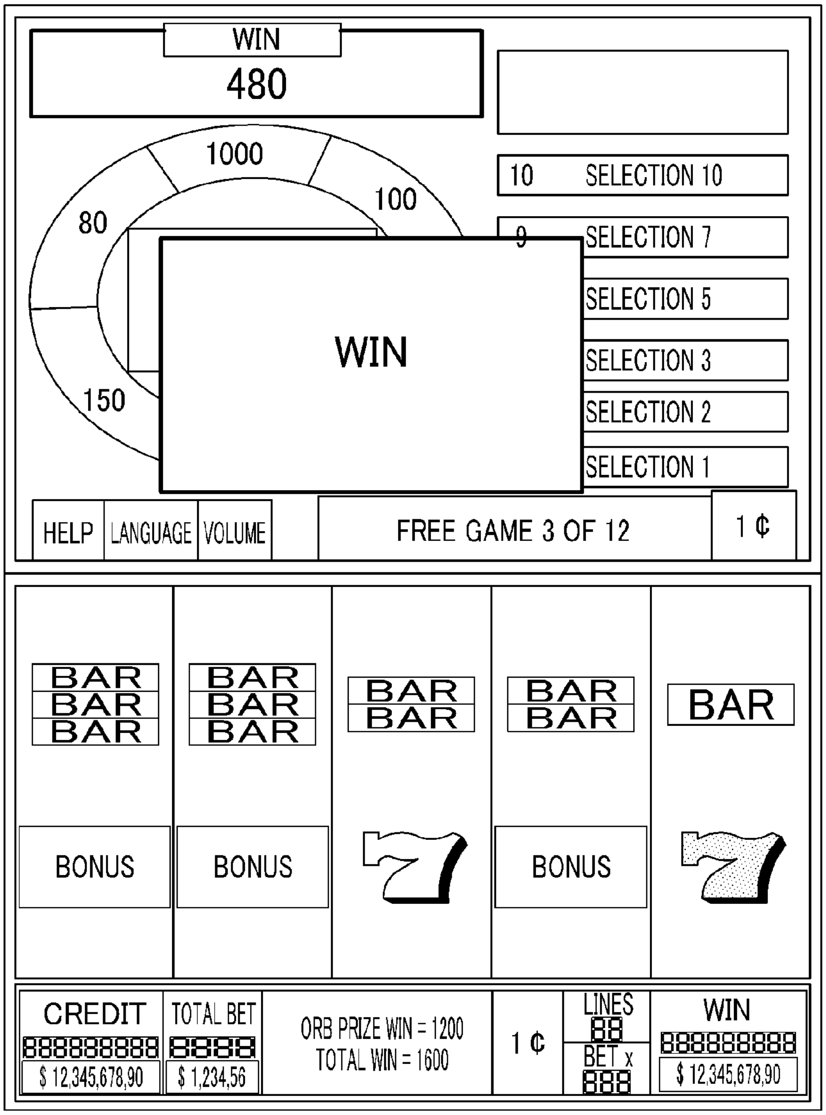
Figure 66:
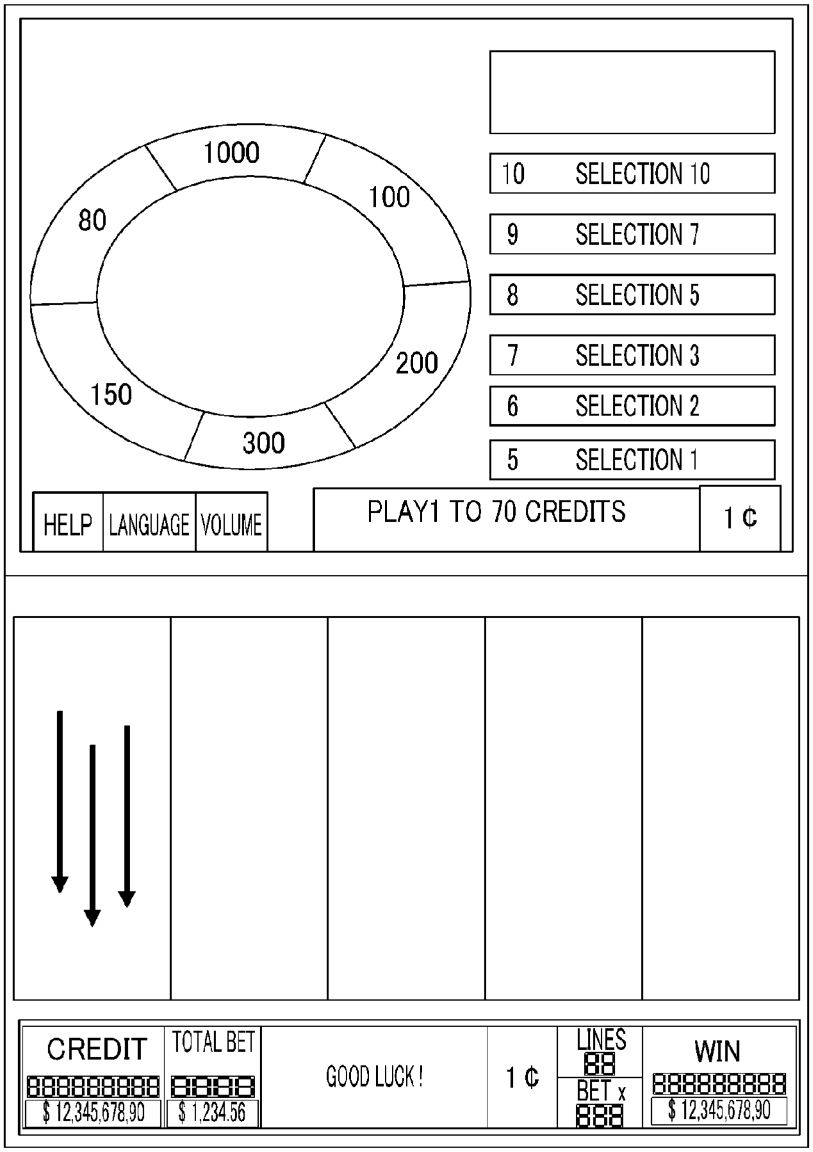
FIG. 66 to FIG. 70 are screen images in a normal round showing a sequential spinning action for a win case with a win prize five or more times a BET amount.
Figure 67:
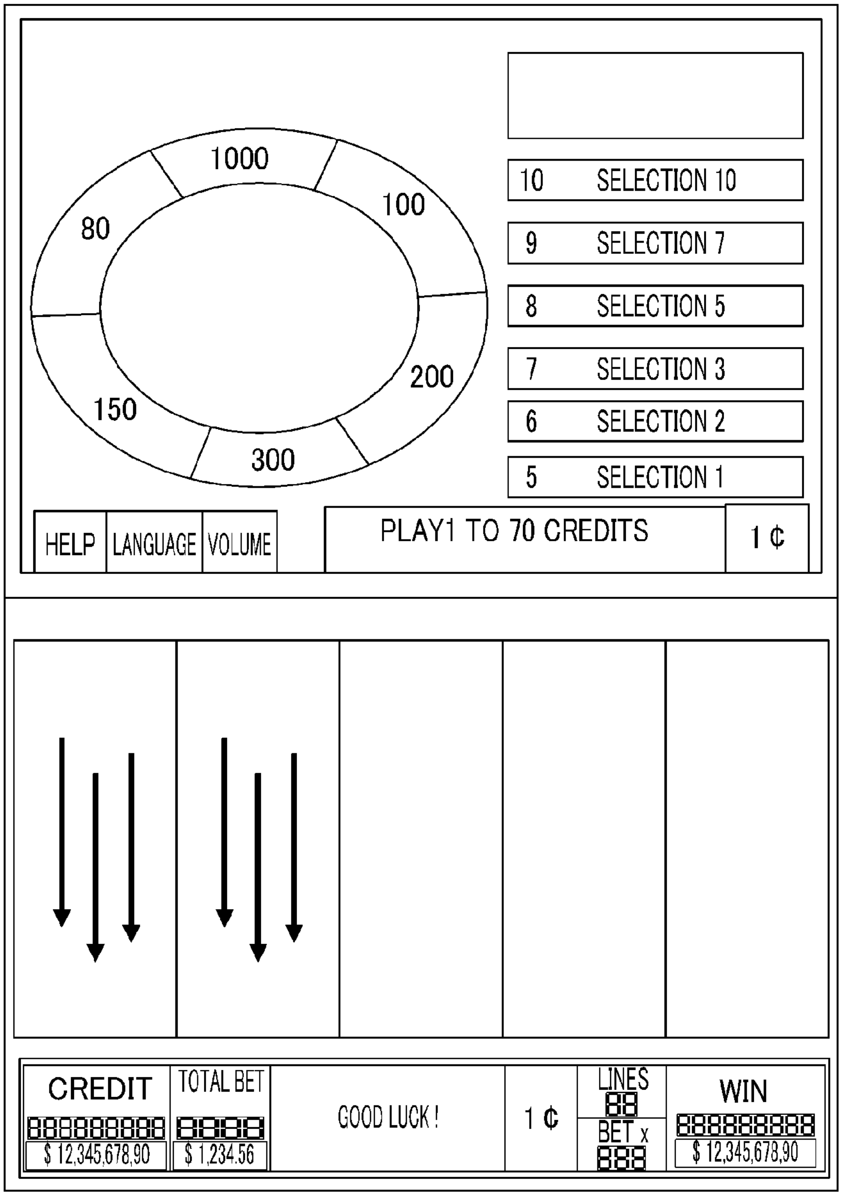
Figure 68:
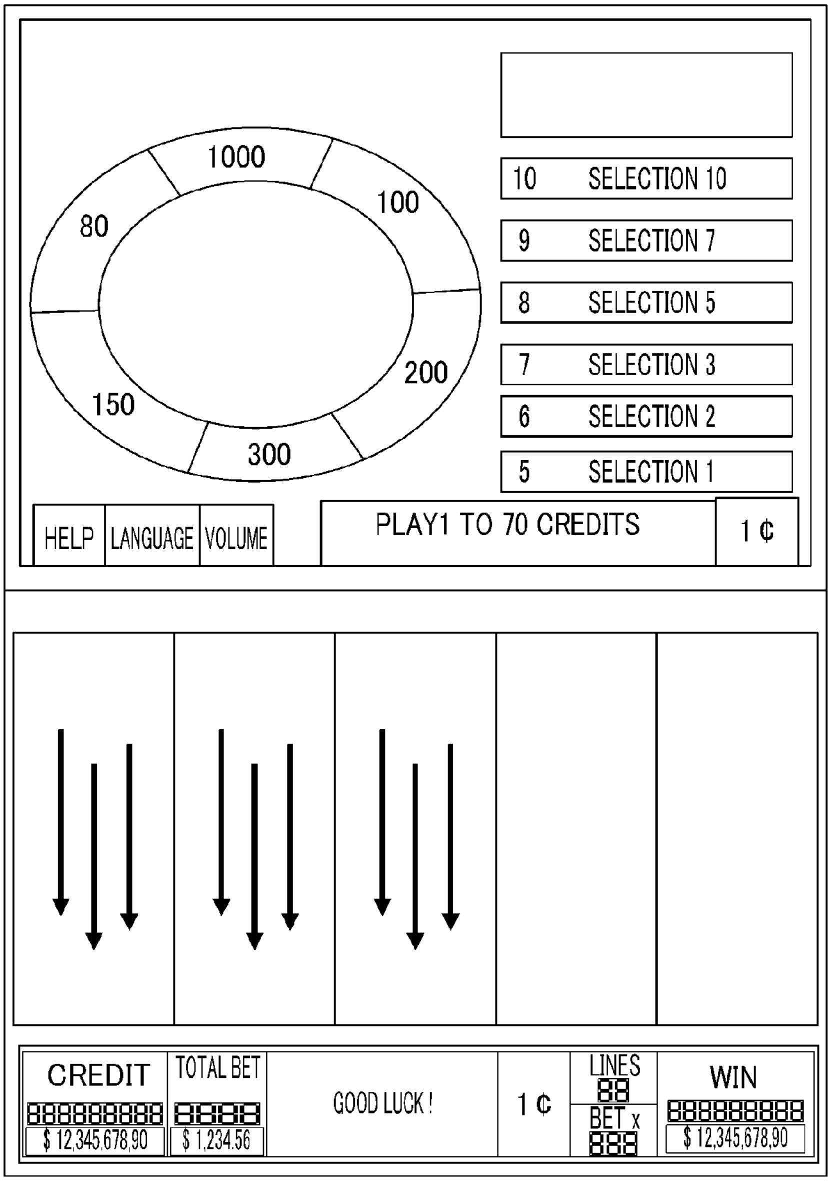
Figure 69:
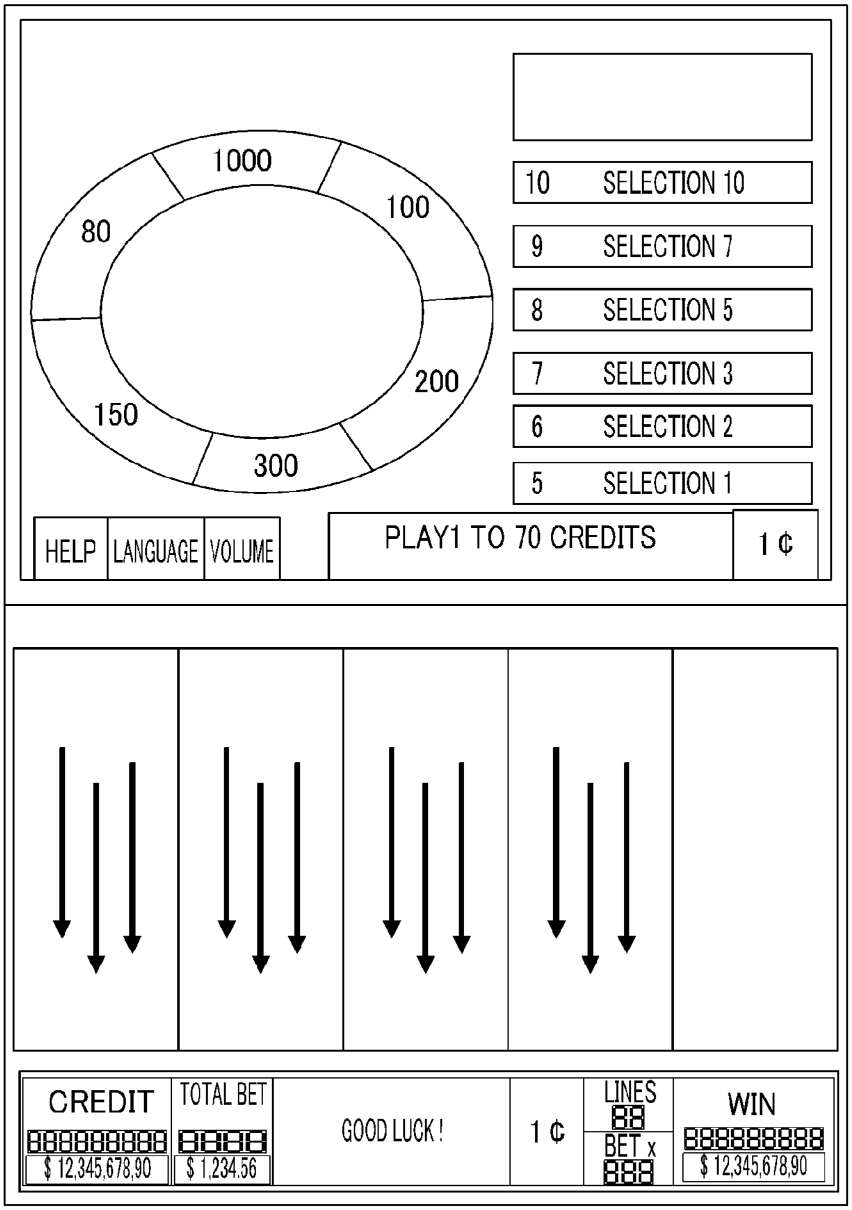
Figure 70:
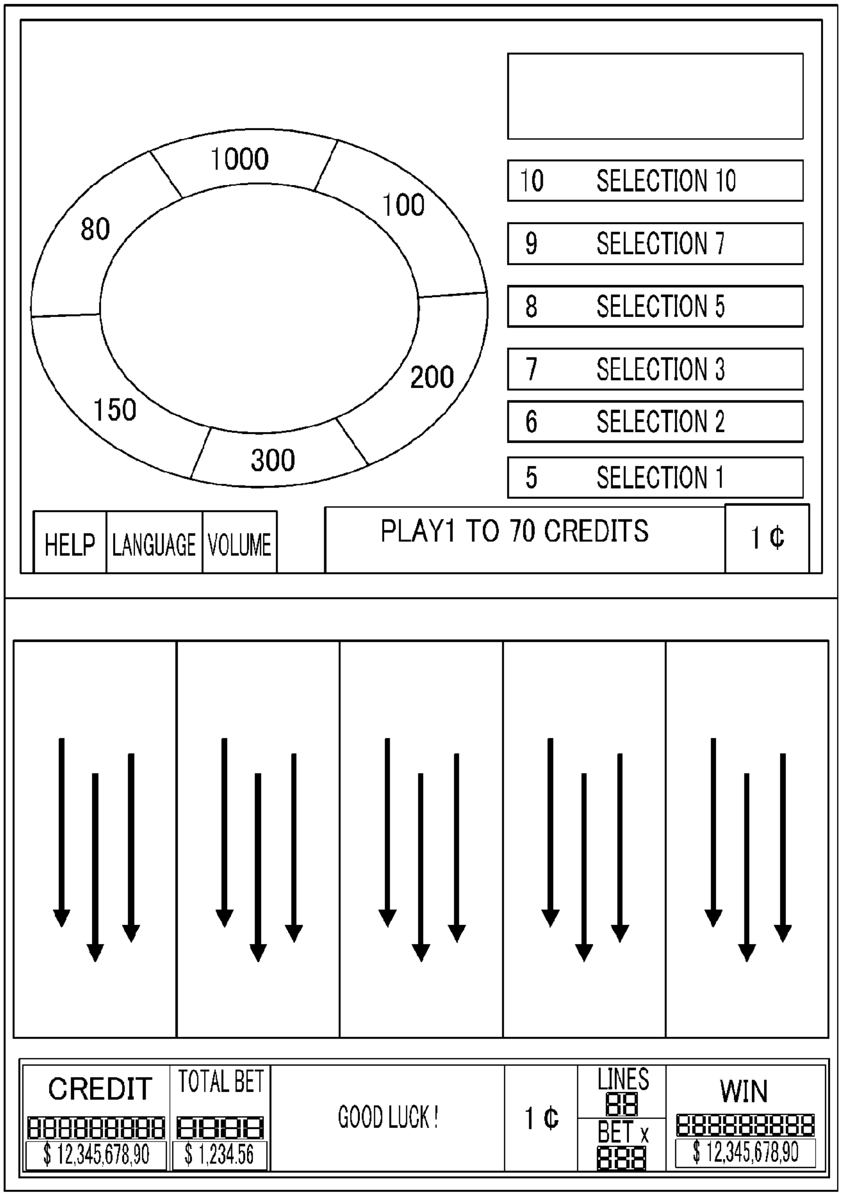

FIG. 64 shows screen images during the reels' spinning, and the serial number of the current free round is increased by one. FIG. 65 shows screen images for a win case occurs in a free round. A win plate is displayed on the secondary display 142, and win information is shown in the game message area 183 of the PTS terminal 700. Renderings as described above may be performed. For example, the symbols related to a scatter win are highlighted, and then the symbols related to line wins are highlighted.

[Win Renderings]

Now, screen images and renderings for win cases are described in detail with reference to FIG. 66 to FIG. 70.

FIG. 66 to FIG. 70 are screen images in a normal round showing a sequential spinning action for a win case with a win prize five or more times a BET amount.

Referring to FIG. 66 to FIG. 70, for a win case where a win prize is equal to or more than five times (referred to as "5× case" hereinafter), the five virtual reels start and stop spinning in sequence. For example, the first, second, third, fourth, and fifth reels begin spinning in sequence as shown in FIG. 66, FIG. 67, FIG. 68, FIG. 69, and FIG. 70, respectively. Thereafter, the first, second, third, fourth, and fifth reels stop spinning in sequence.

Figure 71:
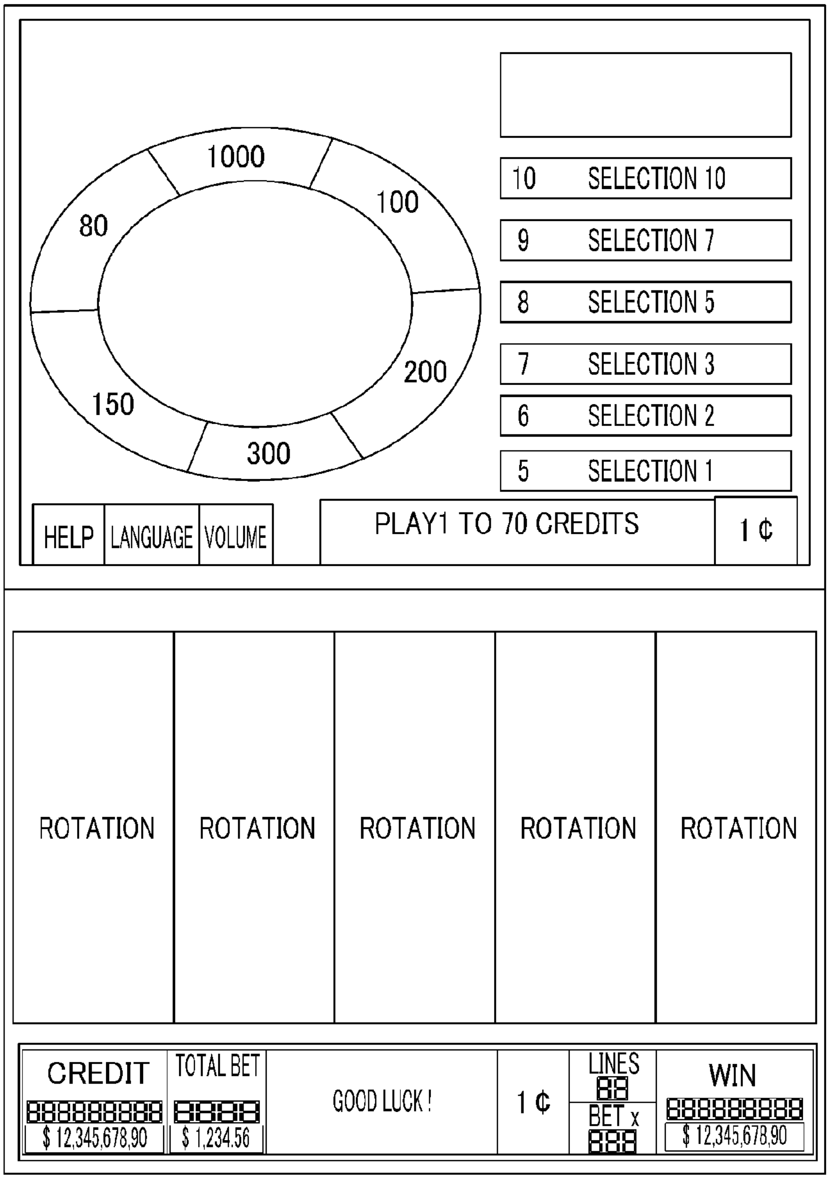
FIG. 71 to FIG. 73 are screen images in a normal round showing a slow simultaneous spinning action for a win case where each row in a symbol matrix includes the same symbols.
Figure 72:
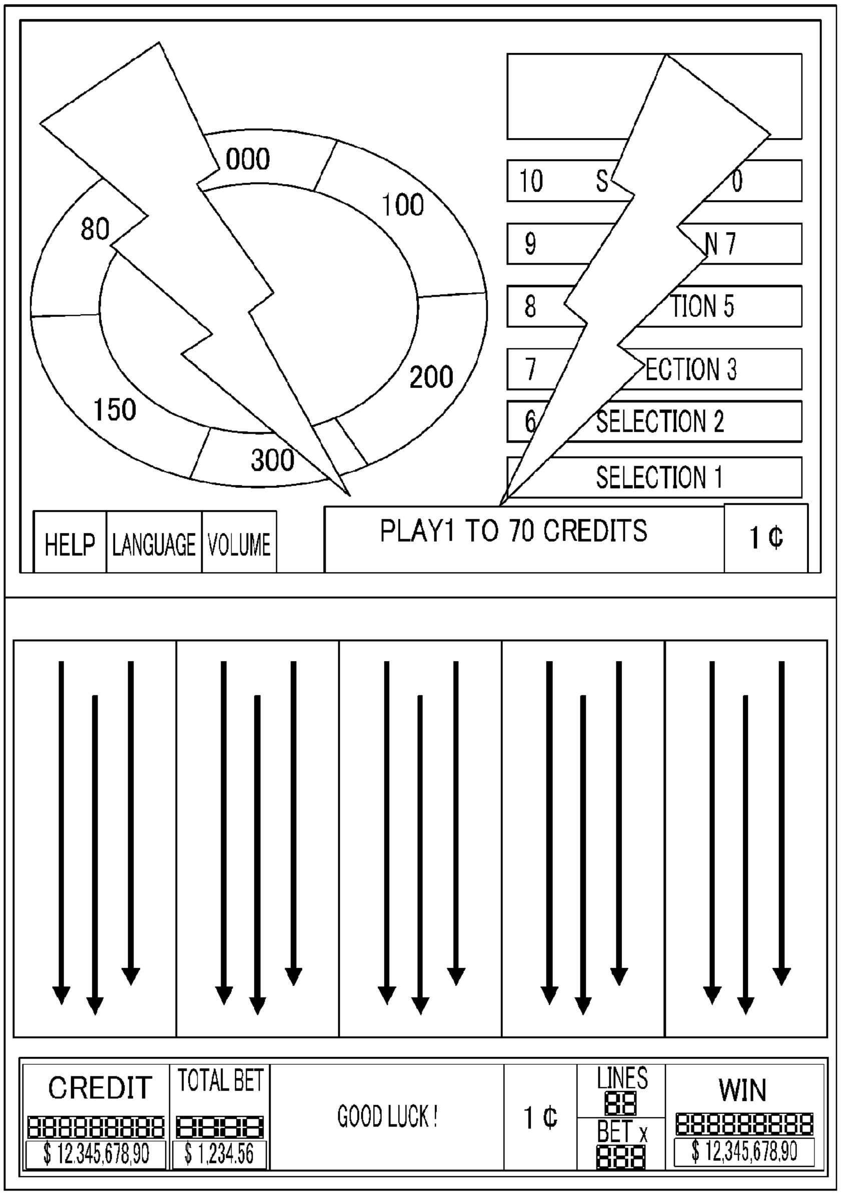
Figure 73:
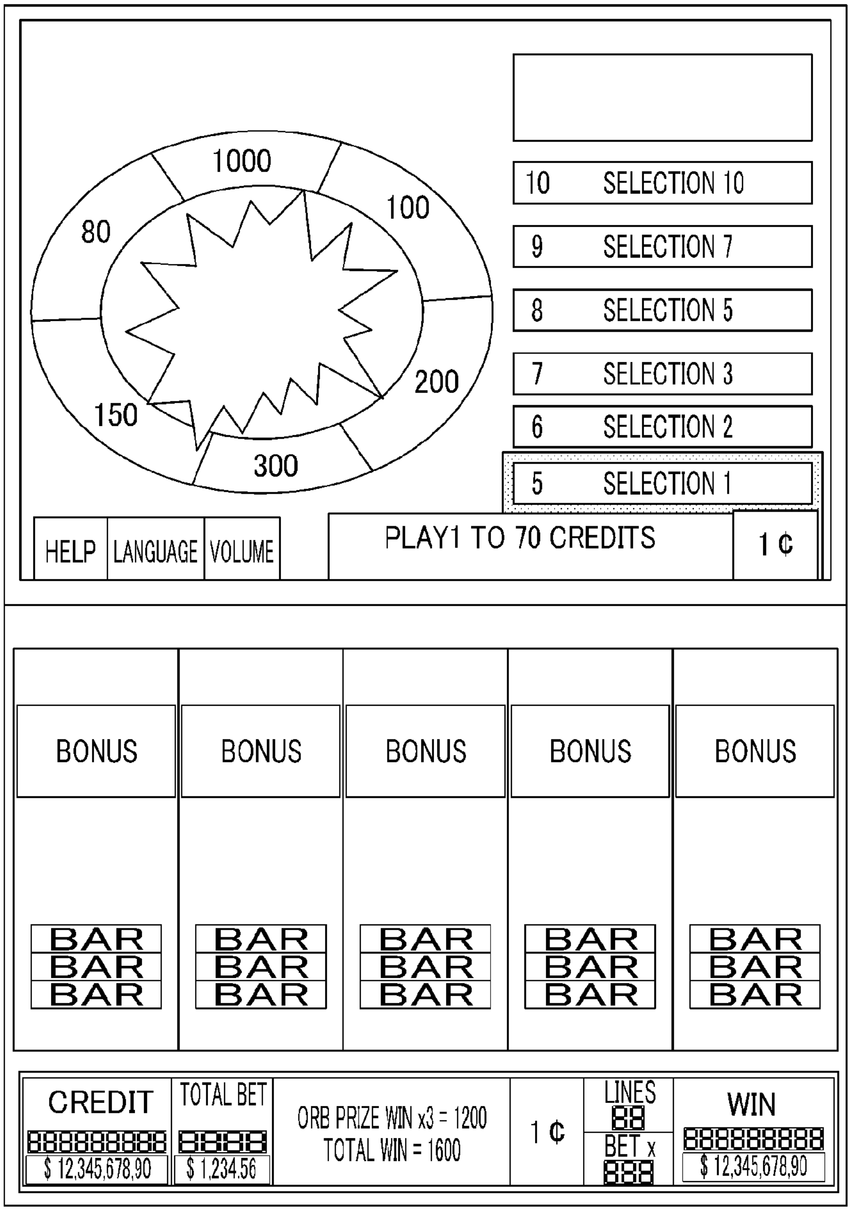

FIG. 71 to FIG. 73 are screen images in a normal round showing a slow simultaneous spinning action for a win case where each row in a symbol matrix includes the same symbols. Referring to FIG. 71 to FIG. 73, when the same symbols are arranged in each row in a symbol matrix as a result of a game (referred to as "5K case" hereinafter), all the reels may simultaneously perform slow spinning for a predetermined time.

In detail, the reels may start and continue spinning as usual as shown in FIG. 71. After a time elapses, the reels may reduce their speed and continue their slow spinning simultaneously for the predetermined time. At this time, the secondary display 142 may show a rendering, for example, show a pair of thunderbolts as shown in FIG. 72 (referred to as "thunderbolt action" hereinafter). At the same time, the primary display 141 may also show a rendering, for example, the primary display 141 may show a black screen and a rainbow moving upward or downward (referred to as "thunderbolt action" hereinafter).

Thereafter, all the reels may stop at the same time, and the secondary display 142 may show another rendering, for example, may show a polygon that may be filled with rainbow as shown in FIG. 73. When five scatter symbols arranged in a row are to be shown in the primary display 141 to trigger free rounds, a number box denoting the number of selections of a selection wheel on the secondary display 142, for example, a number box denoted by "5 SELECTION 1" may be highlighted. Furthermore, the scatter symbols on the primary display 141 may be filled with rainbow at the time of stop.

Figure 74:
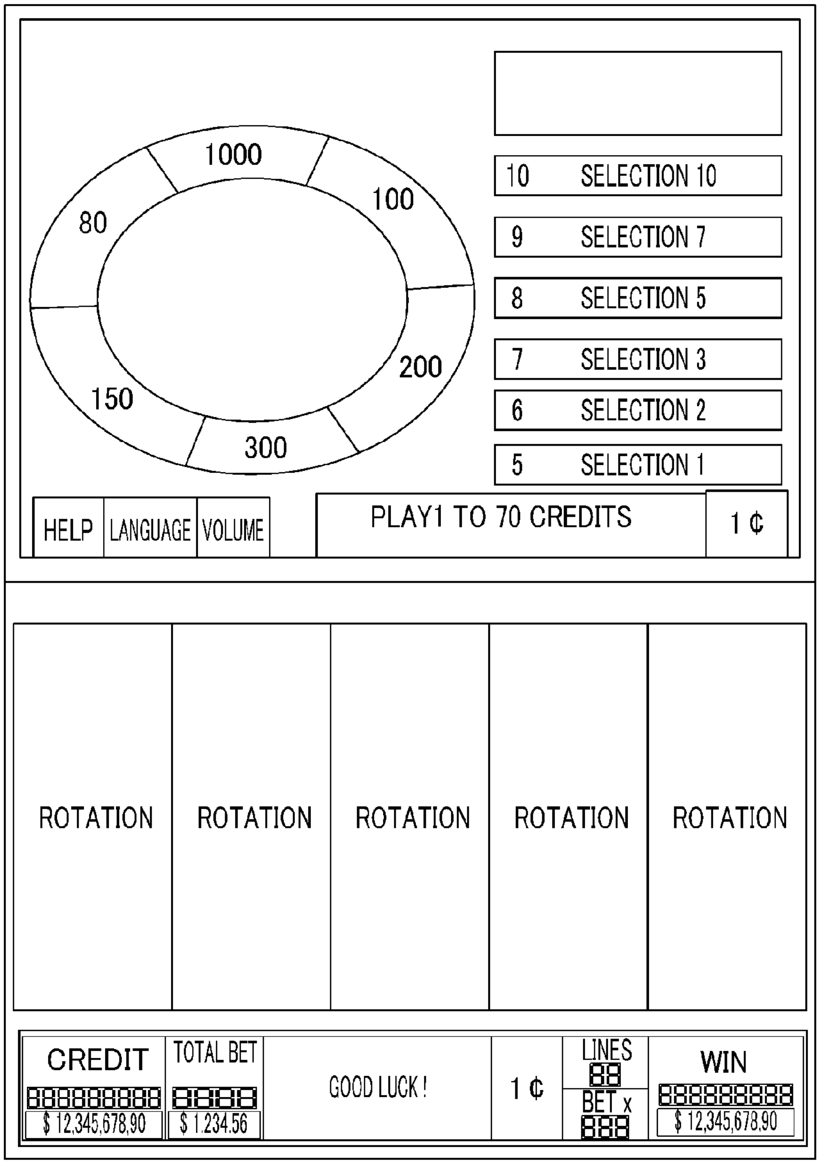
FIG. 74 to FIG. 76 are screen images in a normal round showing a fast simultaneous spinning action for a high-rank 5× case.
Figure 75:
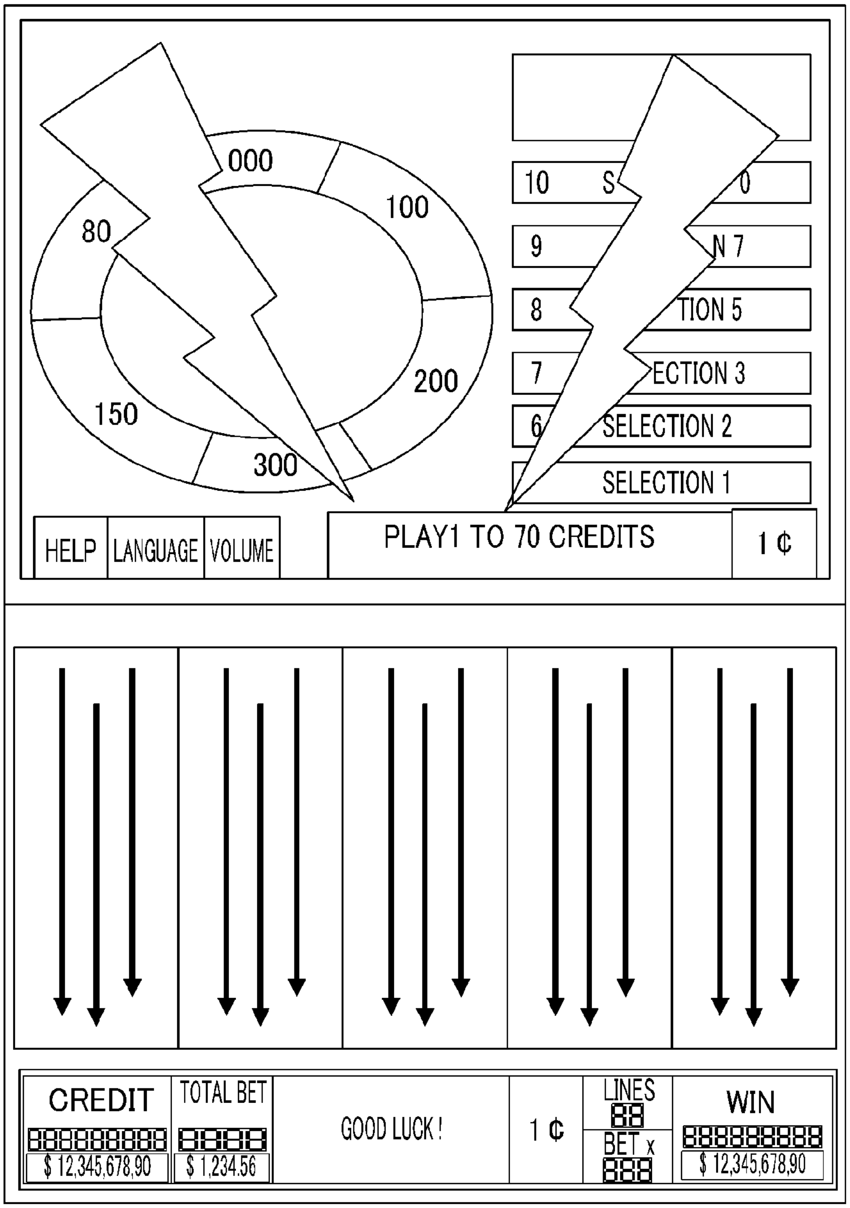
Figure 76:
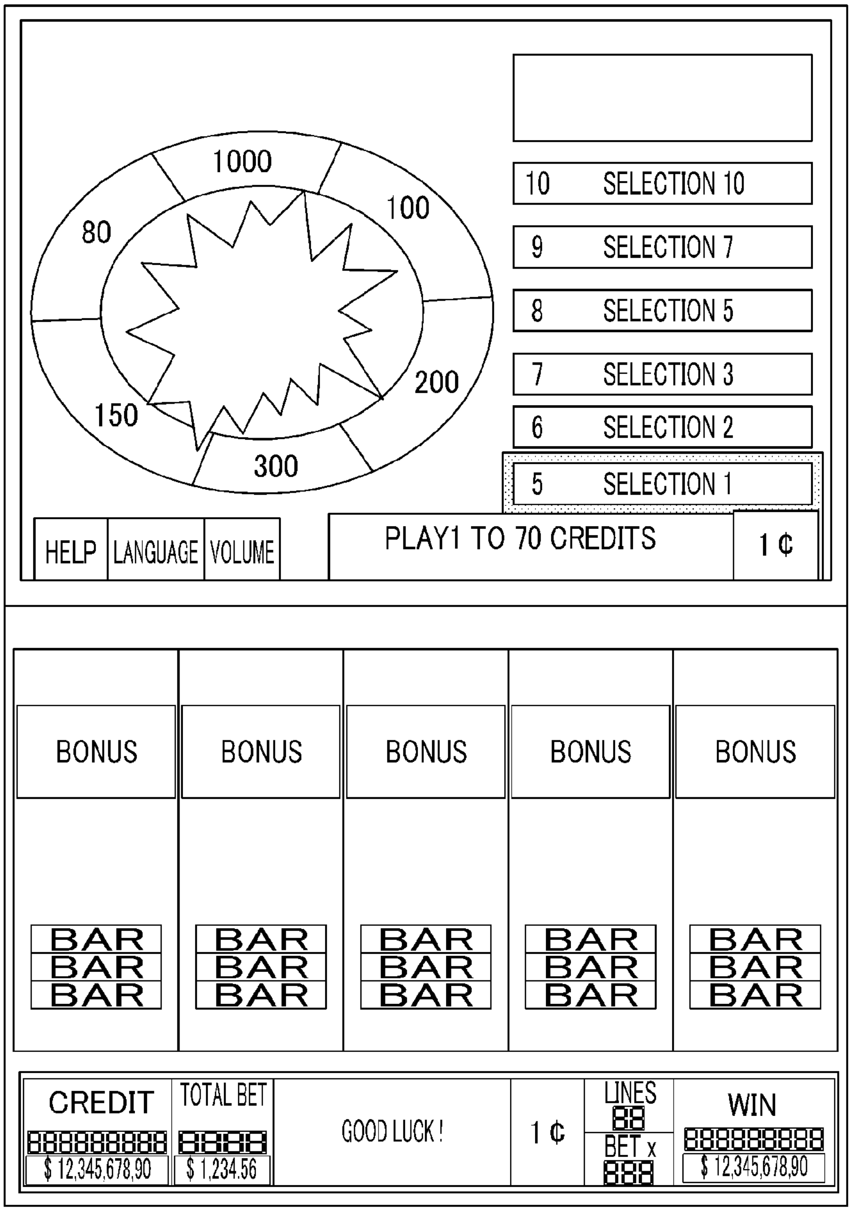

FIG. 74 to FIG. 76 are screen images in a normal round showing a fast simultaneous spinning action for a high-rank 5× case.

Referring to FIG. 74 to FIG. 76, for a 5× case where at least three kinds of BLUE 7, RED 7, and MIX 7, including the case caused by a DOUBLE (X2) symbol occurs, and five or more scatter symbols are in a row as a result of a game (referred to as "high-lank 5× case" hereinafter), all the reels may simultaneously perform fast spinning for a predetermined time.

In detail, the reels may start and continue spinning as usual as shown in FIG. 74.

After a time elapses, the reels may increase their speed and continue their fast spinning simultaneously for the predetermined time. At this time, the secondary display 142 may show a rendering such as a thunderbolt action as shown in FIG. 75. At the same time, the primary display 141 may also show a rendering such as a thunderbolt action.

Thereafter, all the reels may stop at the same time, and the secondary display 142 may show another rendering, for example, may show a polygon that may be filled with rainbow as shown in FIG. 76. In addition, since five or more scatter symbols arranged in a row are to be shown in the primary display 141 to trigger free rounds, a number box denoting the number of selections of a selection wheel on the secondary display 142, for example, a number box denoted by "5 SELECTION 1" may be highlighted. Furthermore, the scatter symbols on the primary display 141 may be filled with rainbow at the time of stop.

Figure 77:
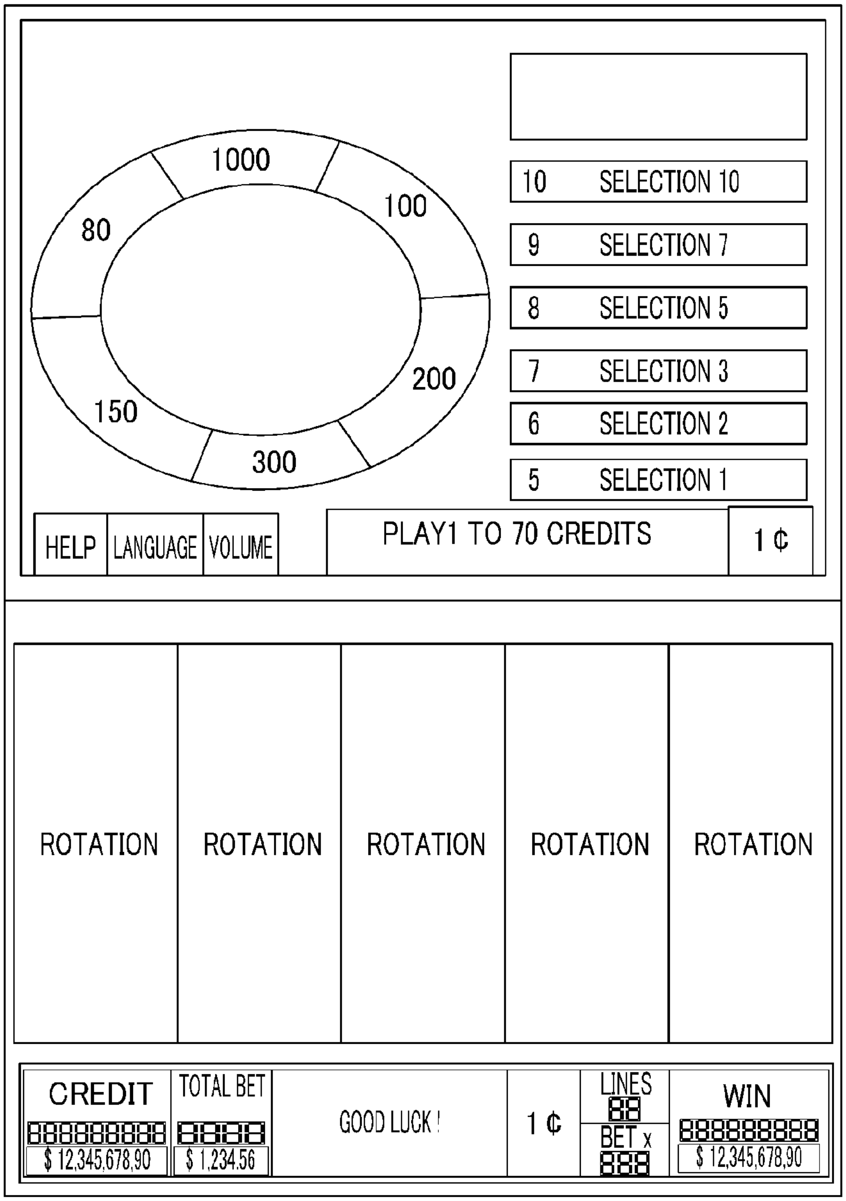
Figure 78:
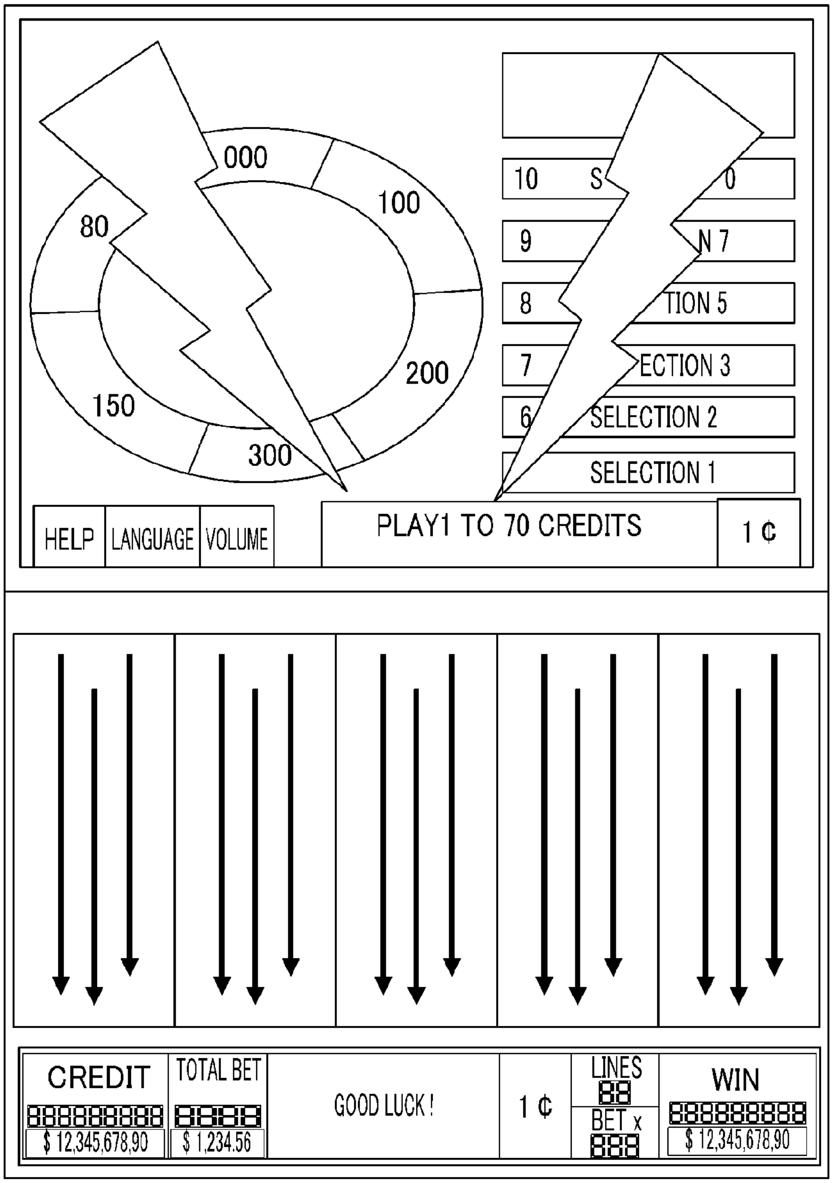
Figure 79:
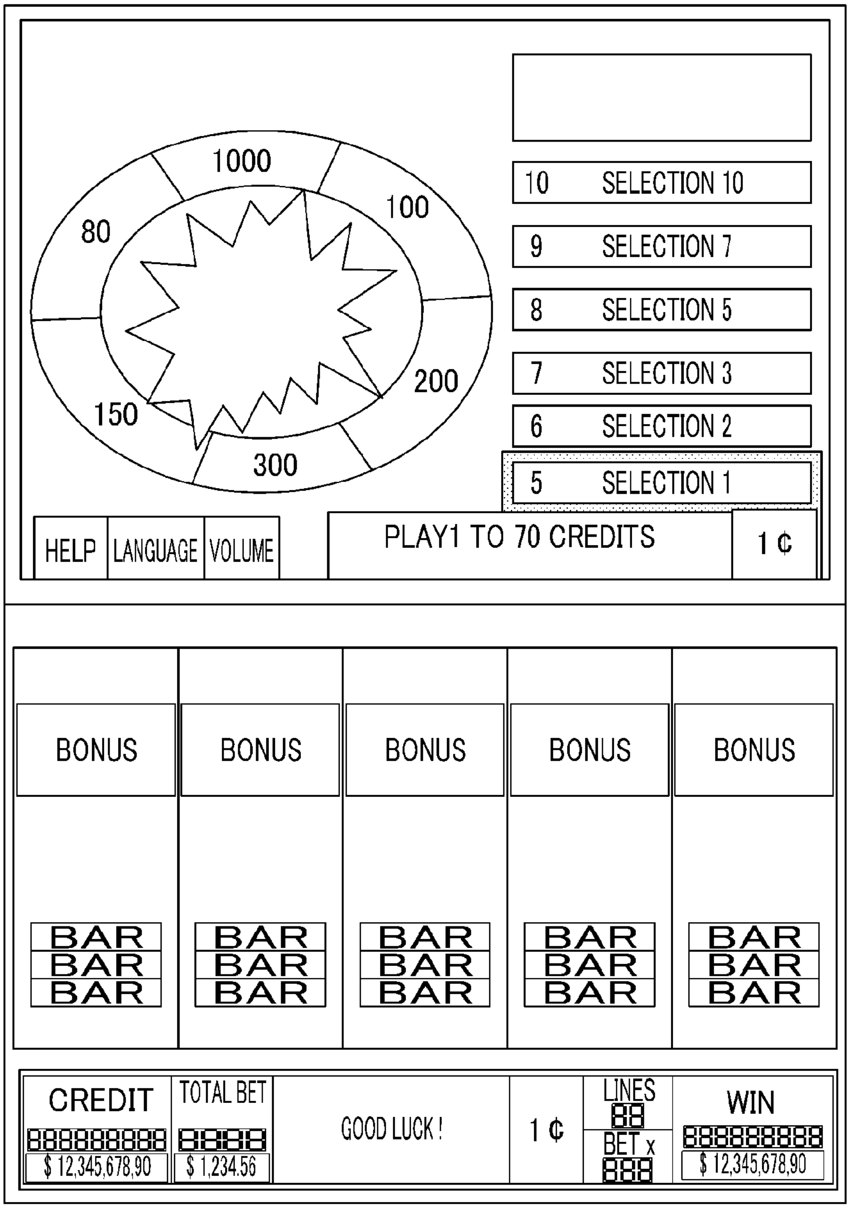

FIG. 77 to FIG. 79 are screen images in a normal round showing a fast simultaneous stop action for a high-rank 5× case.

Referring to FIG. 77 to FIG. 79, when a high-rank 5× case occurs as a result of a game, all the reels may perform fast spinning and simultaneous stop.

In detail, the reels may start and continue spinning as usual as shown in FIG. 77.

After a time elapses, the reels may increase their speed and continue their fast spinning. At this time, the primary and secondary displays 141 and 142 may show renderings such as thunderbolt actions as shown in FIG. 78.

Thereafter, all the reels may stop at the same time, and the secondary display 142 may show another rendering, for example, may show a polygon that may be filled with rainbow as shown in FIG. 79. In addition, since five or more scatter symbols arranged in a row are to be shown in the primary display 141 to trigger free rounds, a number box denoting the number of selections of a selection wheel on the secondary display 142, for example, a number box denoted by "5 SELECTION 1" may be highlighted. Furthermore, the scatter symbols on the primary display 141 may be filled with rainbow at the time of stop.

FIG. 80 to FIG. 84 are screen images in a normal round showing a slow symbol coincident action for a high-rank 5× case.

Referring to FIG. 80 to FIG. 84, when a high-rank 5× case occurs as a result of a game, some of the reels may move simultaneously.

Figure 80:
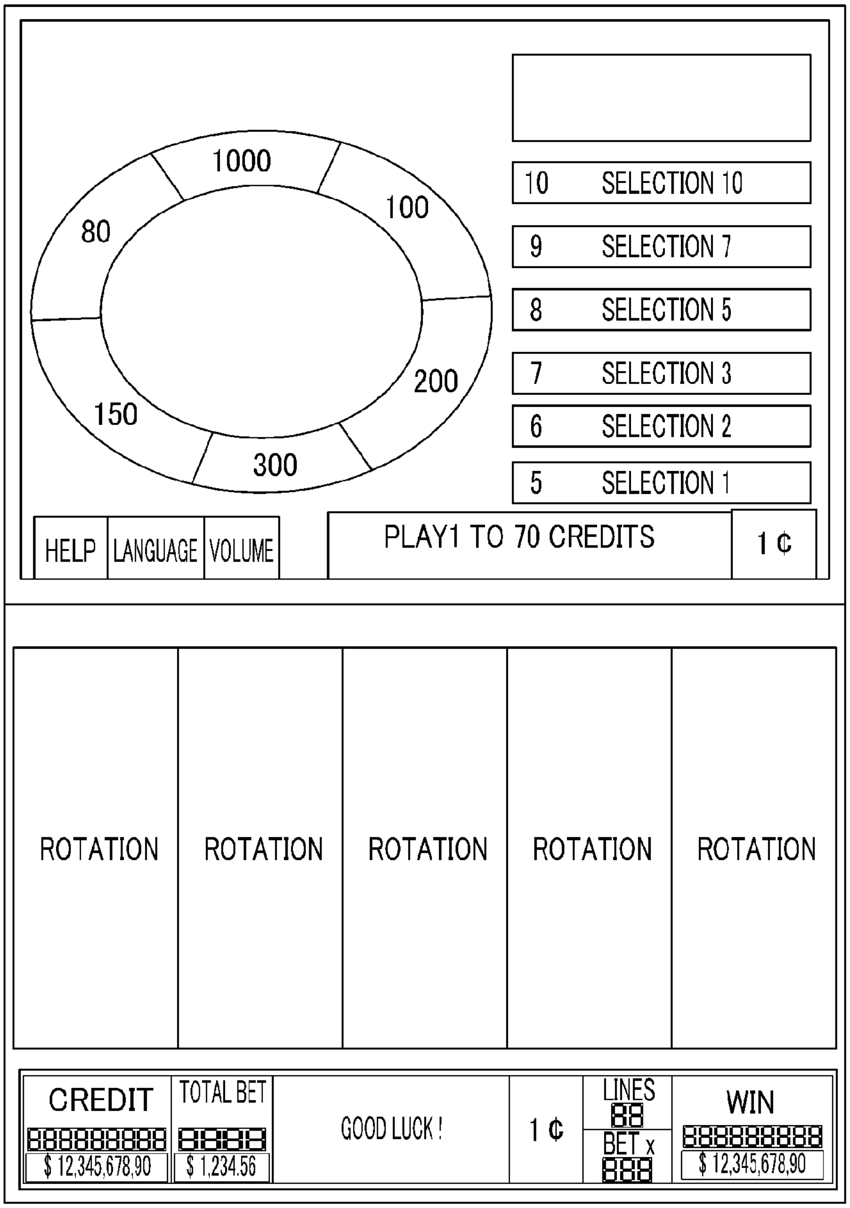
FIG. 80 to FIG. 84 are screen images in a normal round showing a slow symbol coincident action for a high-rank 5× case.

In detail, the reels may start and continue spinning as usual as shown in FIG. 80.

Figure 81:
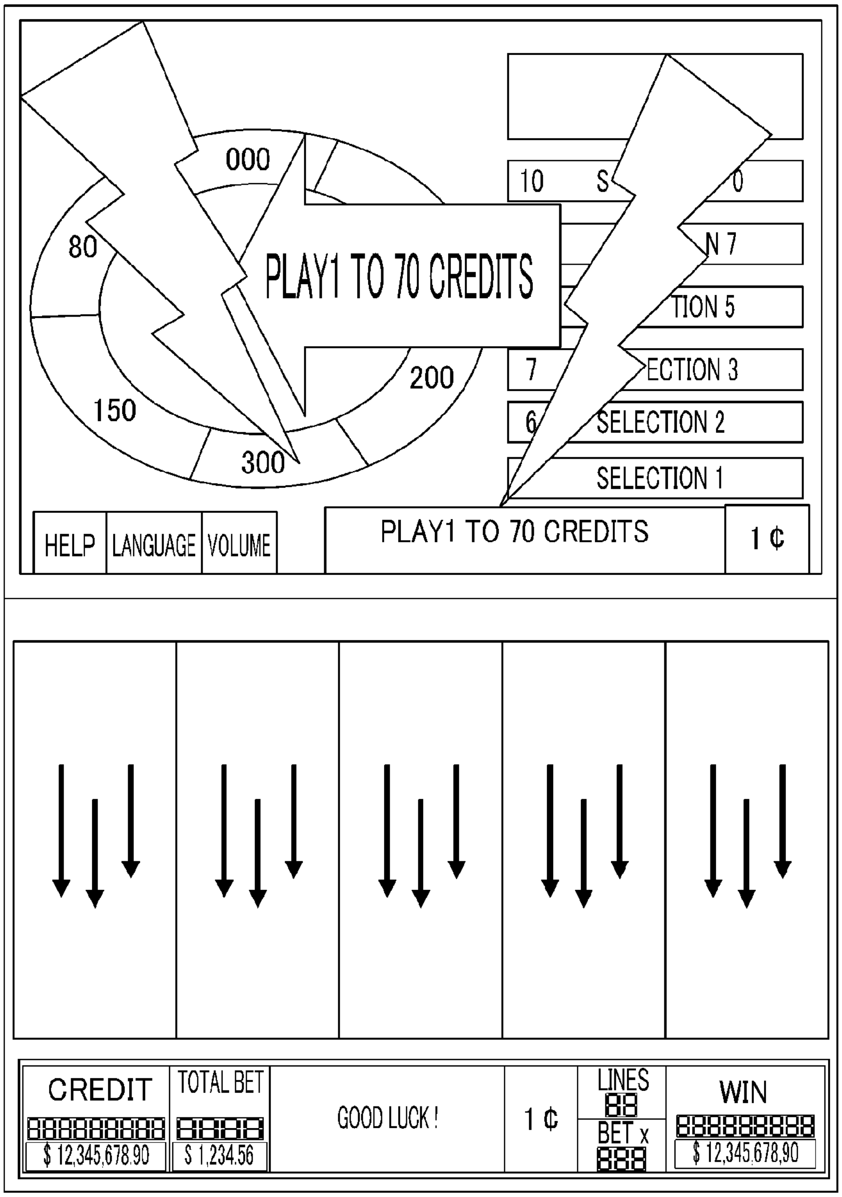

After a time elapses, the reels may decrease their speed, and the secondary display 142 may show a rendering, for example, show a pair of thunderbolts and a large horizontal arrow connecting the thunderbolts as shown in FIG. 81. At the same time, the primary display 141 may show a rendering such as a thunderbolt action. According to another embodiment, the BONUS, RED 7, BLUE 7, and DOUBLE symbols may become white instead of becoming black.

Figure 82:
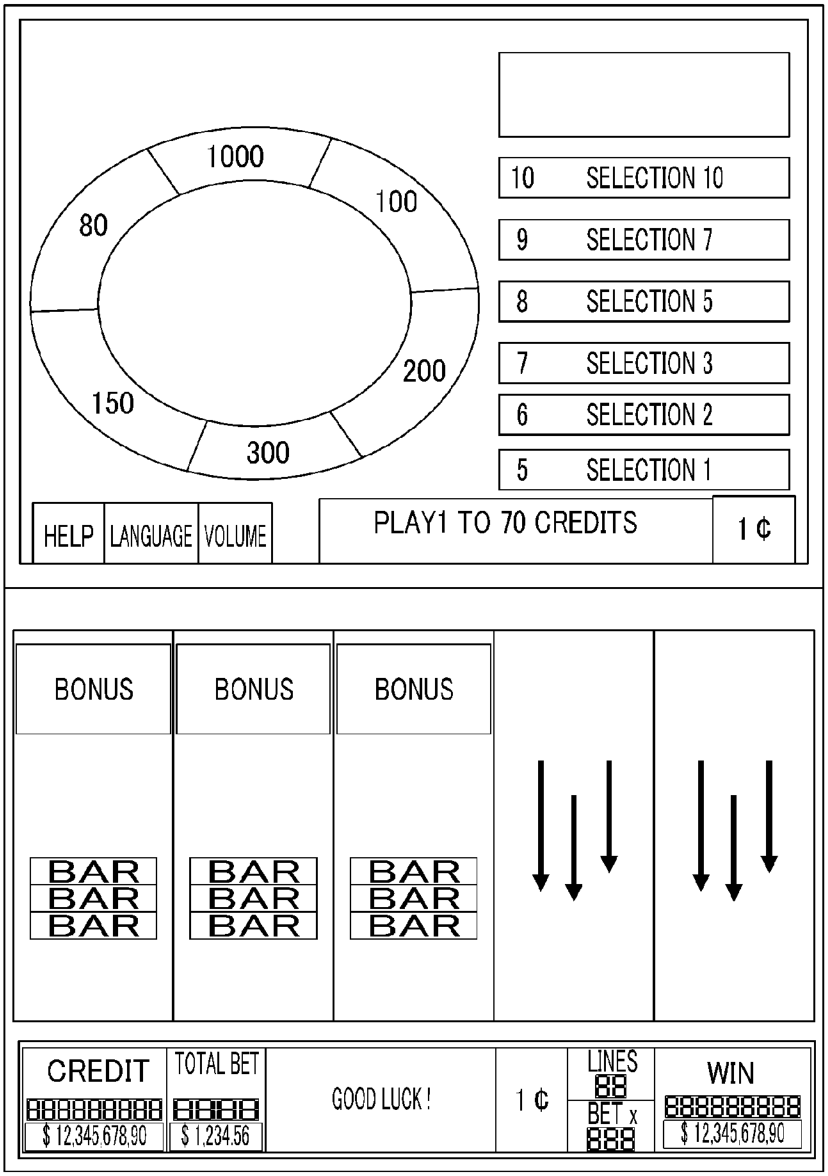

Referring to FIG. 82, corresponding symbols on some of the reels, for example, first, second, and third reels from the left may coincide with each other. The first, second, and third reels with the coinciding symbols may stop, while the remaining reels, i.e., fourth and fifth reels may continue their spinning. However, the fourth and fifth reels may also stop, and in this case, next steps may be unnecessary.

Figure 83:
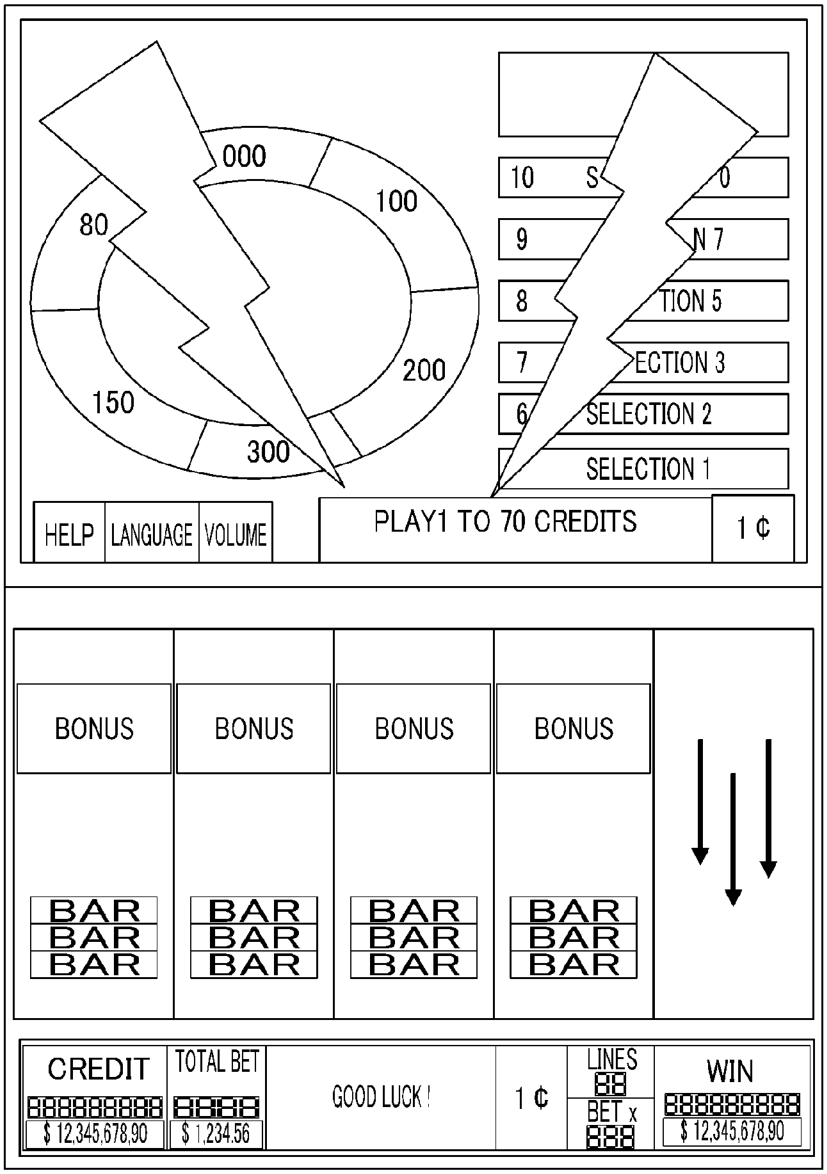

Referring to FIG. 83, if all the first, second, and third reels do not stop, the first and second displays 141 and 142 show renderings such as thunderbolt actions. Thereafter, a corresponding symbol on the fourth reel may slowly approach to the three coinciding symbols of the first, second, and third reels, and may coincide with the three coinciding symbols, while the remaining reel, i.e., the fifth reel may continue their spinning. However, the fifth reel may also stop, and in this case, next steps may be unnecessary.

Figure 84:
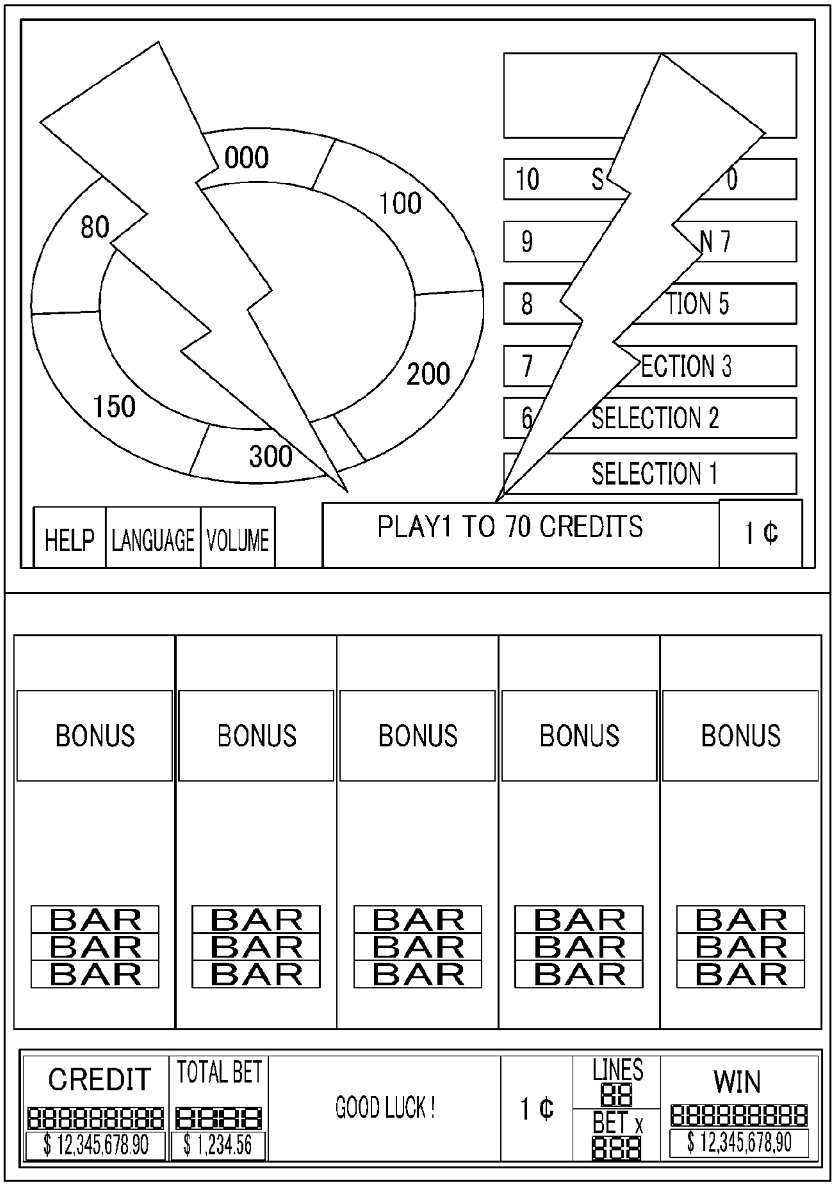

Referring to FIG. 84, if all the first, second, third, and fourth reels do not stop, the first and second displays 141 and 142 show renderings such as thunderbolt actions. Thereafter, a corresponding symbol on the fifth reel may slowly approach to the four coinciding symbols of the first, second, third, and fourth reels, and may coincide with the four coinciding symbols. Finally, al the coinciding symbols stop.

Figure 85:
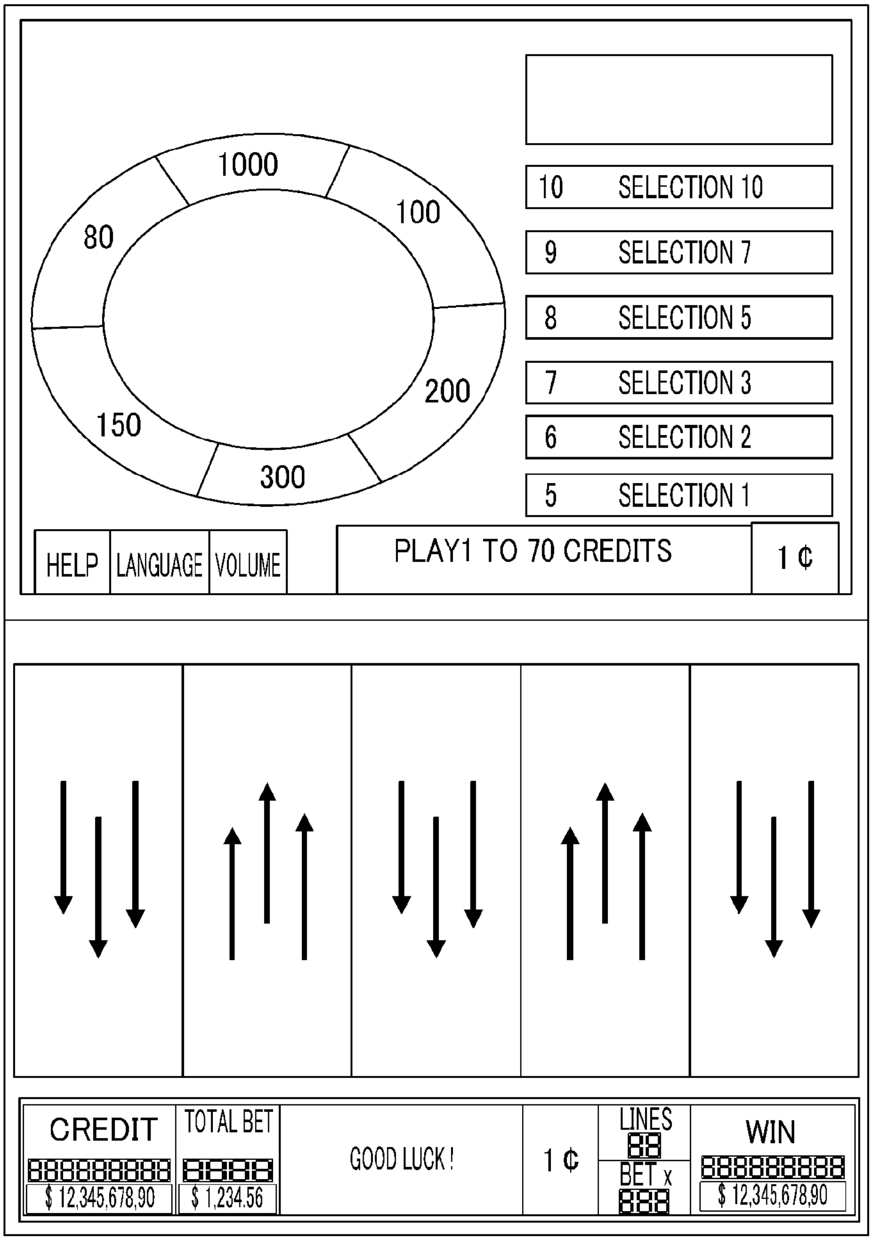
FIG. 85 to FIG. 87 are screen images in a normal round showing an reverse spinning action for an X2 case.
Figure 86:
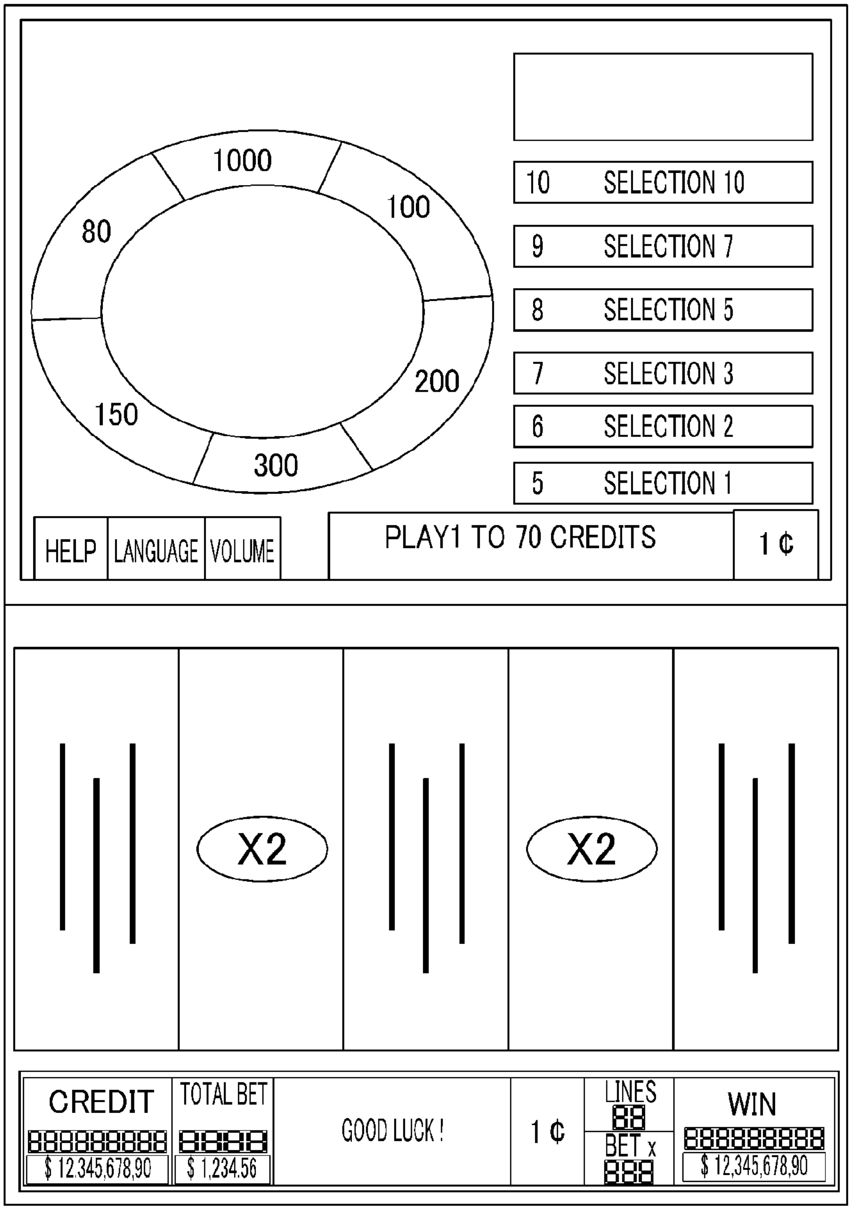
Figure 87:
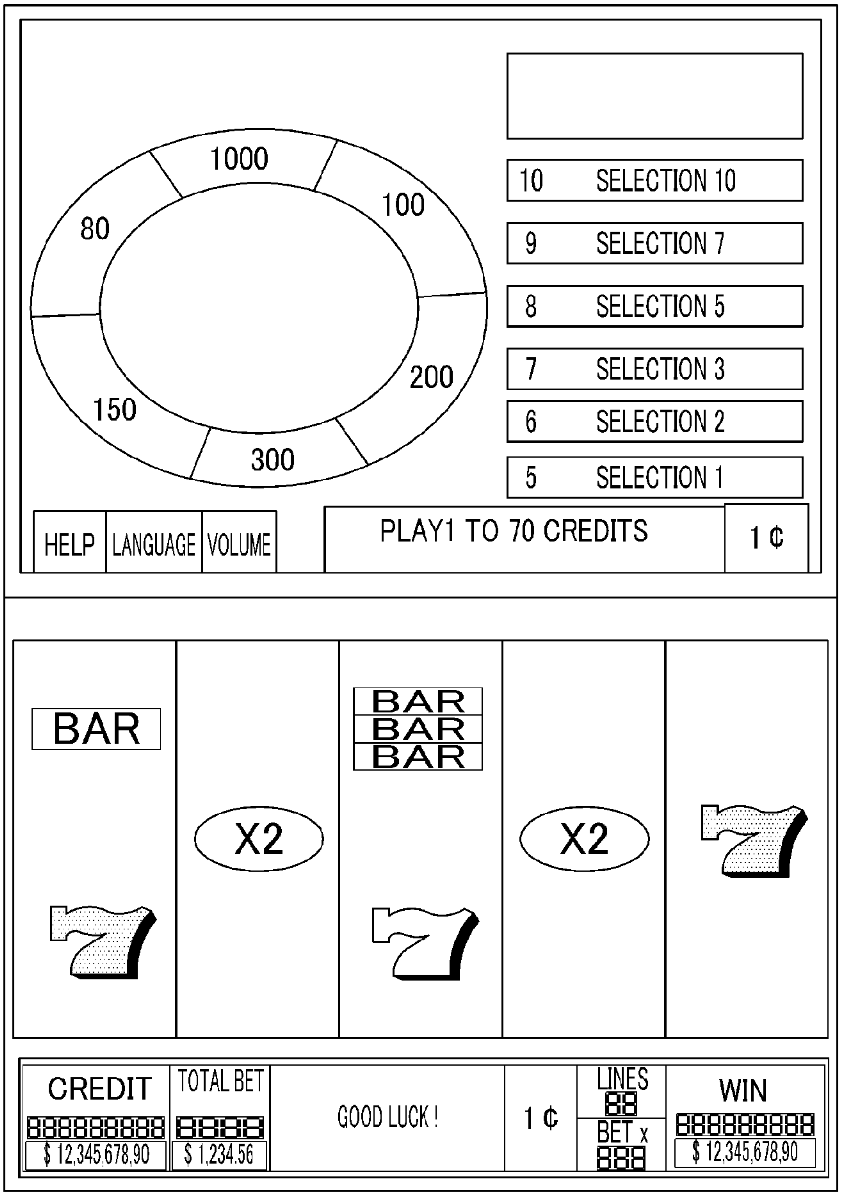

FIG. 85 to FIG. 87 are screen images in a normal round showing an reverse spinning action for an X2 case.

When two DOUBLE (X2) symbols are shown in a predetermined arrangement (referred to as "X2 case"), the reels including the DOUBLE symbols may spin in a reverse direction. FIG. 85 to FIG. 87 show the DOUBLE symbols on the second and fourth reels, but not limited thereto.

In detail, the second and fourth reels having the second and fourth reels may start spinning in a direction reverse to a direction in which the first, third, and fifth reels spin as shown in FIG. 85. Referring to FIG. 86, the second and fourth reels may stop as soon as possible, while other reels may continue spinning. Thereafter, referring to FIG. 87, the first, third, and fifth reels may gradually stop spinning in sequence.

Embodiments of the present invention can also be embodied as a computer readable program on a computer-readable recording medium. The computer readable recording medium is any data storage device that can store data that can be read thereafter by a computer. Examples of the computer readable recording medium include ROMs, RAMs, CD-ROMs, magnetic tapes, floppy disks, and optical data storage devices. The computer readable recording medium can also be distributed over a network coupled computer system so that the computer readable code is stored and executed in a distributed fashion.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A cylindrical reel for a slot machine, the reel including a plurality of symbols having different patterns, the reel comprising:

- a reel frame configured to receive rotational force from a rotational axis of a motor;
- a reel stripe disposed on an entire circumference of the reel frame and having a front surface including a group of the plurality of symbols thereon;
- a symbol piece disposed at the reel stripe and comprising:
  - a platform including one of the plurality of symbols thereon, the one of the plurality of symbols different from the group of the plurality of symbols;
  - a depression enclosing the platform and the one of the plurality of symbols; and
  - a peripheral portion enclosing the depression, wherein

- the reel stripe has at least one opening exposing the platform and the depression of the symbol piece,
- the front surface of the reel stripe is substantially flat such that the depression surrounding the one of the plurality of symbols on the symbol piece highlights and distinguishes the one of the plurality of symbols from the group of the plurality of symbols on the front surface of the reel stripe,
- the peripheral portion of the symbol piece is attached to a rear surface of the reel stripe, and
- the platform protrudes beyond the peripheral portion.

2. The reel of claim 1, wherein the peripheral portion of the symbol piece comprises:

a first band portion that is attached to the reel stripe and extends in a direction substantially perpendicular to a direction of rotation of the reel frame; and a second band portion that is attached to the reel stripe, extends in a direction substantially parallel to the direction of rotation of the reel frame, and is narrower than the first band portion.

3. The reel of claim 1, wherein the reel frame comprises:

a rim having a ring shape;

a hub configured to transmit the rotational force from the motor to the rim; and a spoke connecting the rim and the hub, wherein the rim comprises:

a pair of loops spaced apart from each other by a distance equal to or greater than a width of the reel stripe; and a plurality of connecting rods connected between the pair of loops for keeping the distance between the pair of loops and arranged substantially in parallel along a circumference of the rim to form a plurality of openings, and the opening of the reel stripe is disposed on one of the openings of the reel frame.

4. The reel of claim 1, wherein a top surface of the platform of the symbol piece is higher than the front surface of the reel stripe.

5. The reel of claim 1, wherein the one of the plurality of symbols on the symbol piece is a scatter symbol.

6. The reel of claim 1, wherein the platform comprises a first stage and a second stage higher than the first stage.

7. A gaming machine comprising:

a reel unit comprising a plurality of rotatable cylindrical reels that comprise a plurality of symbols having different patterns for a game; and a controller configured to control an arrangement of the symbols and a movement of the reel unit in the game, wherein each of the reels comprises:

a reel frame configured to receive rotational force from a rotational axis of a motor;

a reel stripe disposed on an entire circumference of the reel frame and having a front surface including a group of the plurality of symbols thereon;

a symbol piece disposed at the reel stripe and comprising:

a platform including one of the plurality of symbols thereon, the one of the plurality of symbols different from the group of the plurality of symbols;

a depression enclosing the platform and the one of the plurality of symbols; and a peripheral portion enclosing the depression, wherein the reel stripe has at least one opening exposing the platform and the depression of the symbol piece, the front surface of the reel stripe is substantially flat such that the depression surrounding the one of the plurality of symbols on the symbol piece highlights and distinguishes the one of the plurality of symbols from the group of the plurality of symbols on the front surface of the reel stripe, the peripheral portion of the symbol piece is attached to a rear surface of the reel stripe, and the platform protrudes beyond the peripheral portion.

8. The gaming machine of claim 7, wherein the peripheral portion of the symbol piece comprises:

a first band portion that is attached to the reel stripe and extends in a direction substantially perpendicular to a direction of rotation of the reel frame; and a second band portion that is attached to the reel stripe, extends in a direction substantially parallel to the direction of rotation of the reel frame, and is narrower than the first band portion.

9. The gaming machine of claim 7, wherein the reel frame comprises:

a rim having a ring shape;

a hub configured to transmit the rotational force from the motor to the rim; and a spoke connecting the rim and the hub, wherein the rim comprises:

a pair of loops spaced apart from each other by a distance equal to or greater than a width of the reel stripe; and a plurality of connecting rods connected between the pair of loops for keeping the distance between the pair of loops and arranged substantially in parallel along a circumference of the rim to form a plurality of openings, and the opening of the reel stripe is disposed on one of the openings of the reel frame.

10. The gaming machine of claim 7, wherein a top surface of the platform of the symbol piece is higher than the front surface of the reel stripe.

11. The gaming machine of claim 7, wherein the one of the plurality of symbols on the symbol piece is a scatter symbol.

12. The gaming machine of claim 7, wherein the platform comprises a first stage and a second stage higher than the first stage.

* * * * *